United States Patent
Xu et al.

(10) Patent No.: US 9,563,953 B2
(45) Date of Patent: Feb. 7, 2017

(54) SYSTEMS AND METHODS FOR DETERMINING A SEAM

(71) Applicant: QUALCOMM Incorporated, San Diego, CA (US)

(72) Inventors: Lei Xu, San Diego, CA (US); Yunke Pan, San Diego, CA (US); Shuxue Quan, San Diego, CA (US); Yingen Xiong, Mountain View, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/811,489

(22) Filed: Jul. 28, 2015

(65) Prior Publication Data

US 2016/0063705 A1 Mar. 3, 2016

Related U.S. Application Data

(60) Provisional application No. 61/996,985, filed on Aug. 28, 2014, provisional application No. 62/109,567, filed on Jan. 29, 2015.

(51) Int. Cl.
*G06T 7/00* (2006.01)
*G06T 3/40* (2006.01)
(Continued)

(52) U.S. Cl.
CPC .......... *G06T 7/0028* (2013.01); *G06T 3/4038* (2013.01); *G06T 5/50* (2013.01); *G06T 7/0085* (2013.01); *G06T 7/2033* (2013.01); *H04N 5/23238* (2013.01); *G06T 2200/32* (2013.01); *G06T 2207/10016* (2013.01); *G06T 2207/10024* (2013.01); *G06T 2207/20136* (2013.01)

(58) Field of Classification Search
CPC ........ G06T 7/0028; G06T 3/4038; G06T 5/50; G06T 7/0085; G06T 7/2033; G06T 2200/32; G06T 2207/10016; G06T 2207/10024; G06T 2207/20136; H04N 5/23238
USPC .......................................................... 382/199
See application file for complete search history.

(56) References Cited

U.S. PATENT DOCUMENTS

| | | | |
|---|---|---|---|
| 5,566,246 A * | 10/1996 | Rao ...................... | G06K 9/3241 382/154 |
| 8,587,636 B2 | 11/2013 | Kimura | |
| 8,818,101 B1 * | 8/2014 | Lim ....................... | G06T 3/4038 345/629 |
| 2005/0116139 A1* | 6/2005 | Mikkelsen ........... | H04N 3/1562 250/208.1 |
| 2007/0237420 A1 | 10/2007 | Steedly et al. | |
| 2008/0056612 A1 | 3/2008 | Park et al. | |

(Continued)

OTHER PUBLICATIONS

Cao, Fang, Zhijiang Zhang, and Qi Zhang. "Seamless Image Stitching Using Optimized Boundary Matching for Gradient and Curvature." Intelligence Information Processing and Trusted Computing (IPTC), 2010 International Symposium on. IEEE, 2010.*

(Continued)

*Primary Examiner* — Sumati Lefkowitz
*Assistant Examiner* — Amandeep Saini
(74) *Attorney, Agent, or Firm* — Austin Rapp & Hardman

(57) ABSTRACT

A method performed by an electronic device is described. The method includes determining overlapping areas from neighboring images. The method also includes determining a difference measure between the overlapping areas. The method further includes determining a constraint measure corresponding to at least one of the overlapping areas. The method additionally includes determining a seam based on a combination of the difference measure and the constraint measure.

27 Claims, 32 Drawing Sheets

(51) Int. Cl.
　　　H04N 5/232　　(2006.01)
　　　G06T 5/50　　(2006.01)
　　　G06T 7/20　　(2006.01)

(56) References Cited

U.S. PATENT DOCUMENTS

| | | | | |
|---|---|---|---|---|
| 2009/0175492 | A1* | 7/2009 | Chen | G06K 9/00791 382/100 |
| 2010/0054628 | A1* | 3/2010 | Levy | G06T 3/4038 382/284 |
| 2010/0290701 | A1* | 11/2010 | Puneet | G06K 9/38 382/164 |
| 2011/0096143 | A1 | 4/2011 | Ono | |
| 2013/0028472 | A1 | 1/2013 | Pham | |
| 2013/0063555 | A1* | 3/2013 | Matsumoto | H04N 5/235 348/38 |
| 2013/0287304 | A1 | 10/2013 | Kimura | |
| 2013/0329002 | A1 | 12/2013 | Tico | |
| 2013/0329071 | A1* | 12/2013 | Doepke | H04N 5/23258 348/222.1 |

OTHER PUBLICATIONS

International Search Report and Written Opinion—PCT/US2015/044503—ISA/EPO—Nov. 30, 2015.

Cao F., et al., "Seamless Image Stitching Using Optimized Boundary Matching for Gradient and Curvature", 2010 International Symposium on Intelligence Information Processing and Trusted Computing, 2010, pp. 495-498.

Efros, A.A., et al., "Image Quilting for Texture Synthesis and Transfer," ACM SIGGRAPH 2001, Aug. 12-17, 2001, Los Angeles, CA, pp. 341-346.

Suen S.T.Y., et al., "Curvature Domain Image Stitching", 2006 IEEE Conference on Systems, Man, and Cybernetics, Oct. 8, 2006, pp. 3164-3169.

Xu L., et al., "An Improved Endovascular Guide-wire Position Simulation Algorithm", Biomedical Imaging (ISBI), IEEE, May 2012, pp. 1196-1199.

Xu L., et al., "Approximating Minimum Bending Energy Path in a Simple Corridor", Computational Geometry: Theory and Applications Elseveier B.V., 2013, pp. 349-366.

Xu L., et al., "Efficient Algorithms for Segmenting Globally Optimal and Smooth Multi-Surfaces", IPMI 2011, LNCS 6801, Springer-Verlag Berlin Heidelberg, 2011, pp. 208-220.

Xu L., et al., "Efficient Searching of Globally Optimal and Smooth Multi-Surfaces with Shape Priors", Medical Imaging 2012: Image Processing, 2012, 6 Pages.

Xu L., et al., "Faster Segmentation Algorithm for Optical Coherence Tomography Image with Guaranteed Smoothness", Department of Computer Science and Engineering, MLMI, 2011, 8 Pages.

\* cited by examiner

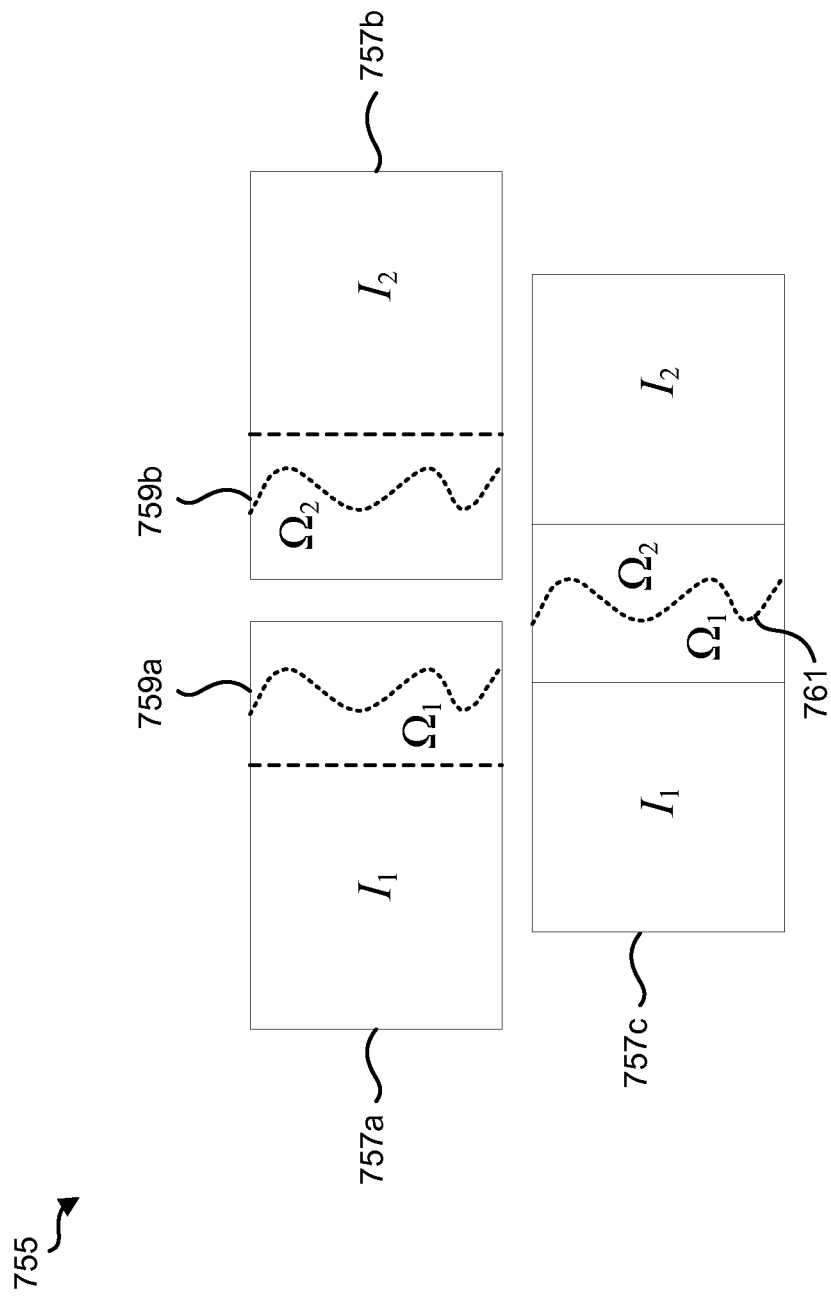

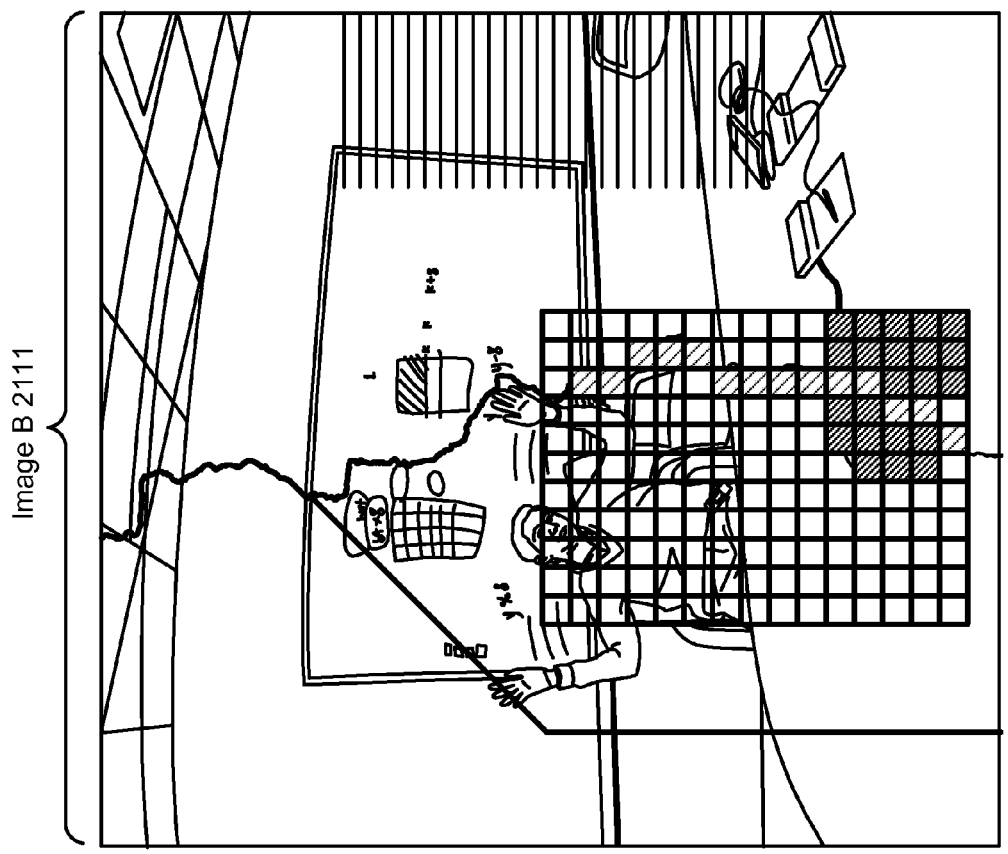
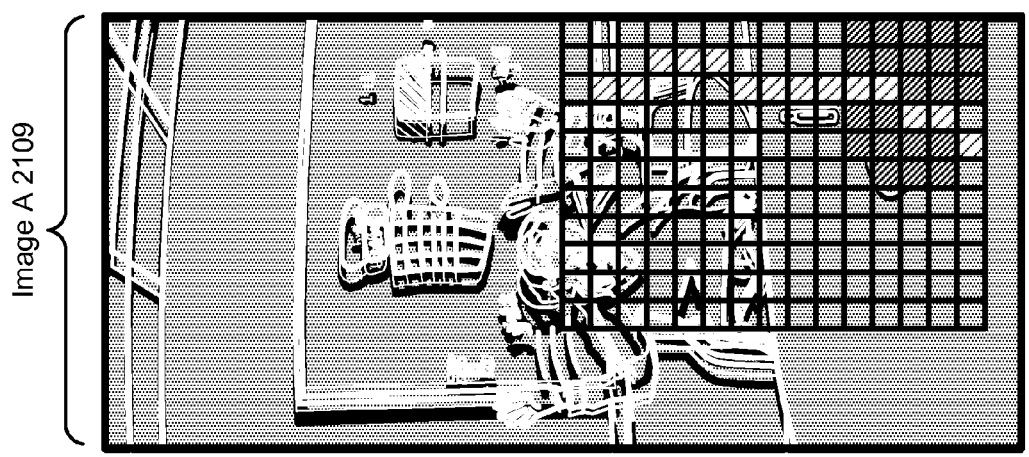
FIG. 21

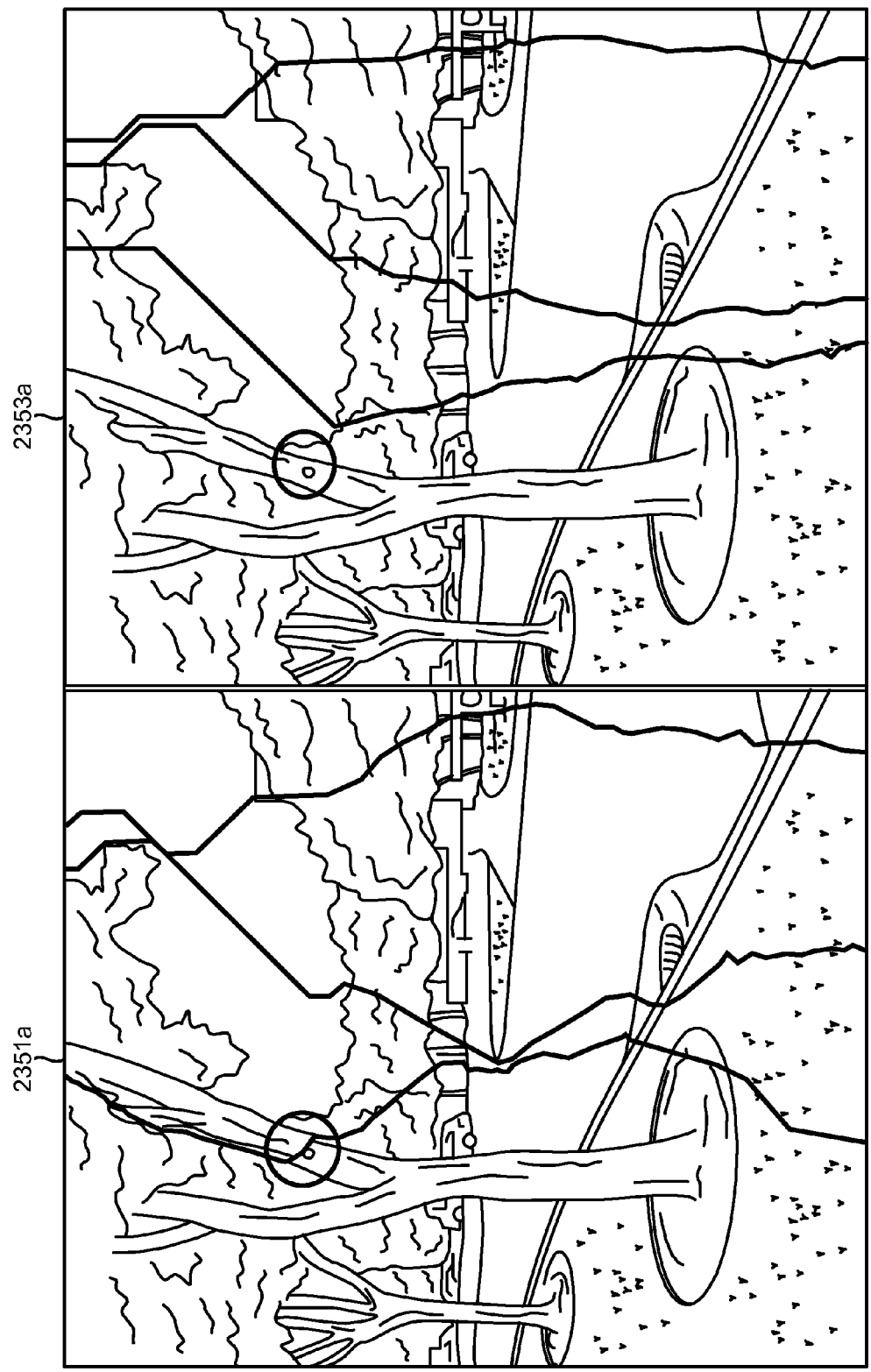
FIG. 23A

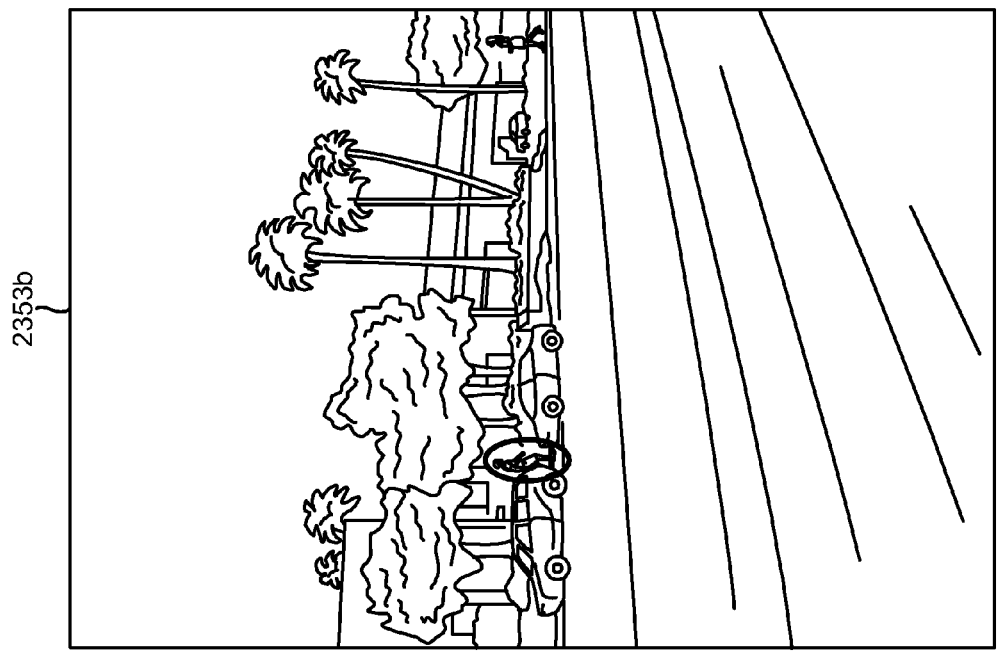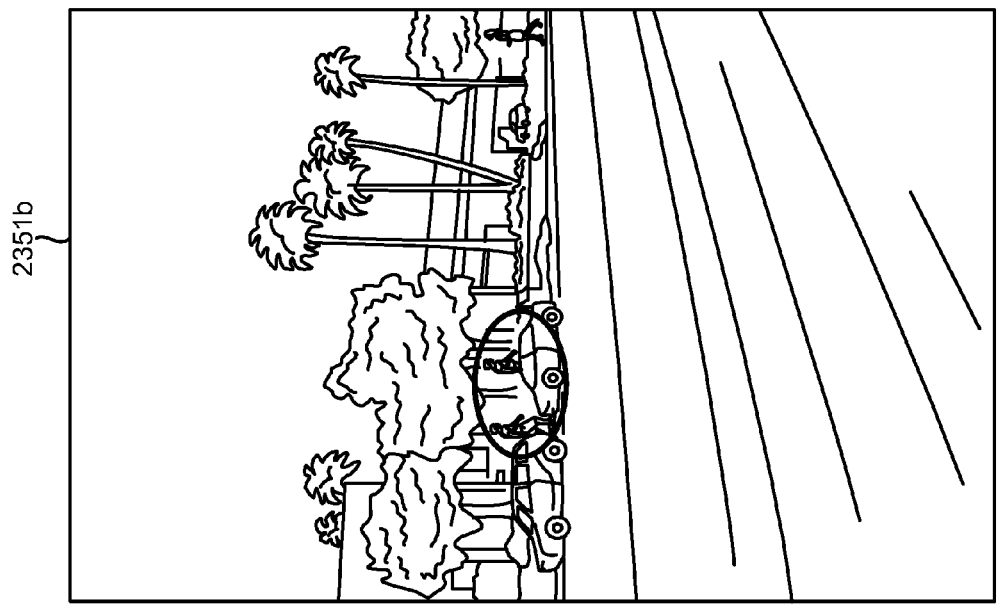
FIG. 23B

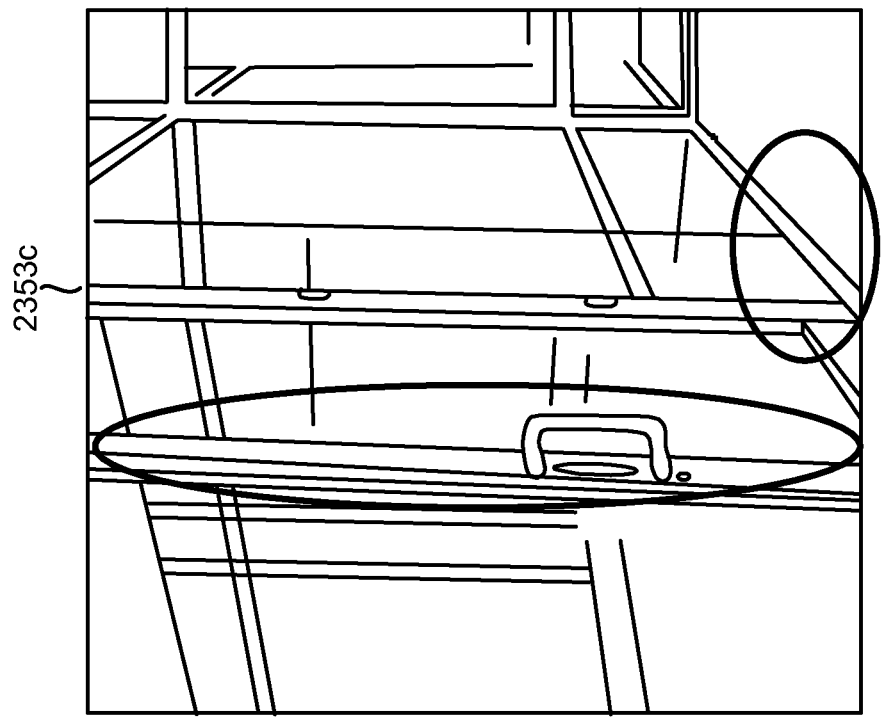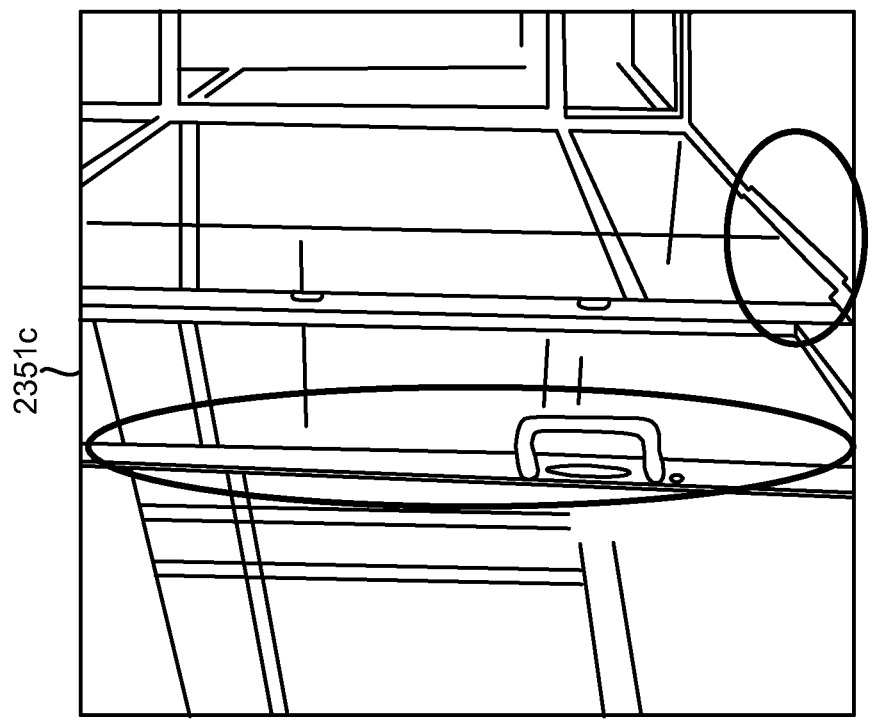
FIG. 23C

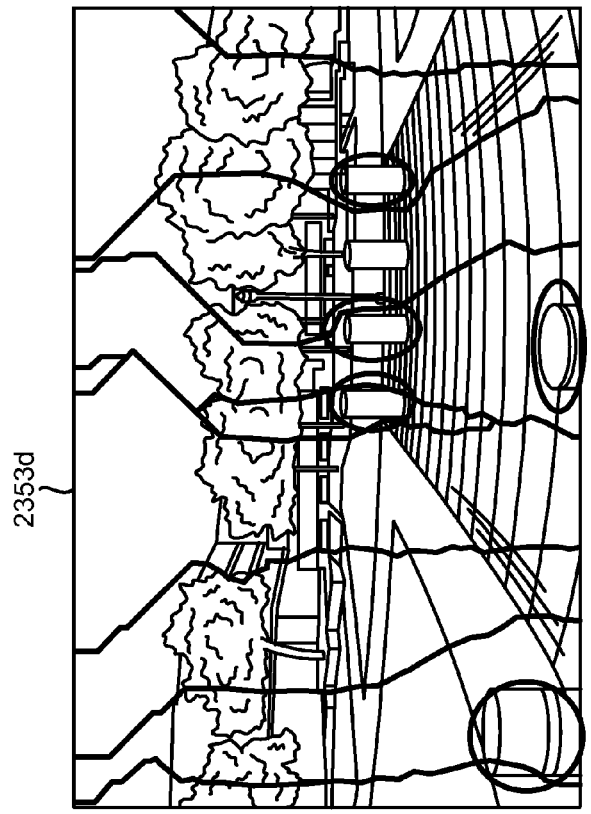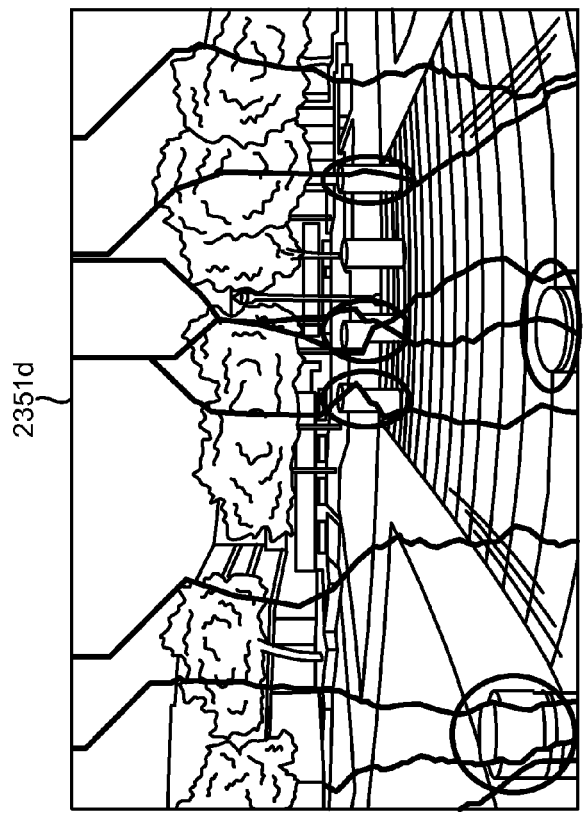
FIG. 23D

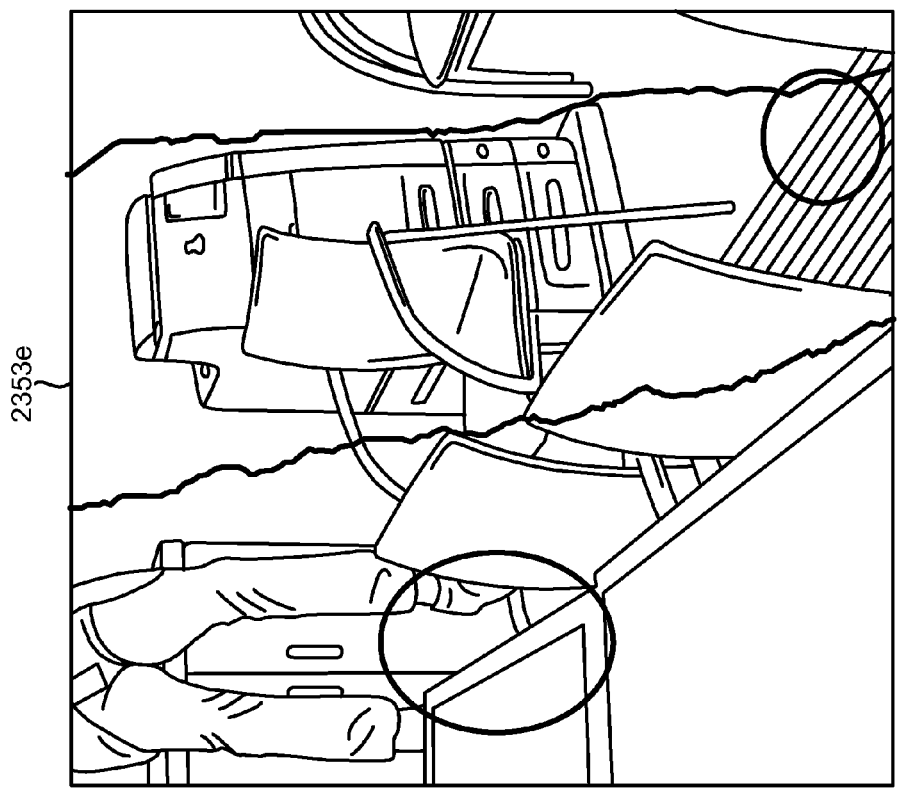
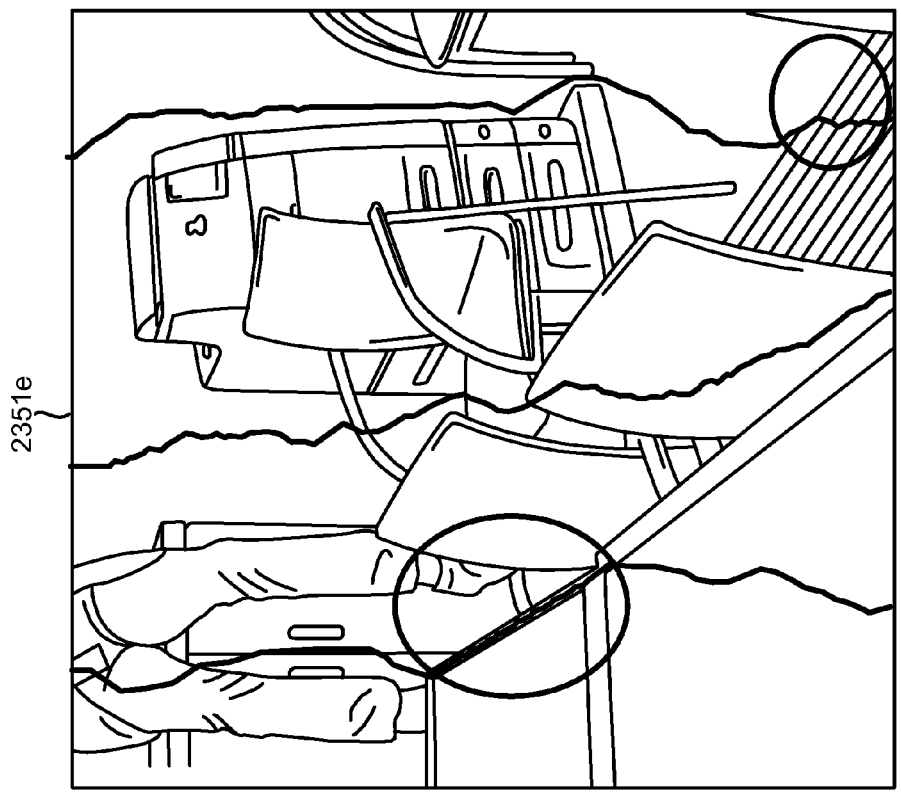
FIG. 23E

SYSTEMS AND METHODS FOR DETERMINING A SEAM

RELATED APPLICATIONS

This application is related to and claims priority to U.S. Provisional Patent Application Ser. No. 61/996,985, filed Aug. 28, 2014, for "SYSTEMS AND METHODS FOR DETERMINING A SEAM" and to U.S. Provisional Patent Application Ser. No. 62/109,567, filed Jan. 29, 2015, for "IMAGE SEAM DETERMINATION."

TECHNICAL FIELD

The present disclosure relates generally to electronic devices. More specifically, the present disclosure relates to systems and methods for determining a seam.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cameras, video camcorders, digital cameras, cellular phones, smart phones, computers, televisions, etc.) capture and/or utilize images. For example, a digital camera may capture a digital image.

It may be difficult to implement some complex processing tasks efficiently. For example, some platforms may have limited processing, memory and/or energy resources. Furthermore, increasing power efficiency and/or reducing time to complete a complex processing task may be challenging. As can be observed from this discussion, systems and methods that improve image processing may be beneficial.

SUMMARY

A method performed by an electronic device is described. The method includes determining overlapping areas from neighboring images. The method also includes determining a difference measure between the overlapping areas. The method further includes determining a constraint measure corresponding to at least one of the overlapping areas. The method additionally includes determining a seam based on a combination of the difference measure and the constraint measure.

The constraint measure may include an edge measure, a smoothness measure, or both. The constraint measure may include an edge measure. The edge measure may indicate object boundaries within the overlapping areas. The constraint measure may include a smoothness measure. The smoothness measure may indicate a curvature within the overlapping areas. The difference measure may indicate one or more moving objects within the overlapping areas.

The combination may indicate an energy level for each pixel within the overlapping areas. The energy level for each pixel within the overlapping areas may constitute an energy map. The seam may be a minimum cost path.

Determining the seam may include iteratively selecting a pixel with a minimum energy from a set of neighboring pixels. The seam in the overlapping areas may be found by determining a cumulative energy level of a current pixel and by determining a minimum cumulative energy level of four neighboring pixels and adding the minimum cumulative energy level to an energy level of the current pixel.

An electronic device is also described. The electronic device includes a processor configured to determine a smoothness measure between overlapping areas of neighboring images and to determine a seam based the smoothness measure. The electronic device also includes a memory configured to store the smoothness measure. The processor may be configured to determine the seam based on a difference measure, an edge measure, or both.

The processor may be configured to determine the smoothness measure based on a curvature within the overlapping areas. The processor may be configured to determine the smoothness measure based on a minimal error boundary (MEB) technique.

The neighboring images may include a first image and a second image. The processor may be configured to determine the smoothness measure based on a first curvature of a first portion of the first image and a second curvature of a second portion of the second image. The first portion and the second portion may correspond to the overlapping areas.

The smoothness measure may include a smoothness value for each pixel included in the first portion. The processor may be configured to determine a particular smoothness value based on a third curvature of a particular pixel in the first portion and a fourth curvature of a corresponding pixel in the second portion.

The processor may be configured to multiply the smoothness measure by a first multiplier having a first value to generate a weighted smoothness measure. The processor may be configured to determine the seam based on the weighted smoothness measure. The processor may be configured to combine the neighboring images based on the seam to generate a first combined image. The processor may also be configured to determine a quality of the first combined image. The processor may further be configured to modify the multiplier to have a second value. The processor may additionally be configured to generate a second weighted smoothness measure. The processor may also be configured to determine a second seam based on the second weighted smoothness measure.

An apparatus is also described. The apparatus includes means for determining overlapping areas from neighboring images. The apparatus also includes means for determining a difference measure between the overlapping areas. The apparatus further includes means for determining a constraint measure corresponding to at least one of the overlapping areas. The apparatus additionally includes means for determining a seam based on a combination of the difference measure and the constraint measure.

A computer-program product is also described. The computer-program product includes a non-transitory computer-readable medium with instructions. The instructions include code for causing an electronic device to determine overlapping areas from neighboring images. The instructions also include code for causing the electronic device to determine a difference measure between the overlapping areas. The instructions further include code for causing the electronic device to determine a constraint measure corresponding to at least one of the overlapping areas. The instructions additionally include code for causing the electronic device to determine a seam based on a combination of the difference measure and the constraint measure.

BRIEF DESCRIPTION OF THE DRAWINGS

FIG. 7D is a diagram illustrating an example of combining two images to form a combined image;

FIG. 21 illustrates an example of a seam for creating a panoramic image using the systems and methods disclosed herein;

FIGS. 23A-23E depict pairs of panoramic images with different size and illumination conditions;

DETAILED DESCRIPTION

Figure 1:
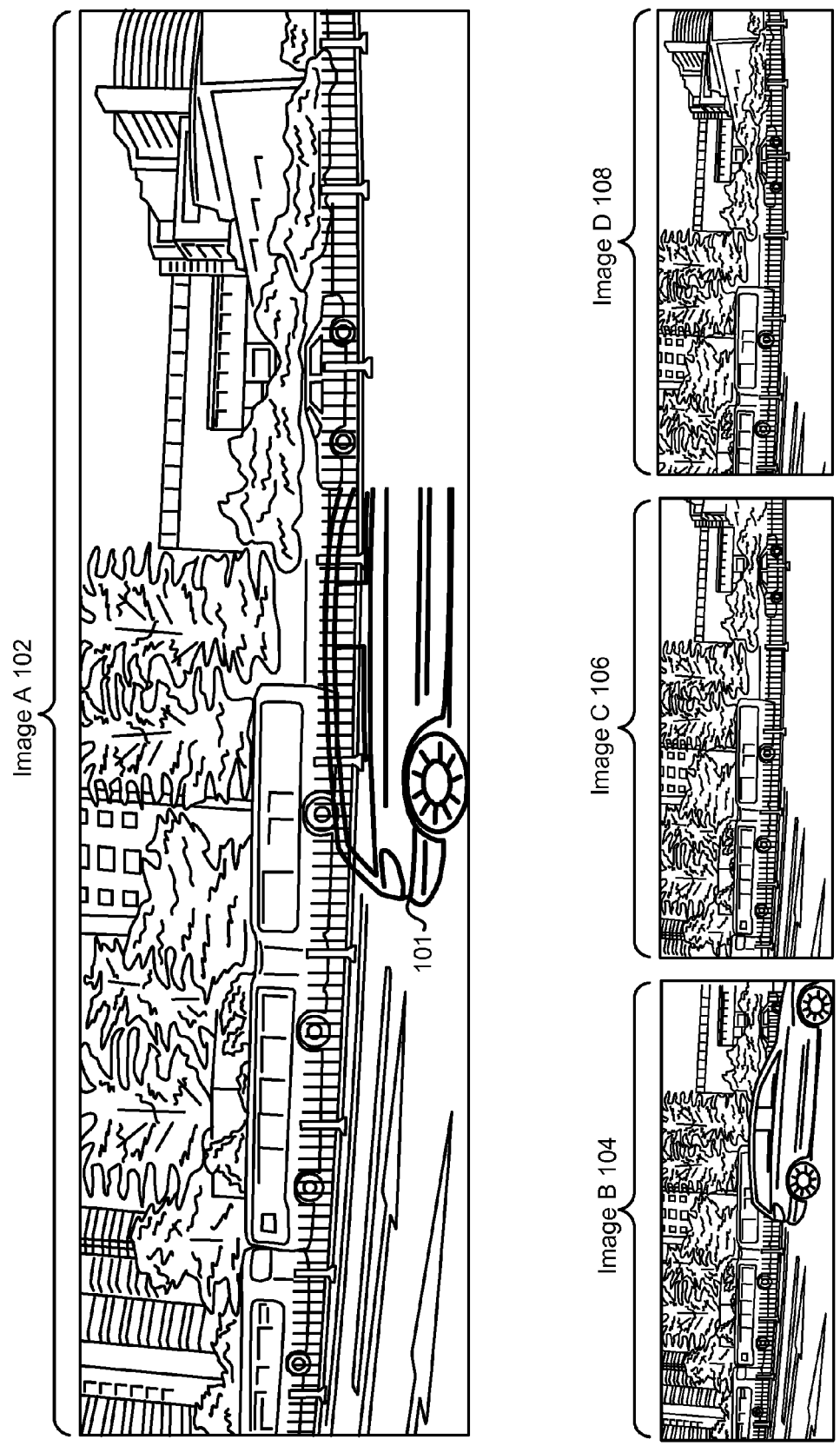
FIG. 1 illustrates an example of a panoramic image and three images used to create the panoramic image according to an approach.

When people capture images, they may want to capture a panoramic image with a device that has a panoramic feature. For example, an electronic device may take multiple images and combine the images together where they overlap to create a panoramic image. As used herein, the term "panoramic image" may generally refer to a "combined image" (e.g., an image produced by combining two or more images). In some configurations, these images may be combined using the same device that was used to capture the images (e.g., a camera, a smartphone, etc.). In other configurations, images may be combined by a device that is separate from the device that captured the images.

A device configured to combine multiple images may perform a combining process that includes image alignment and stitching to generate the combined image. Image alignment establishes geometric correspondence among the images. Stitching composes the images with similar overlapped portions of images to reduce visible seams. For example, a seam (e.g., a boundary) may be determined for the overlapped images and a portion of each image may be copied to a corresponding side of the seam. Existing stitching approaches produce errors, such as artifacts, in stitched images that may arise due to photometric inconsistency, geometric misalignment among the images, moving objects captured by one or more images, or a combination thereof. For example, during the combining process, the images may have objects that are either moving when captured or are not located within all of the images used to make the panoramic image. Movement of an object in overlapping areas of neighboring images may create artifacts such as incomplete or partial objects in the panoramic image. The produced errors may reduce an aesthetic quality of the combined image resulting from photometric inconsistency and/or misalignment, for instance.

Another example of an artifact (e.g., an error) is called a ghost artifact. A ghost artifact refers to an object, located within the overlapping areas of one or more of the images used to make a panoramic image but is not in all of the images used. This can cause the object to appear to fade or seem ghost-like in the final panoramic image. Removing or eliminating ghost artifacts and other artifacts from a panoramic image can improve the performance of devices capable of creating a panoramic image.

Proper artifact removal may result in a panoramic image that appears to either have the entire object or none of the object included. One approach may include determining if an object is moving and creating a seam that goes around the moving object. When this is done, the multiple images may be combined into a single panoramic image where the moving object is not included in the panoramic image.

Another approach to combining images to generate a combined image may use a minimal error boundary approach (which may also be referred to as an optimal seam method, for example), that searches for and determines a boundary in the overlap region where the difference between the two input images is minimal. After the boundary is determined, a portion of each image may be copied to the corresponding side of the boundary. The minimal error boundary approach may determine a boundary that is optimal in terms of intensity difference, gradient and/or smoothness, as illustrative, non-limiting examples. The smoothness may be measured by a curvature of each pixel on the boundary. In mathematics, curvature captures the intrinsic geometric properties of lines and surfaces and may be used for measuring smoothness. In some implementations, the minimal error approach may determine the boundary based on an approximation of a mean curvature, as described further herein. For example, curvature information may be incorporated into an objective function used to determine the boundary (e.g., the seam). The objective function including the curvature information may simultaneously ensure optimality and smoothness of the determined boundary, resulting in elimination or reduction of inconsistencies and effectively and efficiently correcting or reducing geometric misalignments.

Some configurations of the systems and methods disclosed herein provide a seam determination algorithm enabling image combination that may be implemented on mobile devices or any type of electronic device. These systems and methods can combine one or more images and create a reasonable single panoramic image that is connected in the overlapping areas of the original images. The panoramic image may look like one or more objects (e.g., moving objects) were not in the scene when the images were taken. Additionally or alternatively, the panoramic image may include the one or more objects that were in at least one image used to generate the panoramic image. In some implementations, the panoramic image may be generated using curvature information that eliminates or reduces photometric inconsistencies and corrects geometric misalignments corresponding to the one or more images. Accordingly, the systems and methods disclosed herein provide one or more algorithms. Details of the algorithm(s) are provided below. It should be noted that the term "object" as used herein may denote any region or area of an image. In some cases, an "object" may correspond to an entity that appears in the image.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods. It should be noted that the term "set," as used herein, may denote a set of one or more elements.

FIG. 1 illustrates an example of a panoramic image A 102 and three images B-D 104, 106, 108 used to create the panoramic image A 102 according to an approach. The panoramic image A 102 may be stitched together using neighboring images. The neighboring images may include the three images B-D 104, 106, 108. The neighboring images may have some overlapping areas which are used to align the images to make the panoramic image A 102 cover a much larger view than the three images B-D 104, 106, 108 individually. If there are moving objects that appear in different positions of the neighboring images while the three images are being captured, ghost artifacts may appear in the overlapping areas of the panoramic image A 102.

The panoramic image A 102 includes a ghost artifact 101 of a moving vehicle. The three images B-D 104, 106, 108 may include an overlapping area used to combine (e.g., "stitch") the three images B-D 104, 106, 108 together. When the neighboring images are captured, vehicles may be moving and in different locations while the three images B-D 104, 106, 108 are being captured. The neighboring images may include image B 104 that includes the moving vehicle, image C 106 that does not include the moving vehicle and image D 108 that does not include the moving vehicle. During the stitching of the panoramic image A 102, the overlapping areas containing the moving vehicle may be a combination of the moving vehicle and a background from the neighboring images. This may result in a "ghosting artifact." For example, this may give the moving vehicle a ghost-like look in the panoramic image A 102. The systems and methods disclosed herein may help to reduce or eliminate ghosting artifacts caused by moving objects.

Figure 2:
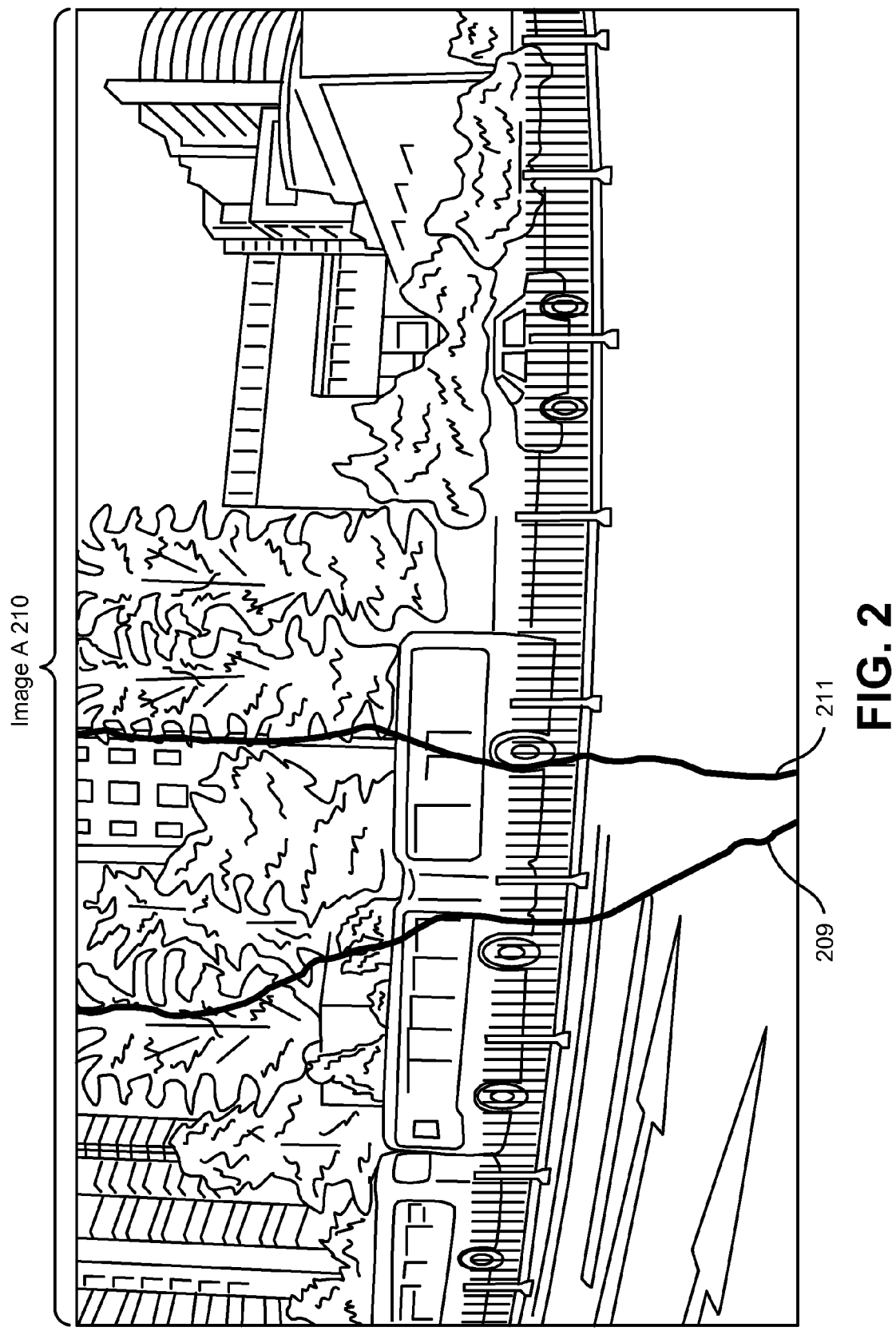
FIG. 2 is an example of a panoramic image with seams used to stitch neighboring images together.

FIG. 2 is an example of a panoramic image A 210 with seams 209, 211 used to stitch neighboring images together. The seams 209, 211 were selected using the systems and methods disclosed herein. The systems and methods disclosed herein may significantly reduce the chance of artifacts (e.g., ghosting artifacts) appearing in the panoramic image A 210 caused by moving objects or seams cutting through an object. This may be done by choosing a seam that avoids objects by detecting energy of each pixel (based on one or more energy functions, for example) in overlapping areas of the neighboring images. Images B-D 104, 106, 108 used to create the panoramic image in FIG. 2 are the same three images B-D 104, 106, 108 used in FIG. 1. The seams 209, 211 used in the creation of the panoramic image A 210 in FIG. 2 are indicated by two vertical lines and are different than the seams used in FIG. 1. The different seams 209, 211 lead to the panoramic image A 210 not having a ghost artifact of a moving vehicle. For example, the systems and methods used to create panoramic image A 210 created seams 209, 211 that went around the moving vehicle and created a more reasonable panoramic image A 210.

Figure 3:
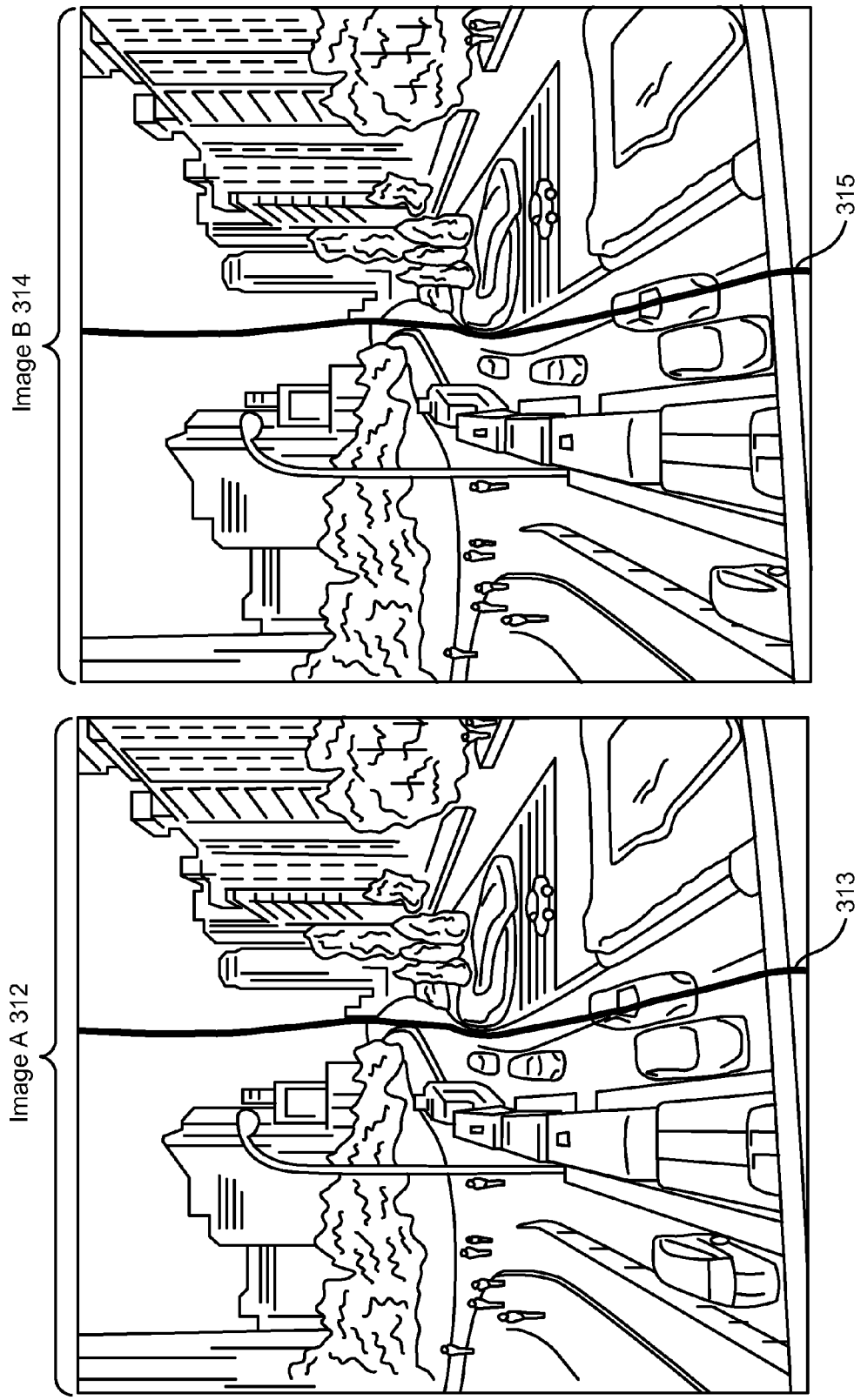
FIG. 3 illustrates an example of seams in neighboring images used to stitch a panoramic image using an approach.

FIG. 3 illustrates an example of seams in neighboring images used to stitch a panoramic image using an approach. The neighboring images may include image A 312 and image B 314. Image A 312 may be used with one or more of the neighboring images of a street with moving vehicles. In this case, the neighboring image is image B 314. The neighboring images may have an overlapping area that includes one or more moving vehicles. In known approaches, a seam may be found by determining the minimum difference in the overlapping areas of the neighboring images. Using the minimum difference to create seams may cut into an object (e.g., one or more moving objects) located in the overlapping areas and create an artifact in the panoramic image when registration is not accurate. In image A 312, the seam 313 is vertical and is indicated by a vertical line in the images and may intersect a moving vehicle. In image B 314, the seam 315 is also vertical. The seam 315 may also intersect the moving vehicle but in a different location in the image. If these seams were used to stitch a panoramic image, the moving vehicle may be cut in half and each half may be in different locations of the seam.

Figure 4:
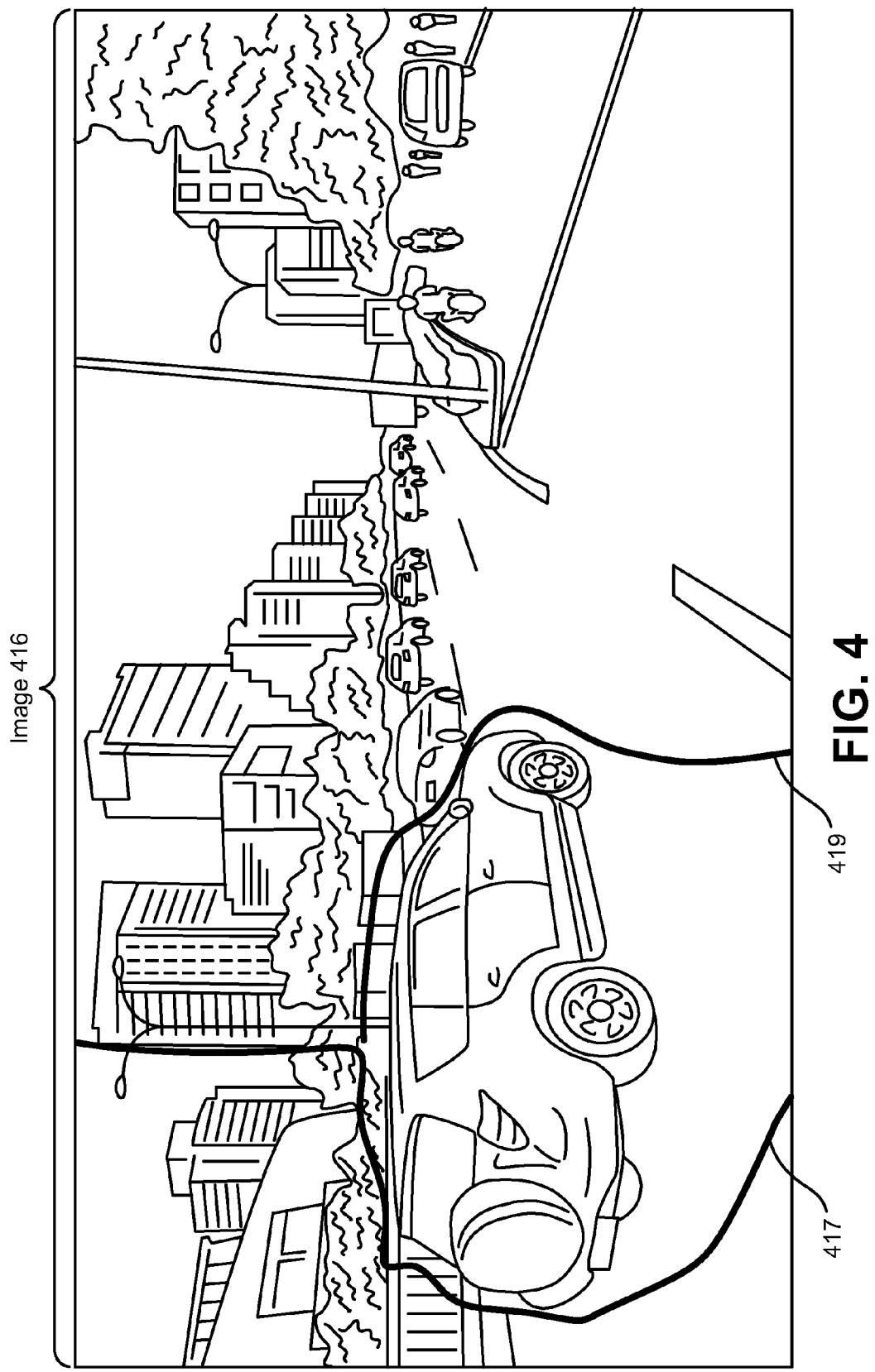
FIG. 4 illustrates an example of seams in an image used to create a panoramic image according to the systems and methods disclosed herein.

FIG. 4 illustrates an example of seams 417, 419 in an image 416 used to create a panoramic image according to the systems and methods disclosed herein. In particular, FIG. 4 illustrates two possible seams 417, 419 that go along an object without cutting into it. The image 416 is of a street that may include a moving vehicle. A seam may be created in the image 416 in two locations with either seam moving around the moving vehicle. The seams 417, 419 indicated in the image 416 may make it so the panoramic image either includes the entire vehicle or eliminates the entire vehicle from the panoramic image. Accordingly, the image may not include a partial image of the vehicle. Otherwise, other kinds of artifacts (other than ghosting artifacts) may be created. The systems and methods disclosed herein may address these artifacts (in addition to ghosting artifacts, for example). The seams 417, 419 are indicated in the image 416 by two vertical lines. If the vertical line (e.g., seam 419) on the right of the vehicle is used as the seam for stitching together the panoramic image, the panoramic image may not include the moving vehicle. If the vertical line (e.g., seam 417) on the left of the vehicle is used as the seam for stitching together the panoramic image, the panoramic image may include the moving vehicle. The seam that is used may depend on the neighboring images. If the vehicle is located in the neighboring image the vertical line (e.g., seam 417) on the left of the vehicle may be selected to include the vehicle in the panoramic image. If the neighboring images do not have the vehicle, the vertical line (e.g., seam 419) on the right of the vehicle may be selected to eliminate the entire vehicle from the panoramic image. This may reduce the chance of a ghost artifact of vehicle appearing in the panoramic image.

Figure 5:
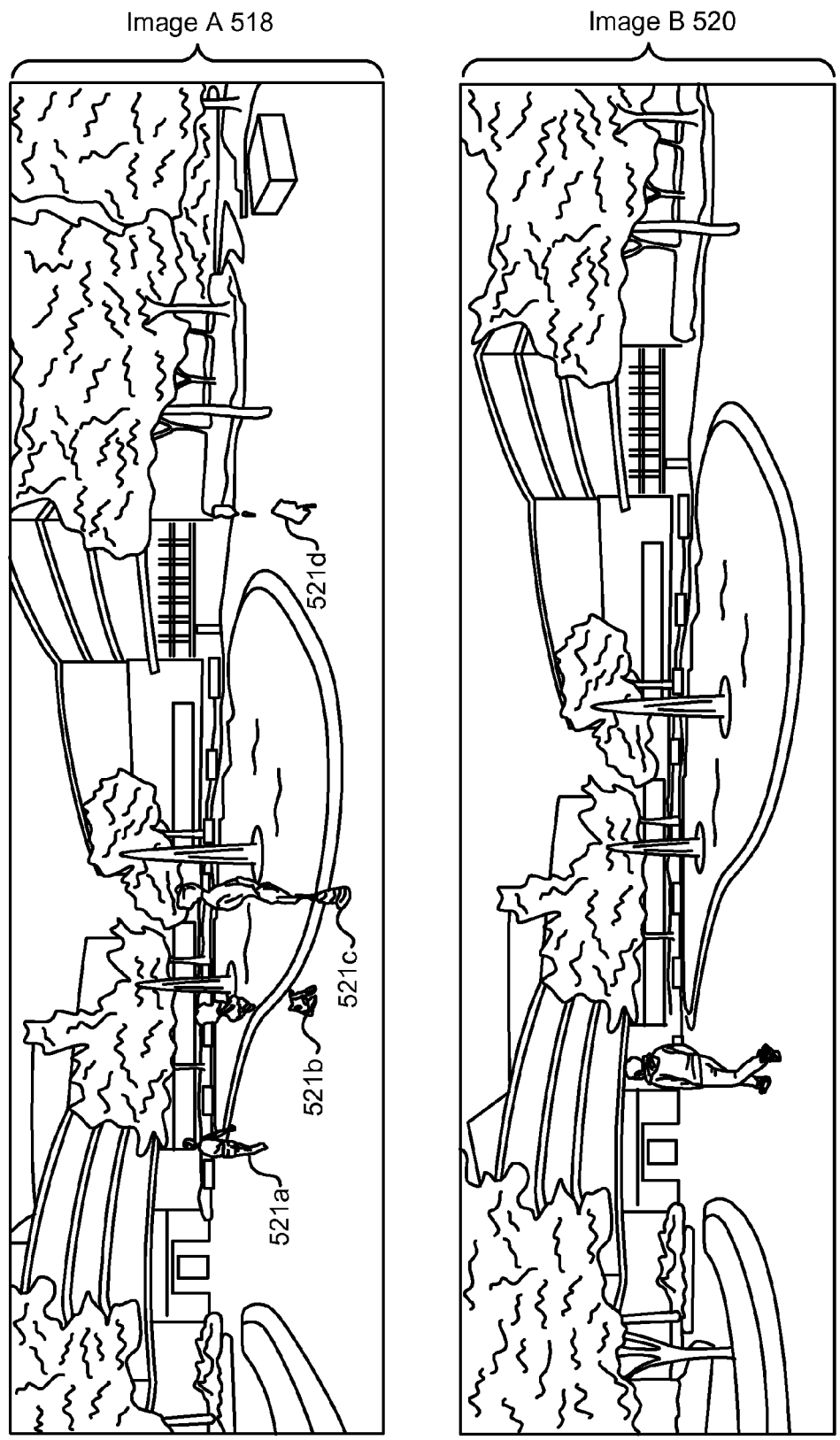
FIG. 5 is an example of two panoramic images that use different approaches to create seams for stitching together the panoramic images.

FIG. 5 is an example of two panoramic images A-B 518, 520 that use different approaches to create seams for stitching together the panoramic images A-B 518, 520. Image A 518 is a panoramic image that uses one approach to creating seams in neighboring images to create the panoramic image. In image A 518, the panoramic image includes a person that is walking through overlapping areas of the neighboring images. The seams may be made through the person and may not capture the entire person in the panoramic image 518. This may result in one or more undesirable artifacts 521a-d in the panoramic image A 518 of pieces of a person walking in the panoramic image A 518. Image B 520 is a panoramic image, where the seams are determined using the systems and methods disclosed herein. Image B 520 also includes a person walking through the overlapping areas of the neighboring images. Image B 520 does not include any artifacts of the person. The seams used to stitch the neighboring images may be chosen to go around the person, either including the entire person in the panoramic image or eliminating the entire person from the panoramic image.

Figure 6:
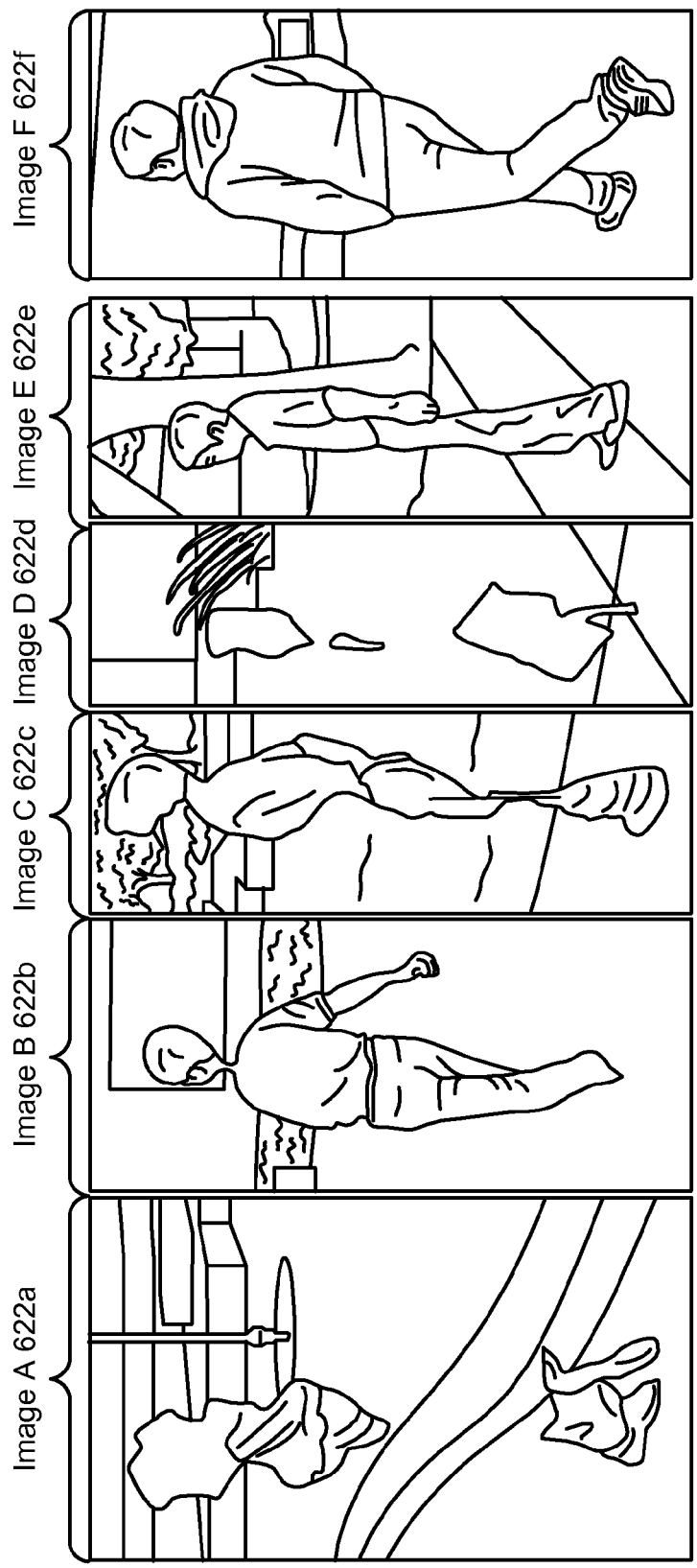
FIG. 6 illustrates examples of artifacts found in some panoramic images.

FIG. 6 illustrates examples of artifacts found in some panoramic images. Images A-E 622a-e include artifacts caused by people walking through overlapping areas of neighboring images. The neighboring images were then used to stitch together the panoramic images using an approach. For example, image B 622b includes a person's midsection and legs but is missing the person's feet and the neck. This artifact would make the panoramic image undesirable. Image F 622f is an example of a person walking through overlapping areas of the neighboring images and not becoming an artifact in the panoramic image. Image F 622f illustrates a result of using the systems and methods disclosed herein. A seam was found that included the entire image of the person and background of the image.

Figure 7A:
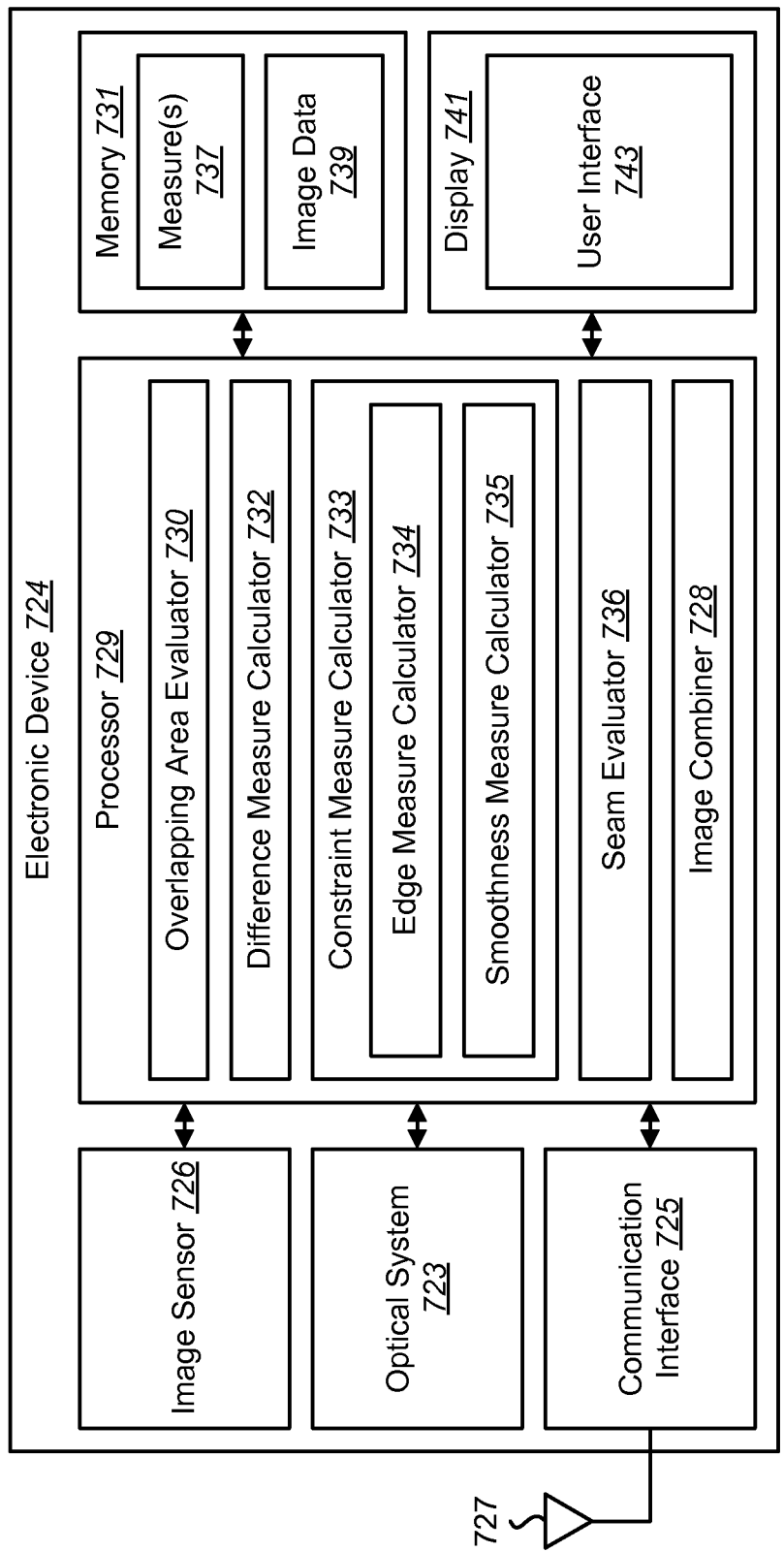
FIG. 7A is a block diagram illustrating one example of an electronic device 724 in which systems and methods for determining a seam may be implemented.

FIG. 7A is a block diagram illustrating one example of an electronic device 724 in which systems and methods for determining a seam may be implemented. Examples of the electronic device 724 include cameras, video camcorders, digital cameras, cellular phones, smart phones, computers (e.g., desktop computers, laptop computers, etc.), tablet devices, media players, televisions, automobiles, personal cameras, action cameras, surveillance cameras, mounted cameras, connected cameras, robots, aircraft, drones, unmanned aerial vehicles (UAVs), healthcare equipment, gaming consoles, personal digital assistants (PDAs), set-top boxes, etc. The electronic device 724 may include one or more components or elements. One or more of the components or elements may be implemented in hardware (e.g., circuitry) or a combination of hardware and software (e.g., a processor with instructions).

In some configurations, the electronic device 724 may include a processor 729, a memory 731, a display 741, an image sensor 726 (e.g., one or more image sensors), an optical system 723 and/or a communication interface 725. The processor 729 may be coupled to (e.g., in electronic communication with) the memory 731, display 741, image sensor 726, optical system 723 and/or communication interface 725. It should be noted that one or more of the elements illustrated in FIG. 7A may be optional. In particular, the electronic device 724 may not include one or more of the elements illustrated in FIG. 7A in some configurations. For example, the electronic device 724 may or may not include an image sensor 726 and/or optical system 723. Additionally or alternatively, the electronic device 724 may or may not include a display 741. Additionally or alternatively, the electronic device 724 may or may not include a communication interface 725. Additionally or alternatively, the processor 729 may not include one or more of the image combiner 728, the overlapping area evaluator 730, the difference measure calculator 732, the constraint measure calculator 733 and the seam evaluator 736.

The communication interface 725 may enable the electronic device 724 to communicate with one or more other electronic devices. For example, the communication interface 725 may provide an interface for wired and/or wireless communications. In some configurations, the communication interface 725 may be coupled to one or more antennas 727 for transmitting and/or receiving radio frequency (RF) signals. Additionally or alternatively, the communication interface 725 may enable one or more kinds of wireline (e.g., Universal Serial Bus (USB), Ethernet, etc.) communication. Examples of the communication interface 725 may include a USB port, Ethernet port, Wi-Fi chip and/or Bluetooth receiver, etc. One or more of the communication interfaces 725 may receive neighboring images from one or more other electronic devices. The electronic device 724 may include instructions (e.g., one or more drivers, programs, software, etc.) for operating (e.g., implementing, utilizing, etc.) the communication interface(s) 725.

In some configurations, multiple communication interfaces 725 may be implemented and/or utilized. For example, one communication interface 725 may be a cellular (e.g., 3G, Long Term Evolution (LTE), CDMA, etc.) communication interface 725, another communication interface 725 may be an Ethernet interface, another communication interface 725 may be a universal serial bus (USB) interface and yet another communication interface 725 may be a wireless local area network (WLAN) interface (e.g., Institute of Electrical and Electronics Engineers (IEEE) 802.11 ("Wi-Fi") interface).

The electronic device 724 may obtain neighboring images (e.g., digital images, still images, burst images, image frames, video, etc.). For example, the electronic device 724 may include the image sensor(s) 726 and the optical system 723 (e.g., one or more lenses) that focuses images of objects that are located within the field of view of the optical system 723 onto the image sensor 726. The image sensor 726 and/or the optical system 723 may be a camera. In some configurations, the image sensor(s) 726 may capture the neighboring images (which may be stitched together to form a panoramic image, for example). The optical system 723 may be coupled to and/or controlled by the processor 729. The neighboring images may be provided to the processor 729. For instance, upon obtaining the neighboring images, the image sensor 726 may transfer the neighboring images to the processor 729. For example, the image sensor 726 may automatically transfer the neighboring images to the processor 729 and/or may transfer the neighboring images based on a received input (e.g., a user command to capture and/or combine the neighboring images).

Additionally or alternatively, the electronic device 724 may request and/or receive the neighboring images from another device (e.g., an external image sensor coupled to the electronic device 724, a network server, traffic camera, drop camera, automobile camera, web camera, etc.). In some configurations, the electronic device 724 may request and/or receive the neighboring images via the communication interface 725. For example, the electronic device 724 may or may not include a camera (e.g., an image sensor 726 and/or optical system 723) and may receive images from a remote device (e.g., image capture device). Image data 739 (e.g., one or more images, pixel data, etc.) may be stored in the memory 731. For example, the image data 739 may include neighboring images.

The memory 731 may store instructions and/or data. The processor 729 may access (e.g., read from and/or write to) the memory 731. Examples of instructions and/or data that may be stored by the memory 731 may include image data 739 (e.g., one or more images, pixel data, etc.), one or more measures 737, energy map data, overlapping area evaluator 730 instructions, difference measure calculator 732 instructions, constraint measure calculator 733 instructions (e.g., edge measure calculator 734 instructions and/or smoothness measure calculator 735 instructions) seam evaluator 736 instructions, image combiner 728 instructions and/or instructions for one or more other elements, etc. In some configurations, the electronic device 724 (e.g., the memory 731) may include an image data buffer (not shown). The image data buffer may buffer (e.g., store) image data 739 from the image sensor 726. The buffered image data 739 may be provided to the processor 729.

In some configurations, the electronic device 724 may include a camera software application and/or a display 741. When the camera application is running, images of objects that are located within the field of view of the optical system 723 may be captured by the image sensor 726. The images that are being captured by the image sensor 726 may be presented on the display 741. In some configurations, these images may be displayed in rapid succession at a relatively high frame rate so that, at any given moment in time, the objects that are located within the field of view of the optical system 723 are presented on the display 741. The image data 739 obtained by the electronic device 724 may be one or more video frames and/or one or more still images. In some configurations, combined images (e.g., a panoramic image) may be presented on the display 741.

The processor 729 may include and/or implement an overlapping area evaluator 730, a difference measure calculator 732, a constraint measure calculator 733, a seam evaluator 736 and/or an image combiner 728. It should be noted that one or more of the elements illustrated in the electronic device 724 and/or processor 729 may be optional. For example, one or more of the elements illustrated in the processor 729 may or may not be included and/or implemented. Additionally or alternatively, one or more of the elements illustrated in the processor 729 may be implemented separately from the processor 729 (e.g., in other circuitry, on another processor, on a separate electronic device, etc.). For example, the difference measure calculator 732 may not be implemented on the electronic device 724. In some configurations, a separate device may include the image combiner 728 and/or perform image combining based on one or more seams determined by the electronic device 724.

The processor 729 may include and/or implement an overlapping area evaluator 730. The overlapping area evaluator 730 may determine (e.g., find) overlapping areas in the neighboring images. For example, the overlapping area evaluator 730 may use image registration approaches to align the images in the neighboring images to obtain overlapping areas. In some configurations, the overlapping area evaluator 730 may utilize the overlapping areas to create an error surface and/or an energy map. If the overlapping areas are not adequately aligned, the error surface and/or energy map may not be based on the real differences in the overlapping areas of the neighboring images. This may cause a selected seam to be based on an erroneous surface error or energy map. Accordingly, the overlapping area evaluator 730 may extract the overlapping areas of the neighboring images. An example of overlapping area determination is given in connection with FIG. 11.

The processor 729 may include and/or implement a difference measure calculator 732. The difference measure calculator 732 may determine (e.g., calculate) a difference measure in each of (e.g., between) the overlapping areas. For example, the difference measure calculator 732 may determine a difference value for each pixel included in the overlapping areas. In some configurations, the difference measure may be expressed in terms of $d_{ij}$ (e.g., $d_{ij}$ or $d_{ij}^2$, where i and j are pixel indices). An example of determining a difference measure is given in connection with FIG. 12. The difference measure may be used (by the seam evaluator 736, for example) to find a seam on pixels where the differences between the images are small (e.g., minimal). The difference measure may indicate a difference between images (e.g., neighboring images). Some examples of the difference measure may be based on squared image intensity differences, absolute image intensity differences, squared color distances and/or other image differences (as illustrative, non-limiting examples). The squared image intensity differences may be based on the intensity of a current pixel (e.g., corresponding pixels) in two images in the neighboring images to determine the difference measure for the current pixel. The squared differences are positive. For example, the squared image intensity differences may be expressed in accordance with Equation (1):

$$d_{ij}^2 = (I_{ij}^1 - I_{ij}^2)^2 \tag{1}$$

where $I^1$ and $I^2$ are the first and second images in the neighboring images (e.g., image pair), i and j are the respective row and column location of a current pixel and d is the difference measure.

The absolute differences of image intensity may be based on the intensity of a current pixel (e.g., corresponding pixels) in the two images in the neighboring images to determine the difference measure (e.g., a difference value) for the current pixel. For example, the absolute image intensity difference may be expressed in accordance with Equation (2):

$$d_{ij} = |I_{ij}^1 - I_{ij}^2| \tag{2}$$

where $I^1$ and $I^2$ are the first and second images in the neighboring images (of the overlapping area, for instance).

The squared color distances may be based on the R, G and B color values (e.g., red, green and blue color values) of the current pixel (e.g., corresponding pixels) in the two images in the neighboring images to determine the difference measure for the current pixel. For example, the equation for the squared color distances may be:

$$d_{ij}^2 = (R_{ij}^1 - R_{ij}^2)^2 + (G_{ij}^1 - G_{ij}^2)^2 + (B_{ij}^1 - B_{ij}^2)^2 \quad (3)$$

$R^1$, $R^2$, $G^1$, $G^2$, $B^1$ and $B^2$ are color values of the current pixel in the first and second images in the neighboring (color) images, where 1 denotes the first image and 2 denotes the second image. The squared differences are positive. It should be noted that alternative color spaces (e.g., CMYK) may be utilized instead of RGB in some configurations.

The difference measure (e.g., the difference value) may indicate pixels that have different intensity levels and/or color values, which may allow the seam to be made along pixels that have similar intensity levels and/or color values. For example, if a pixel in a first image has a low intensity (e.g., has a dark color in it) and the same overlapping pixel in a second image has a high intensity (e.g., has a light color in it), the difference measure would be high and that pixel may not be used for a seam.

If the seam were determined based on just the difference measure, the seam may be used to generate a panoramic image that includes errors, such as artifacts. For example, when the seam is determined based on just the difference measure, the seam may cut into an object (e.g., moving object and/or stationary object) in the overlapping areas. As another example, the seam may be used to produce a panoramic image that includes photometric inconsistencies and geometric misalignment among the images. These problems may be reduced (e.g., ameliorated, mitigated, overcome, etc.) by basing the seam on a different measure (e.g., one or more constraint measures) or more than just the difference measure. For example, the seam may be determined based on one or more constraints (e.g., one or more constraint measures), such as one or more constraints that may be included in an energy function used to determine the seam. To illustrate, one or more object descriptions and/or constraints (e.g., edge measures) may be added to the energy function. As previously stated, it is noted that the term "object" as used herein may denote any region or area of an image. Examples of constraints that may be utilized in accordance with the systems and methods disclosed herein are given herein.

It should be noted that one constraint or a combination of constraints may be implemented in accordance with the systems and methods disclosed herein. In some implementations, the one constraint or the combination of constraints may be used along with the difference measure to determine the energy function. In other implementations, the energy function may be determined, independent of the difference measure, using the one constraint or the combination of constraints. For example, the electronic device 724 may not include the difference measure calculator 732 and/or may determine a seam based on one or more constraint measures and not on a difference measure, as described herein.

The processor 729 may include and/or implement a constraint measure calculator 733. The constraint measure calculator 733 may determine (e.g., generate, calculate, etc.) one or more constraint measures (corresponding to one or more overlapping areas, for example). In some configurations, a constraint measure may be denoted $C_{ij}$. Examples of constraint measures may include an edge measure, a smoothness measure and/or others. The one or more constraint measures may be utilized (by the seam evaluator 736, for example) to improve seam determination (e.g., seam selection). The resulting seam(s) may be utilized to combine (e.g., join) two or more images. For example, the one or more constraint measures may enhance the quality and results of stitching a panoramic image. In some configurations, the constraint measure calculator 733 may include an edge measure calculator 734 and/or a smoothness measure calculator 735. In some implementations, the constraint measure calculator 733 may include only one of the edge measure calculator 734 and the smoothness measure calculator 735. Additionally or alternatively, the constraint measure calculator 733 may include one or more calculators other than the edge measure calculator 734 and/or the smoothness measure calculator 735.

The edge measure calculator 734 may determine (e.g., calculate) a constraint measure ($C_{ij}$) as an edge measure. The edge measure may be indicative of an edge of an object included in an image. In some configurations, the edge measure may be utilized (by the seam evaluator 736, for example) to improve the determination (e.g., selection) of the seam. For instance, the edge measure may help ensure that the seam does not cut into one or more moving objects and/or stationary objects located within the overlapping areas and may reduce the chance of having artifacts in the panoramic image. For example, the edge measure may enhance avoidance of cutting into a moving object. The edge measure may improve the quality and results of stitching the panoramic image. An example of determining an edge measure is given in connection with FIG. 14.

The edge measure may be based on a gradient, a histogram of gradients and/or a sum of color differences with neighboring pixels, as illustrative, non-limiting examples. In particular, examples of the edge measure may include a squared magnitude of the gradient, a sum of absolute of gradient values, a squared magnitude of the gradient divided by a histogram of gradients, a sum of absolute of gradient values divided by the histogram of gradients, a sum of color differences and Canny edge, as illustrative, non-limiting examples.

In some configurations, the edge measure calculator 734 may determine a constraint measure ($C_{ij}$) based on a gradient. For example, a constraint measure ($C_{ij}$) may be associated with the squared magnitude of the gradient or the sum of the absolute of gradient values at the current pixel of an image. To illustrate, the constraint measure ($C_{ij}$) may be determined using an x-dimensional gradient and a y-dimensional gradient of the current pixel. Equations (4) and (5) provide examples of equations for calculating the constraint measure ($C_{ij}$) based on the gradient constraint.

$$C_{ij}^2 = \left(\frac{\partial I_{ij}}{\partial x}\right)^2 + \left(\frac{\partial I_{ij}}{\partial y}\right)^2 \quad (4)$$

$$|C_{ij}| = \left|\frac{\partial I_{ij}}{\partial x}\right| + \left|\frac{\partial I_{ij}}{\partial y}\right| \text{ or } C_{ij} = \left|\frac{\partial I_{ij}}{\partial x}\right| + \left|\frac{\partial I_{ij}}{\partial y}\right| \quad (5)$$

where $$\frac{\partial I_{ij}}{\partial x}$$

is the x-dimensional gradient and $$\frac{\partial I_{ij}}{\partial y}$$

is the y-dimensional gradient. Equation (4) illustrates an example of the squared magnitude of the gradient. Equation (5) illustrates examples of the sum of the absolute of gradient values at image $I_{ij}$. One or more of these constraints may be utilized to guide a seam to avoid cutting through (e.g., traversing) edges.

Additionally or alternatively, the edge measure calculator 734 may determine a constraint measure ($C_{ij}$) based on a histogram of gradients (HoG). For example, a constraint measure ($C_{ij}$) may be the sum of the absolute of gradient values at the current pixel divided by the histogram of gradients for the entire image (e.g., I). The gradient constraint may use the x-dimensional gradient and the y-dimensional gradient of the current pixel. Equation (6) provides one example of an equation for calculating the constraint measure ($C_{ij}$) utilizing the histogram of gradients.

$$C_{ij} = \frac{\left|\frac{\partial I_{ij}}{\partial x}\right| + \left|\frac{\partial I_{ij}}{\partial y}\right|}{\max(HoG(I(i,j)))} \quad (6)$$

where HoG(I(i, j)) is the histogram of gradients of the image I, $$\frac{\partial I_{ij}}{\partial x}$$

is the x-dimensional gradient and $$\frac{\partial I_{ij}}{\partial y}$$

is the y-dimensional gradient.

Additionally or alternatively, the edge measure calculator 734 may determine a constraint measure ($C_{ij}$) based on a sum of color difference with neighboring pixels. For instance, a constraint measure ($C_{ij}$) may be a sum of normed vector spaces of pixel differences between two images. For example, Equation (7) provides an example of an equation for a sum of color differences.

$$C_{ij} = \|I^1(i) - I^2(i)\| + \|I^1(j) - I^2(j)\| \quad (7)$$

where $I^1$ and $I^2$ are the first and second images (e.g., overlapping areas or overlapping images) in the neighboring images and j is the neighboring pixel of i.

The smoothness measure calculator 735 may be configured to determine (e.g., calculate) a constraint measure ($C_{ij}$) as a smoothness measure. The smoothness measure may be indicative of a curvature (e.g., a shape descriptor) of an image and/or of an object included in the image. The smoothness measure (e.g., a curvature measure) may be utilized (by the seam evaluator 736, for example) to improve the determination (e.g., selection) of the seam. For example, the use of the smoothness measure may reduce and/or eliminate photometric inconsistency, geometric misalignment among the images and/or artifacts in the combined image. A constraint measure ($C_{ij}$), such as the smoothness measure, may be based on a curvature corresponding to a pixel (or an image), as described herein.

When calculating a curvature of a pixel, for example, an image may be considered as one or more surfaces in which surface heights are proportional to pixel intensity values. For instance, image stitching may form a new surface from pixels on corresponding sides of the boundary (e.g., seam) of the overlapped input images. For three-dimensional (3D) surfaces, examples of curvatures that can be used (e.g., calculated) include mean curvature and Gaussian curvature. Mean curvature may be defined as the mean of two-dimensional (2D) principal curvatures (measured from two orthogonal directions which have maximum and minimum bending rates, for example). The Gaussian curvature may be defined as the product of the two principal curvatures. It should be noted that the Gaussian curvature may be difficult to approximate and may not be a shape descriptor in a case where the minimal curvature is zero (for a cylinder, for example). One example of a curve is described in connection with FIG. 7C.

In some configurations, the smoothness measure calculator 735 may utilize a mean curvature in determining a curvature of a pixel, which may be utilized to determine (e.g., select) a seam. The mean curvature may be approximated by the smoothness measure calculator 735 based on two orthogonal directions, such as an x-direction and a y-direction. The mean curvature may be indicative of a shape. For example, the mean curvature may be indicative of a shape (e.g., may be a shape descriptor) in cases where a minimal curvature is zero, such as in the case of a cylinder. It should be noted that when a surface is unknown in advance of determining curvature, it can be challenging to compute the exact curvature. Accordingly, an approximation of the curvature may be computed rather than determining the exact curvature in some configurations.

To approximate the mean curvature, the x-direction and the y-direction may be used in some approaches. It should be noted that other directions may be utilized in other approaches. Using the x and y directions may provide flexibility in determining the mean curvature by enabling the curvature computation to be decoupled in two directions. The curvatures in the two directions may be referred to herein as the x-curvature and y-curvature, respectively. Each x and y curvature may be the curvature of a 2D curve. For a 2D curve given explicitly as a function of y=f(x), its curvature may be expressed as $$K = \frac{|y''|}{(1 + y'^2)^{3/2}},$$

where y' is a first derivative of y and y" is a second derivative of y. For a more general curve with parametrization s(t)=(x(t), y(t)), its curvature at s(t) may be expressed as $$K(t) = \frac{\dot{x}(t)\ddot{y}(t) - \dot{y}(t)\ddot{x}(t)}{(\dot{x}(t)^2 - \dot{y}(t)^2)^{3/2}},$$

where $\dot{x}(t)$ is a first derivative of x(t), $\ddot{x}(t)$ is a second derivative of x(t), $\dot{y}(t)$ is a first derivative of y(t) and $\ddot{y}(t)$ is a second derivative of y(t). One example of an approach to approximate the mean curvature of a pixel is described in connection with FIG. 7B.

It should be noted that although the edge measure calculator 734 and the smoothness measure calculator 735 have been described separately, the edge measure calculator 734 and the smoothness measure calculator 735 may be combined in some implementations. For example, one or more operations performed by the smoothness measure calculator 735 may be performed by the edge measure calculator 734. Additionally, it is noted that the smoothness measure may be indicative of and/or used to identify an edge of an object included in an image and may be considered as an edge measure. Accordingly, the edge measure calculator 734 may be configured to determine the constraint measure ($C_{ij}$) based on curvature in some configurations.

Additional or alternative constraints may be calculated and/or utilized by the constraint measure calculator 733. For example, one or more objects in one or more images may be (automatically and/or manually) segmented first. Regions of the objects may be set with high values (e.g., energy values) to avoid the seam entering into the regions. One or more other constraints may be constructed, one or more of which may be characterized as an edge measure. For example, one or more constraints may be constructed with other edge or feature detection operations such as Laplacian of Gaussian (LOG) operators, corner detection, line detection and/or others. In some configurations, one or more measures 737 may be stored in the memory 731. For example, a difference measure and/or one or more constraint measures (e.g., edge measure, smoothness measure, etc.) may be stored in the memory 731.

The seam evaluator 736 may determine (e.g., select) a seam. For example, the seam evaluator 736 may determine one or more seams based on the difference measure and/or one or more constraint measures (e.g., edge measure, smoothness measure, etc.). For instance, the seam evaluator 736 may determine which pixels to use for the seam based on the difference measure and the constraint measure(s).

In some configurations, the seam evaluator 736 may utilize image differences (e.g., the difference measure) and one or more constraints (e.g., the edge measure and/or smoothness measure) in overlapping areas. For example, a function may be defined based on an image difference value and one or more constraint values (e.g., edge measure and/or smoothness measure) at each pixel of the overlapping area of an image pair to create an energy map (e.g., a set of energy levels $e_{ij}$ corresponding to pixels in the overlapping area) or image difference map. For example, the seam evaluator 736 may calculate $e_{ij}$ in accordance with Equation (8).

$$e_{ij}=d_{ij}+C_{ij} \quad (8)$$

In some configurations, a weight value (e.g., a multiplier) may be used to determine $e_{ij}$. For example, the seam evaluator 736 may calculate $e_{ij}$ in accordance with Equation (9).

$$e_{ij}=(d_{ij})+\alpha(C_{ij}) \quad (9)$$

where α is multiplier that corresponds to the constraint measure ($C_{ij}$). In some configurations, another multiplier that is the same as a or different than a may correspond to the difference measure ($d_{ij}$). Each multiplier used to determine $e_{ij}$ may have a corresponding value that is greater than or equal to zero.

In configurations where the difference measure ($d_{ij}$) is the squared image intensity differences and where the constraint measure ($C_{ij}$) is based on curvature, Equation (9) may be expressed in accordance with Equation (10).

$$e_{ij}=|I^1(i,j)-I^2(i,j)|^2+\alpha(|\vec{K}^1(i,j)|^2+|\vec{K}^2(i,j)|^2) \quad (10)$$

where $I^1$ and $I^2$ are the first and second images (e.g., overlapping areas or overlapping images) in the neighboring images, $K^1$ and $K^2$ are curvature measures corresponding to the first and second images (e.g., overlapping areas or overlapping images), $e_{ij}$ is a set of energy levels (e.g., a cost function) and i and j are pixel indices.

In other configurations, $e_{ij}$ may be determined based on multiple constraint measures. For example, the seam evaluator 736 may calculate $e_{ij}$ in accordance with Equation (11).

$$e_{ij}=d_{ij}+C1_{ij}+C2_{ij} \quad (11)$$

where $C1_{ij}$ is a first constraint measure, such as an edge measure and $C2_{ij}$ is a second constraint measure, such as a smoothness measure. In some configurations where $e_{ij}$ is determined using multiple constraint measures, each constraint measure may be multiplied by a corresponding weight value, as described above with reference to Equation (9). In some implementations, $e_{ij}$ may be determined using one or more constraint measures and without using the difference measure ($d_{ij}$).

In yet other configurations, the seam evaluator 736 may calculate $e_{ij}$ in accordance with Equation (12).

$$e_{ij}=d_{ij}+C_{ij}+C_{others} \quad (12)$$

where $C_{others}$ denotes one or more optional additional constraints (e.g., edge measure(s), smoothness measure(s), etc.). For example, a combination of one or more of the constraints described above (e.g., expressed in Equations (4)-(7)) may be utilized (e.g., cumulatively utilized) in the function expressed in Equation (12). It should be noted that in some configurations, only one constraint $C_{ij}$ may be utilized. In some configurations, the energy map (e.g., energy levels) may be expressed as $e=(I^1-I^2)^2+$ObjectDescription, where $I^1$ is the overlapping area of the first image, $I^2$ is the overlapping area of the second image and ObjectDescription denotes the one or more constraints (e.g., edge measure(s) and/or smoothness measure(s), etc.) utilized, such as one or more constraint measures ($C_{ij}$). For example, Equation (12) may include squared differences of two adjacent images in the overlapping areas and enhancement. Stated in a different manner, the ObjectDescription may be viewed as an enhancement (e.g., an enhancement value) that is added to the squared differences to improve e and to generate an improved seam as compared to a seam determined based on $e=(I^1-I^2)^2$, where the ObjectDescription is not added to enhance the squared differences.

In some configurations, the difference measure ($d_{ij}$) and/or the constraint measure ($C_{ij}$) (e.g., the edge measure and/or the smoothness measure) may be normalized prior to determining $e_{ij}$, as described with reference to FIG. 15. For example, the difference measure calculator 732 may be configured to normalize the difference measure ($d_{ij}$). As another example, the constraint measure calculator(s) 733 (e.g., the edge measure calculator 734 and/or the smoothness measure calculator 735) may be configured to normalize the constraint measure ($C_{ij}$). Additionally or alternatively, the seam evaluator 736 may be configured to normalize the difference measure ($d_{ij}$) and/or the constraint measure ($C_{ij}$).

In some implementations, the seam evaluator 736 may be configured to adjust one or more multipliers, as described with reference to Equations (8)-(12), used to determine $e_{ij}$. For example, the seam evaluator 736 may dynamically adjust the value of the multiplier before, after, or during combining multiple images to generate a combined image. In some implementations, the value of the multiplier may be adjusted in response to an input. For example, the input may be a user input that indicates a particular value that is to be set as the value of the weight. As another example, the input may indicate or identify a number of errors included in a combined image and the value of the weight may be adjusted responsive to the input. The errors and/or the number of errors may be detected (e.g., identified) automatically by the processor 729 (e.g., seam evaluator 736, image combiner 728, etc.) or based on user input, such as user feedback based on the combined image.

The energy map may indicate one or more moving objects and/or stationary objects. For example, relatively higher values in the energy map may correspond to pixels in the overlapping area where one or more moving objects are located. For instance, both the difference measure and edge measure may be used to create an energy map that indicates one or more moving objects and/or stationary objects. Examples of creating an energy map are given in connection with FIGS. 15-16. Accordingly, the difference measure and the edge measure may be utilized to create a seam around one or more of the objects.

An energy function may be defined by accumulating the energy map (e.g., energy levels) to create a cumulative energy map. In other words, the energy levels (e.g., $e_{ij}$) may be utilized to create a cumulative energy map (e.g., a set of cumulative energy levels $E_{ij}$) corresponding to the pixels located within the overlapping areas. In some configurations, the electronic device 724 (e.g., seam evaluator 736) may determine (e.g., find) a seam by determining a cumulative energy level of a current pixel, determining a minimum cumulative energy level of neighboring pixels (e.g., four neighboring pixels) and adding the minimum cumulative energy level to an energy level of the current pixel. Examples of determining a seam based on a cumulative energy map are given in connection with FIG. 9.

The image combiner 728 may combine two or more images. In some configurations, combining the two or more images may include creating a union between pixels of multiple images. For example, the image combiner 728 may combine (e.g., stitch) two or more images along one or more seams (provided by the seam evaluator 736, for instance). Combining neighboring images may result in a combined image (e.g., panoramic image). The image combiner 728 may optionally discard unused pixels. In some configurations, the image combiner 728 may crop the resulting panoramic image. For example, the image combiner 728 may trim off outer edge pixels in order to make the panoramic image rectangular in shape.

In some configurations, the electronic device 724 may present a user interface 743 on the display 741. For example, the user interface 743 may enable a user to interact with the electronic device 724. In some configurations, the display 741 may be a touchscreen that receives input from physical touch (by a finger, stylus or other tool, for example). Additionally or alternatively, the electronic device 724 may include or be coupled to another input interface. For example, the electronic device 724 may include a camera facing a user and may detect user gestures (e.g., hand gestures, arm gestures, eye tracking, eyelid blink, etc.). In another example, the electronic device 724 may be coupled to a mouse and may detect a mouse click. It should be noted that no user input may be necessary in some configurations. For example, the electronic device 724 may automatically determine a seam.

It should be noted that the systems and methods disclosed herein may improve combined (e.g., stitched) image quality. For example, one benefit of the systems and methods disclosed herein is that a good seam (e.g., path) may be determined or found with a smaller number of images. In some configurations, the systems and methods disclosed herein may combine the use of pixel differences, gradients and curvature into one objective function. For example, the systems and methods disclosed herein may provide an efficient algorithm for improved (e.g., optimal) smooth seam determination.

Figure 7B:
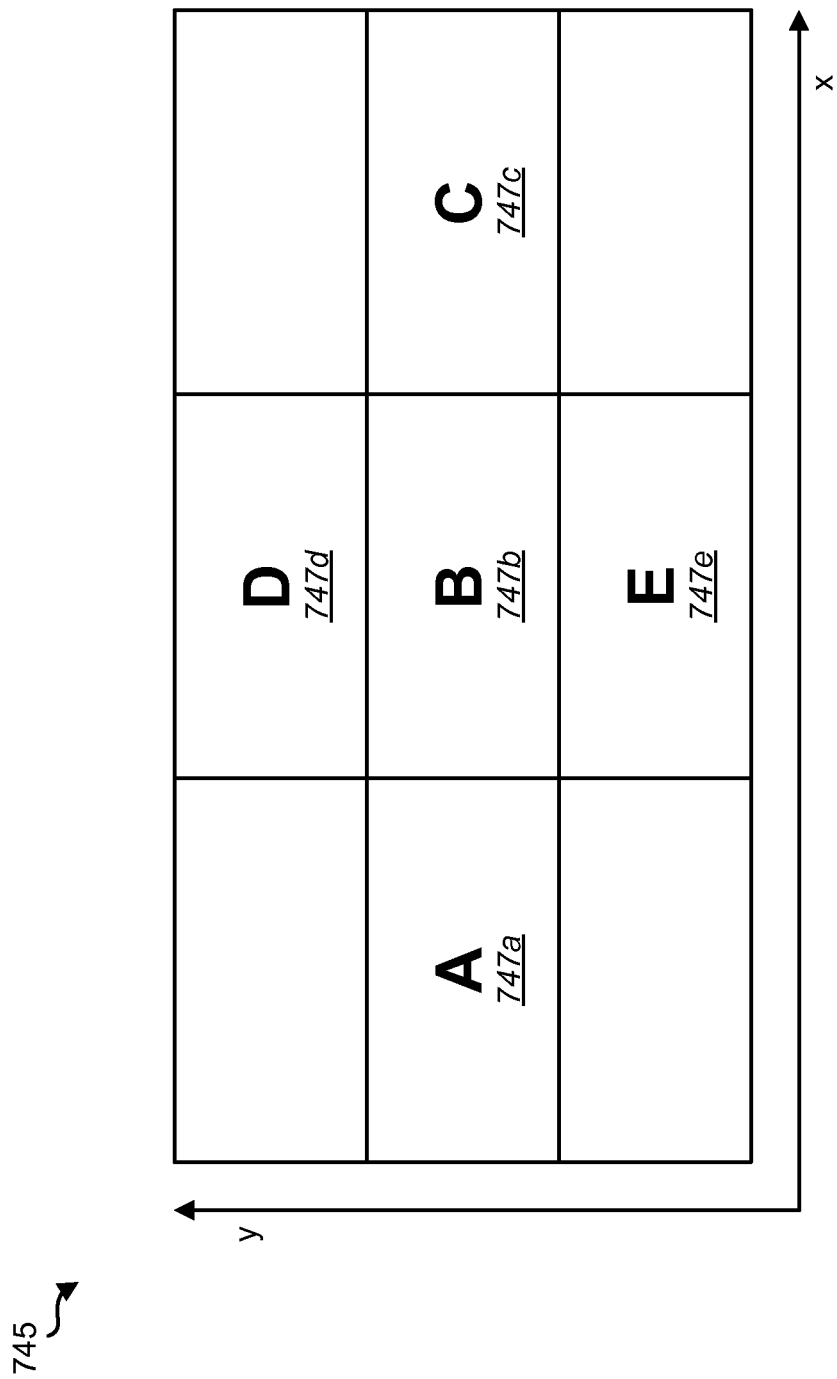
FIG. 7B is a diagram illustrating an example of an approach for determining a mean curvature.

FIG. 7B is a diagram illustrating an example of an approach for determining a mean curvature. In particular, FIG. 7B illustrates a group of pixels 745 in a 3 by 3 configuration (e.g., a 3 by 3 neighborhood). The group of pixels includes pixel A 747a, pixel B 747b, pixel C 747c, pixel D 747d and pixel E 747e. Approximation of a mean curvature of pixel B 747b in a 3×3 neighborhood may be performed as following in some configurations.

Referring to pixel B 747b, $I_B$ is the value of pixel B 747b, such as a pixel intensity value. Equations (13) and (14) calculate first derivative and second derivative of pixel B 747b in x and y directions, respectively.

$$d_x = \frac{(I_C - I_A)}{2}, d_{xx} = I_C + I_A - 2 * I_B \qquad (13)$$

$$d_y = \frac{(I_E - I_D)}{2}, d_{yy} = I_E + I_D - 2 * I_B \qquad (14)$$

where $d_x$ is the first derivative in the x direction, $d_{xx}$ is the second derivative in the x direction, $d_y$ is the first derivative in the y direction, $d_{yy}$ is the second derivative in the y direction, $I_A$ is the value of pixel A 747a, $I_C$ is the value of pixel C 747c, $I_D$ is the value of pixel D 747d and $I_E$ is the value of pixel E 747e.

$\vec{K}_x(\vec{K}_y)$ may denote the curvature of pixel B 747b in the x(y) direction, where $|\vec{K}_x|(|\vec{K}_y|)$ denotes the corresponding magnitude as illustrated in Equation (15).

$$|\vec{K}_x| = \frac{|d_{xx}|}{(1+d_x^2)^{3/2}}, \qquad (15)$$

$$|\vec{K}_y| = \frac{|d_{yy}|}{(1+d_y^2)^{3/2}}$$

In Equation (16), $\vec{K}_B$ is an approximation of mean curvature at pixel B 747b, which may be equal to the sum of $|\vec{K}_x|$ and $|\vec{K}_y|$.

$$\vec{K}_B = \vec{K}_x + \vec{K}_y, |\vec{K}_B| = \sqrt{|\vec{K}_x|^2 + |\vec{K}_y|^2} \qquad (16)$$

The magnitude of $\vec{K}_B$ may be directly computed since $\vec{K}_x$ and $\vec{K}_y$ are perpendicular to each other. The curvature measure of pixel B 747b, which may be defined as $|\vec{K}_B|^2$ in Equation (17) is the square of the curvature magnitude at that pixel.

$$|\vec{K}_B|^2 = \frac{d_{xx}^2}{(1+d_x^2)^3} + \frac{d_{yy}^2}{(1+d_y^2)^3} \quad (17)$$

A curvature of an image having i×j pixels may be represented as $|\vec{K}^{image}(i,j)|^2$. The smoothness measure calculator 735 may determine the constraint measure ($C_{ij}$) using curvature. For example, the smoothness measure calculator 735 may determine (e.g., calculate) the constraint measure ($C_{ij}$) based on curvature in accordance with Equation (18).

$$C_{ij} = |\vec{K}^1(i,j)|^2 + |\vec{K}^2(i,j)|^2 \quad (18)$$

where $\vec{K}^1$ is a curvature measure corresponding to the first image (e.g., overlapping area of the first image) and $\vec{K}^2$ is a curvature measure corresponding to the second image (e.g., overlapping area of the second image).

Figure 7C:
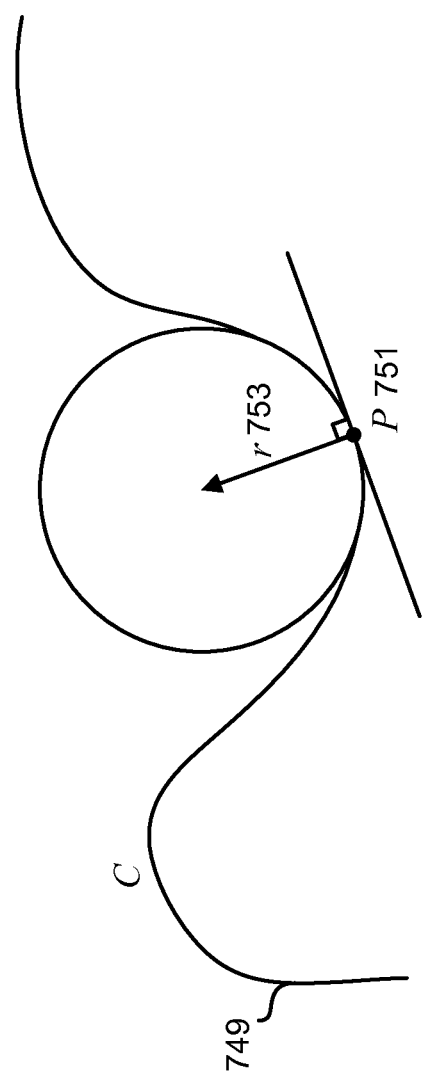
FIG. 7C is a diagram illustrating one example of a curve.

FIG. 7C is a diagram illustrating one example of a curve 749. In particular, FIG. 7C illustrates one example of a curve 749 (C) with a curvature at a point 751 (P). In some configurations, the curvature may be expressed as a derivative of a curve at a point 751 (P) (e.g., a slope of a circle at a point 751 (P) with a radius 753 (r)). Examples of equations for curvature are given above in connection with FIG. 7A.

FIG. 7D is a diagram illustrating an example 755 of combining two images 757a-b to form a combined image 757c. For instance, FIG. 7D illustrates an example of stitching using a minimal error boundary (e.g., seam 761). Image stitching may be utilized to compose images with similar overlapped regions (that reduce the appearance of the seam, for example). For example, an objective of seam determination or finding may include finding a seam (e.g., optimal boundary). The pixels of the stitched image may be taken from the input images on corresponding sides of the boundary to achieve a satisfactory result.

A first image ($I^1$) 757a and a second image ($I^2$) 757b are two aligned images to be stitched in which $\Omega_1$ 759a and $\Omega_2$ 759b are corresponding overlapped regions of the first image ($I^1$) 757a and the second image ($I^2$) 757b. Minimal error boundary (MEB) is a technique that may be used in image stitching. For example, the seam evaluator 736 may employ MEB for finding a seam 761 or boundary in some configurations. For instance, the seam evaluator 736 may employ MEB to find an optimal boundary. The pixels for a stitched image may be taken from corresponding sides (relative to the boundary) of the input images 757a-b to form a result. In a particular MEB-based stitching approach, finding the minimal error boundary in the overlapped region 759a-b may be accomplished in accordance with Equations (19) and/or (20), where I(i, j) can be the pixel intensity located at (i, j) in the overlapped regions and $e_{ij}$ is a cost to traverse that pixel. Eij may be the minimum cumulative error for all possible paths starting from a first row and ending at pixel (i, j).

$$E_{ij} = e_{ij} + \min(E_{i-1,j-1}, E_{i-1,j}, E_{i-1,j+1}) \text{ or}$$

$$E_{ij} = e_{ij} + \min(E_{i-1,j-1}, E_{i-1,j}, E_{i,j-1}, E_{i,j-1}) \quad (19)$$

$$e_{ij} = |I^1(i,j) - I^2(i,j)| \quad (20)$$

Assuming that N is the total number of rows of the overlapped region of FIG. 7D, the seam 761 or path (e.g., "optimal path") is a path with minimum cumulative error of all paths traversed from row 1 to row N. To find this path, it is equivalent to compute the minimum value $E_{N,j}$ of the last row indicating the end of the minimal error boundary. The output path is illustrated by the dashed curve in FIG. 7D.

When the first image ($I^1$) 757a and the second image ($I^2$) 757b are not aligned well and/or the illumination of the first image and the second image are significantly different in the overlapped region, the simple pixel intensity difference $e_{ij}$ may not generate visually satisfactory results. To overcome this limitation of this MEB-based method, instead of using absolute pixel intensity difference only, curvature information may be taken into account to form a robust feature for optimized boundary matching.

The seam evaluator 736 may create the cumulative energy map (e.g., cumulative minimum energy map) corresponding to pixels in the overlapping area. For example, the cumulative energy level of a current pixel may be based on the energy level of the current pixel (e.g., $e_{ij}$) in the energy map and the minimum of a set of cumulative energy levels in the cumulative energy map (e.g, min ($E_{i-1,j-1}$, $E_{i-1,j}$, $E_{i,j-1}$, $E_{i,j-1}$)) corresponding to a set of pixels. For instance, a set of a number (e.g., three, four) cumulative energy levels corresponding to a number (e.g., three, four) surrounding pixels may be utilized. In configurations were four are utilized, the four surrounding pixels used may be determined by the direction a seam 761 is being created. For example, a seam 761 a may be created in a horizontal direction and the cumulative energy level of each pixel may be determined in top to bottom order. A current pixel column may be designated by the variable j and a current pixel row may be designated by the variable i. The current pixel then may be designated by j). For example, the four surrounding pixels used to determine the cumulative energy level of the current pixel may be $P_{(i, j-1)}$, $P_{(i-1, j-1)}$, $P_{(i-1, j)}$ and $P_{(i-1, j+1)}$. The cumulative energy level of the current pixel may be equal to the energy level of pixel $P_{(i, j)}$ plus the cumulative energy level of pixel $P_{(i-1, j-1)}$, if the seam evaluator 736 determines that that pixel has the lowest cumulative energy level of the four surrounding pixels. Accordingly, an energy function may be utilized to create a cumulative energy map. For example, the energy function for determining the cumulative energy level of a current pixel in the vertical direction (e.g., for vertical seam finding) may be expressed as illustrated in Equation (21).

$$E_{ij} = e_{ij} + \min(E_{i-1,j-1}, E_{i-1,j}, E_{i-1,j+1}, E_{i,j-1}) \quad (21)$$

Equation (21) may be the accumulation of Equation (12) or its alternative. This may be utilized for finding a minimum cost path (e.g., optimal seam 761).

In another example, the energy function for determining the cumulative energy level of a current pixel in the horizontal direction (e.g., for horizontal seam finding) may be expressed as illustrated in Equation (22).

$$E_{ij} = e_{ij} + \min(E_{i-1,j-1}, E_{i,j-1}, E_{i+1,j-1}, E_{i-1,j}) \quad (22)$$

Accordingly, applying the energy function to the energy map (e.g., the energy levels $e_{ij}$ of the pixels in the overlapping area) may produce the cumulative energy map (e.g., a corresponding set of cumulative energy levels $E_{ij}$).

The seam evaluator 736 may determine (e.g., find) a seam 761. In some configurations, this may be accomplished by minimizing the energy function. For example, the seam evaluator 736 may determine a route for the seam 761 based on the cumulative energy map. More specifically, the seam evaluator 736 may determine the route for the seam 761 by finding a path of minimum energy through the cumulative energy map. In some configurations, the seam evaluator 736 may calculate (e.g., compute) a cumulative minimal error E for all possible paths by dynamic programming.

By using the constraint measure ($C_{ij}$) to determine $e_{ij}$, a seam may be determined by the seam evaluator 736. When the constraint measure ($C_{ij}$) utilizes curvature, the seam evaluator 736 may ensure the smoothness of the seam (e.g., the boundary). Using the curvature to ensure the smoothness of the seam may produce better visual effects of stitched images, even when photometric inconsistency and geometric misalignment exist between the input images. When the constraint measure ($C_{ij}$) is the edge measure, the image combiner 728 may create the seam around one or more of objects included in input images used to create the combined image.

Table (1) provides a comparison between an approach and an example of one or more of the approaches disclosed herein.

TABLE (1)

| Item | An Approach | Approach Disclosed Herein |
|---|---|---|
| Example Objective of the Algorithm | Image quilting for texture synthesis and transfer. | Find seams to merge a first image with a second image for panoramic stitching. |
| Goal for seams | Make the cut between two overlapping blocks on the pixels where the two textures match best (that is, where the overlap error is low). | Make the cut between the first image and the second image (e.g., captured image(s)) on the pixels where two images match best (that is, where the image difference is minimal) and where the pixels are not on the objects or the user indicated areas. |
| 1 | Go through the image to be synthesized in raster scan order in steps of one block (minus the overlap). | Optionally locate a previous stitched image on the current panoramic image and overlap the current captured image with the previous image. |
| 2 | For every location, search the input texture for a set of blocks that satisfy the overlap constraints (above and left) within some error tolerance. Randomly pick one such block. | None |
| 3 | None | Find overlapping areas between the first image and the second image with accurate alignment of image registration and extract the overlapping images. |
| 4 | Compute the error surface between the newly chosen block and the old blocks at the overlap region with squared image intensity difference | Compute the difference between the two overlapping images. The differences computation can use different options including squared image intensity differences, absolute image intensity differences, squared color distances and/or others. |
| 5 | None | Create object descriptions and/or constraints (e.g., edge measures) with one or a combination of different options including gradient constraint, Histogram of Gradient, sum of color differences with neighboring pixels, other constraints including object segmentation, edge or feature detection. |
| 6 | None. | Compute energy levels with the combination of image differences and object description and constraints to create an energy map. |
| 7 | Compute the cumulative minimum error for all paths with three directions. | Compute the cumulative minimum energy map for all paths with three or four directions. |
| 8 | Find the minimum cost path along this surface and make that the | Find the minimum cost path by minimizing the energy function |

TABLE (1)-continued

| Item | An Approach | Approach Disclosed Herein |
|---|---|---|
| | boundary of the new block. Paste the block onto the texture. | with tracing back to the cumulative minimum energy map. |
| 9 | None | Use the minimum cost path as the seam and stitch the current image to the current panoramic image with the seam. |
| 10 | Repeat with another block. | Repeat with another captured image. |

From the comparison above, it can be observed that steps 3, 4, 5, 6 and 7 are different. Among those, steps 3, 5 and 6 are new in the approaches disclosed herein. Step 3 uses accurate image registration approaches to align the images to obtain overlapping areas and overlapping images. If the overlapping is not accurate, the error surface or energy map will be the real differences in the overlapping areas, so that the seam found based on the error surface or energy map may cause artifacts.

Step 5 may make the results correct and much better for panorama stitching than other approaches. With this step, it can be ensured that the seam will not cut into the objects and/or the user defined areas, so that it can avoid ghost artifacts caused by object motion and/or other artifacts caused by the seams cutting through the objects.

Step 6 computes the energy function with the combination of image differences, object description and/or constraints to create an energy map, so that the energy function can consider both image differences and object constraints in the process of seam finding. The difference in step 4 is that the method disclosed herein uses more options to compute image differences, which is good for different kinds of images and/or which may improve accuracy.

The difference in step 7 is that the some approaches may consider three directions in computing cumulative minimum error surface and the one or more approaches disclosed herein may utilize four directions to compute the energy function. With more directions, the seam has more opportunities to avoid cutting into the objects or the user defined areas. For example, the seam may advance without being required to advance in a dimension. In particular, providing at least one pixel that does not require advancement in a dimension may allow a seam to avoid more moving objects. In the known approach, advancement is required along a dimension, which may force a seam to cut through an object. For example, the known approach may only provide 3 pixels, where the 3 pixels all require advancement in a dimension (e.g., the y dimension). In accordance with the systems and methods disclosed herein, the fourth pixel allows a seam to advance along another dimension (e.g., the x dimension) without advancing along a dimension (e.g., the y dimension). This may allow the seam to avoid more objects.

Figure 8A:
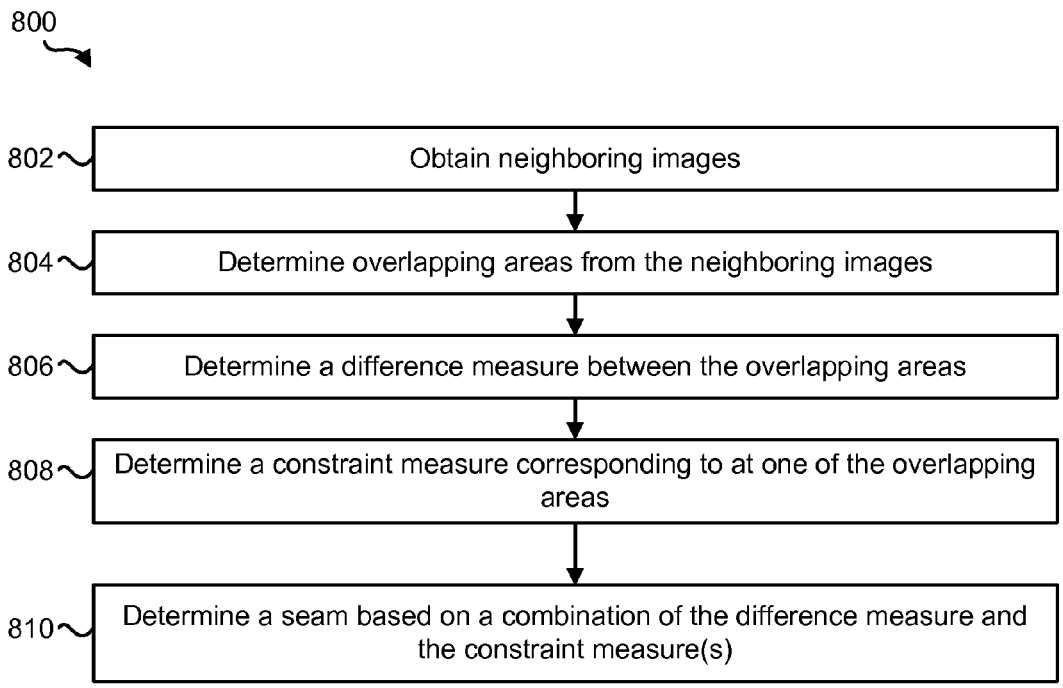
FIG. 8A is a flow diagram illustrating a configuration of a method for determining a seam.
Figure 8B:
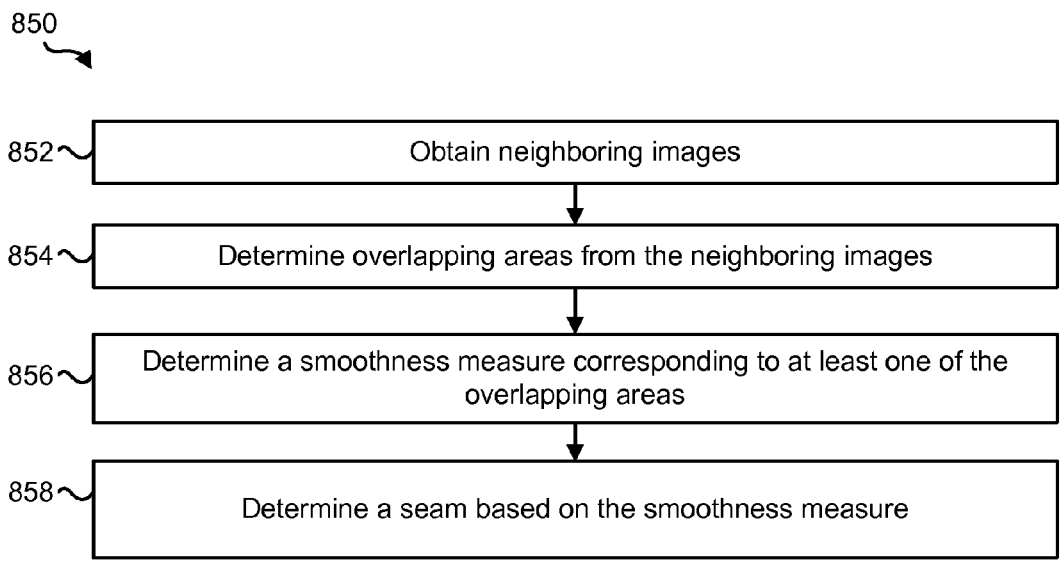
FIG. 8B is a flow diagram illustrating another configuration of a method for determining a seam.

FIGS. 8A and 8B are flow diagrams illustrating configurations of methods 800, 850 for determining a seam. FIG. 8A illustrates a first method 800 and FIG. 8B illustrates a second method 850. In some configurations, one or more of the methods 800, 850 illustrated in FIGS. 8A and 8B may determine an energy map and then determine a seam to use to stitch a panoramic image. The methods 800, 850 may be performed by an electronic device, such as the electronic device 724 that includes an image combiner 728 of FIG. 7.

Referring to the first method 800, the electronic device 724 may obtain 802 neighboring images. This may be accomplished as described above. In some configurations, for example, the electronic device 724 may obtain the one or more neighboring images from an external electronic device. Additionally or alternatively, the electronic device 724 may capture the neighboring images. For example, the electronic device 724 may be or include a digital camera that can capture the images. Upon obtaining 802 the neighboring images, the electronic device 724 may determine 804 overlapping areas in the neighboring images. In some configurations, the overlapping areas may be determined by using image registration approaches to align the images in the neighboring images.

The electronic device 724 may determine 806 a difference measure between the overlapping areas of the neighboring images. This may be accomplished as described above. The difference measure may indicate a difference in intensity in each pixel in the overlapping areas. The difference measure may indicate a moving object within the overlapping areas.

The electronic device 724 may determine 808 one or more constraint measures corresponding to at least one of (e.g., between) the overlapping areas. This may be accomplished as described above. The constraint measure(s) may include and/or correspond to an edge measure, a smoothness measure, or both, for example. The edge measure may indicate an edge of an object within the overlapping areas. In some implementations, the smoothness measure may indicate an edge of an object within the overlapping areas and may be considered an edge measure. The smoothness measure may indicate a curvature (e.g., a shape descriptor) of an image and/or an object included within the overlapping areas. Additionally or alternatively, the smoothness measure may indicate an edge of an object within the overlapping areas and may be considered an edge measure.

The electronic device 724 may determine 810 a seam based on a combination of the difference measure and the constraint measure(s). This may be accomplished as described above. The combination may indicate one or more objects (e.g., moving objects and/or stationary objects) in the overlapping areas. The seam may then be created so as to avoid the moving objects and stationary objects. This may allow a seam to be used to stitch the panoramic image.

The electronic device 724 may perform the second method 850 in some configurations. The electronic device 724 may obtain 852 neighboring images. This may be accomplished as described above. The neighboring images may be obtained 852 by the electronic device 724 by generating (e.g., capturing the neighboring images) or by receiving the neighboring images from another device, such as an image capture device.

The second method 850 may include determining 854 overlapping areas from the neighboring images. This may be accomplished as described above. The overlapping areas may be determined by using image registration approaches to align the images in the neighboring images.

The second method includes determining 856 a smoothness measure corresponding to at least one of (e.g., between) the overlapping areas. This may be accomplished as described above. The smoothness measure may indicate a curvature (e.g., a shape descriptor) of an image and/or an object included within the overlapping areas. Additionally or alternatively, the smoothness measure may indicate an edge of an object within the overlapping areas and may be considered an edge measure. The smoothness measure may be determined based on one or more curvatures within the overlapping areas. For example, the smoothness measure may be determined using a minimal error boundary (MEB) technique.

The method 850 may further include determining 858 a seam based on the smoothness measure. This may be accomplished as described above. The seam may be used to combine the neighboring images. The combined neighboring images may correspond to a panoramic image.

In some implementations, the neighboring images include a first image and a second image. The smoothness measure may be determined based on a first curvature of a first portion of the first image and a second curvature of a second portion of the second image. Each of the first portion and the second portion may correspond to the overlapping areas. The smoothness measure may include a smoothness value for each pixel included in the first portion. For example, a particular smoothness value may be determined based on a curvature of a particular pixel in the first portion and a curvature of a corresponding pixel in the second portion.

In some configurations, one or more of the methods 800, 850 may include multiplying the smoothness measure by a first multiplier having a first value to generate a weighted smoothness measure. The seam may be determined based on the weighted smoothness measure. The neighboring images may be combined based on the seam to generate a first combined image and a quality of the first combined image may be determined. Based on the quality of the first combined image, the multiplier may be modified to have a second value and a second weighted smoothness measure may be generated. For example, the multiplier may be set to the second value if the quality of the first combined image is less than or equal to a threshold quality value. A second seam may be determined based on the second weighted smoothness measure and a second combined image may be generated. A quality value of the second combined image may be better than the quality value of the first combined image. If the quality of the second combined image is not better than the quality of the first combined image (or is less than or equal to the threshold quality value), the multiplier may be set to a third value.

In some configurations, the seam is further determined based on a difference measure that indicates one or more moving objects within the overlapping areas, an edge measure that indicates object boundaries within the overlapping areas, or both. For example, one or more of the methods 800, 850 may include determining an edge measure corresponding to at least one of (e.g., between) the overlapping areas and the seam may be determined based on the edge measure. As another example, one or more of the methods 800, 850 may include determining a difference measure between the overlapping areas and the seam may be determined based on the difference measure.

Finding a seam (e.g., an optimal seam) may be a challenge to generate a high quality and visually appealing combined image, such as a panoramic image. Finding the seam may be even more challenging if there are misalignments between the images that are being combined. By using multiple criteria (e.g., bi-criteria) that address global optimality and smoothness for seam finding, a seam may be created that is high quality and results in a visually appealing combined image. For example, the seam may be determined using a minimal error boundary technique that incorporates curvature information. To illustrate, by utilizing curvature, the generated seam may offer a better visual impact of the combined image as compared to other techniques to determine a seam that do not use curvature information.

The methods of FIGS. 8A and 8B may be implemented by a field-programmable gate array (FPGA) device, an application-specific integrated circuit (ASIC), a processing unit such as a graphical processing unit (GPU), a central processing unit (CPU), a digital signal processor (DSP), a controller, another hardware device, firmware device, or any combination thereof. As an example, the methods of FIGS. 8A and 8B can be performed by one or more processors that execute instructions.

Figure 9:
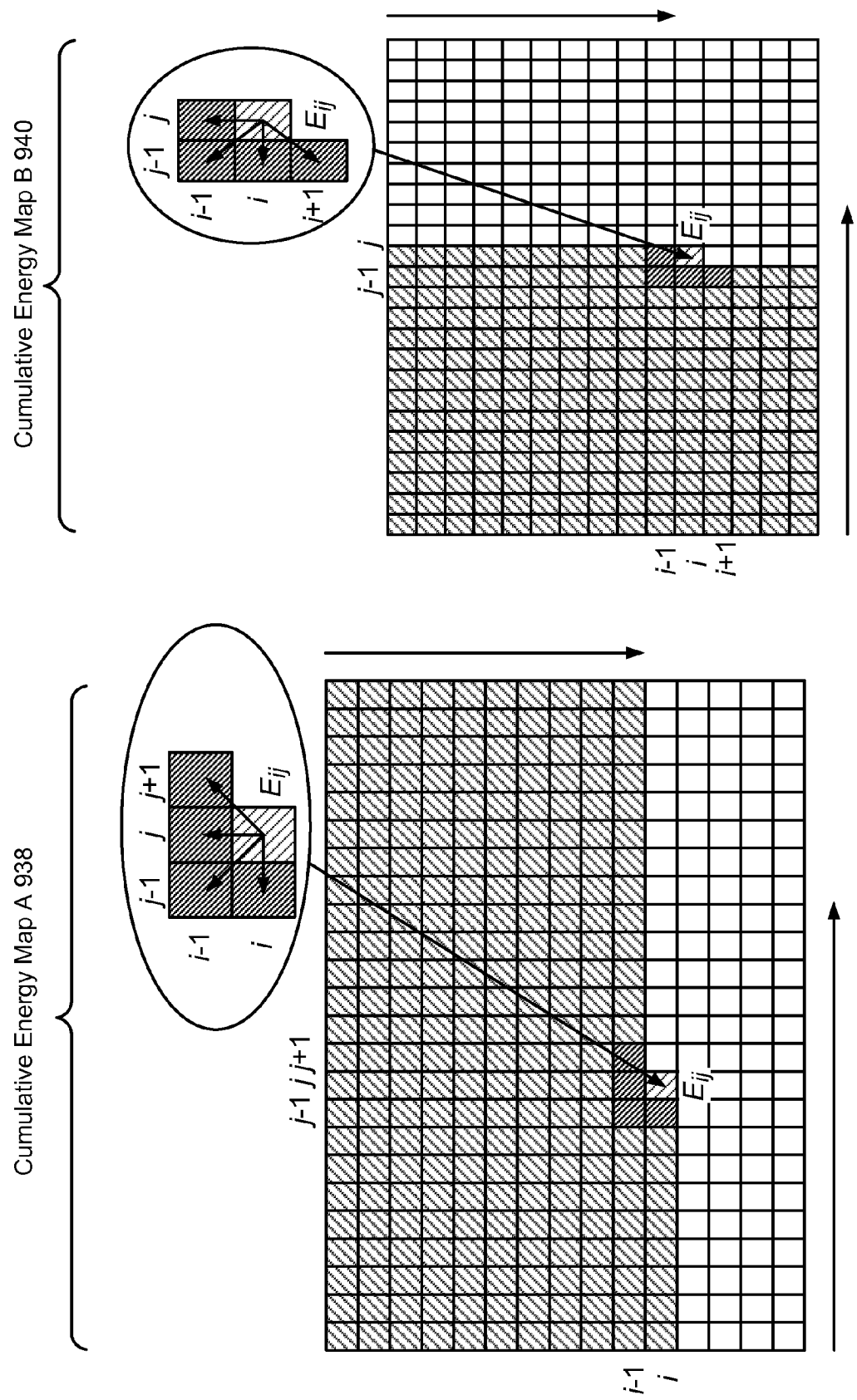
FIG. 9 illustrates examples of two cumulative energy maps that may be used to determine a seam in a vertical direction and a horizontal direction.

FIG. 9 illustrates examples of two cumulative energy maps 938, 940 that may be used to determine a seam in a vertical direction and a horizontal direction. Cumulative energy map A 938 is a cumulative energy map 938 for determining a seam in the vertical direction. One approach to compute the cumulative energy of a current pixel is indicated in cumulative energy map A 938. The cumulative energy level of the current pixel is indicated by $E_{ij}$ and four neighboring pixels used to compute the cumulative energy of the current pixel are indicated (which may be performed in accordance with the energy function described above, for example). The computation of cumulative energy for a vertical seam may be accomplished by traversing the cumulative energy map 938 from top to bottom or bottom to top. For example, in cumulative energy map A 938, the cumulative energy of each pixel is being computed from top to bottom. The current pixel's coordinates are designated by $P_{(i,j)}$, where i is the row and j is the column the current pixel is located in. The cumulative energy of the current pixel may be computed by determining an energy level of the current pixel and then adding the current pixel's energy level and the minimum energy level of one of the four neighboring pixels. In this example, the four surrounding pixels used to determine (e.g., accumulate) the cumulative energy of the current pixel may be $P_{(i,j-1)}$, $P_{(i-i,j-1)}$, $P_{(i-1,j)}$ and $P_{(i-1,j+1)}$. If the energy level of pixel $P_{(i,j-1)}$ is determined to be the lowest of the four neighboring pixels, the cumulative energy would be equal to $e_{(i,j)}$ plus $E_{(i,j-1)}$. The use of four neighboring pixels may provide the seam finding process more opportunities to go around objects in the overlapping areas. The seam would then be found by tracing the minimum cumulative energy value of a pixel by traversing row by row from top to bottom and using the pixels that provided the lowest cumulative energy level. For example, the energy function may be minimized to obtain a vertical seam by tracing back the minimal value in each row from bottom to top or top to bottom.

Cumulative energy map B 940 is another example of a cumulative energy map where the seam is being computed in the horizontal direction. The cumulative energy level of the current pixel is also indicated as $E_{ij}$ and the four neighboring pixels used to compute the cumulative energy of the current pixel are indicated (which may be performed in accordance with the energy function described above, for example). The computation of cumulative energy for a horizontal seam may be done by traversing the cumulative energy map from left to right or right to left. In cumulative energy map B 940, the cumulative energy map is being traversed left to right. In this example, the current pixel's coordinates are also designated by $P_{(i,j)}$. The cumulative energy of the current pixel may also computed by determining the energy level of the current pixel and then adding the current pixel's energy level and the minimum cumulative energy level of one of the four neighboring pixels. In this example, the four surrounding pixels used to determine (e.g., accumulate) the cumulative energy level of the current pixel are $P_{(i-1,j-1)}$, $P_{(i-1,j)}$, $P_{(i,j-1)}$ and $P_{(i+1,j-1)}$. If the cumulative energy level of pixel $P_{(i-1,j-1)}$ is determined to be the lowest of the four neighboring pixels, the cumulative energy level would be equal to $e_{(i,j)}$ plus $E_{(i-1,j-1)}$. The seam would then be found by tracing the minimum cumulative energy value of a pixel by traversing column by column, left to right and using the pixels that provided the lowest cumulative energy level. For example, the energy function may be minimized to obtain a horizontal seam by tracing back the minimal value in each row from right to left or left to right.

Figure 10:
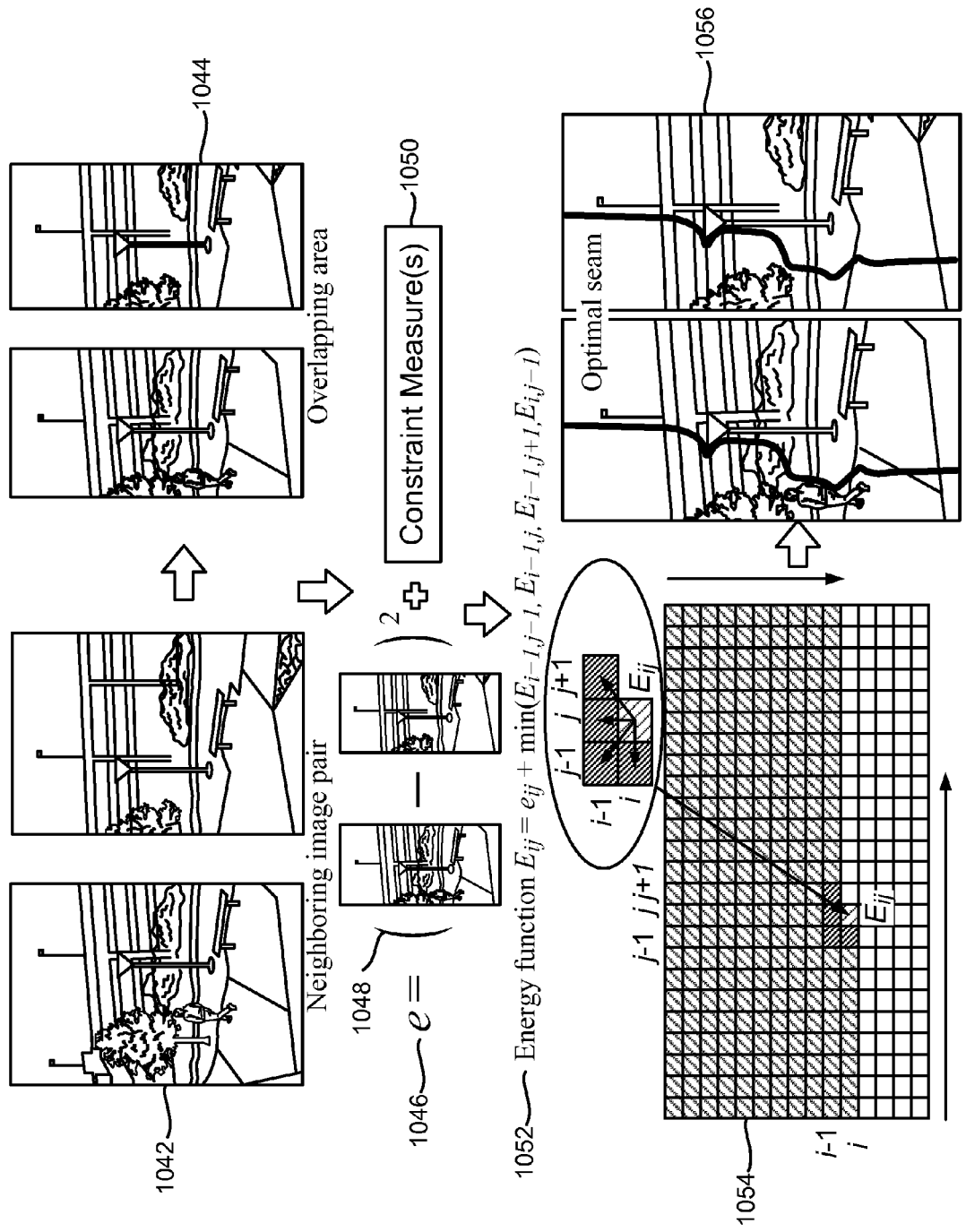
FIG. 10 is a diagram illustrating an example of an algorithm for determining a seam in accordance with the systems and methods disclosed herein.

FIG. 10 is a diagram illustrating an example of an algorithm for determining a seam in accordance with the systems and methods disclosed herein. The algorithm may be performed by an electronic device 724. A neighboring image pair 1042 is obtained and overlapping areas 1044 of (e.g., between) the neighboring image pair 1042 is found and extracted. The overlapping areas 1044 may provide accurate alignment of image registration. In some configurations, the overlapping areas 1044 may be found by determining the minimum difference in the neighboring images 1042. A difference measure 1048 may be determined in the overlapping areas (using the image registration, for example). The difference measure 1048 may be able to indicate moving objects in the overlapping area 1044. In some configurations, the difference measure 1048 may be found as described in connection with FIG. 7.

The overlapping area 1044 may be used to determine one or more constraints. In other words, one or more constraints (e.g., a constraint measure ($C_{ij}$) 1050 of objects in the overlapping area may be determined. One example of a constraint measure ($C_{ij}$) 1050 is an edge measure that indicates the edges of one or more moving objects and/or stationary objects located within the overlapping area 1044. Additional or alternative constraint measures (e.g., a smoothness measure) may be utilized. The seam may avoid one or more of the edges of objects indicated by the constraint measure(s) 1050. For example, an edge measure may enhance the detection of one or more moving objects such that the seam may avoid cutting through the one or more moving objects. It should also be noted that the constraint measure ($C_{ij}$) 1050 may or may not indicate one or more edges of one or more stationary objects in some cases, such as when the constraint measure ($C_{ij}$) indicates a curvature (e.g., a shape descriptor) of an image and/or an object included within the overlapping areas. For example, the overlapping areas 1044 illustrated in FIG. 10 include a light post and a parking garage. In this example, the constraint measure ($C_{ij}$) 1050 may (more strongly) indicate the edge of the light post (e.g., a foreground stationary object), but may not (as strongly) indicate the edge of the parking garage (e.g., a background stationary object). In some configurations, this determination may be based on the squared magnitude of the gradient of the sum of the absolute of gradient values. In this example, the sum of the absolute gradient value of the parking garage may be small, while the sum of the absolute gradient value of the light post may be large. Accordingly, the seam may cut through the parking garage but may avoid cutting through the light post and the person (e.g., a moving object) as illustrated in the panoramic image 1056. The constraint measure ($C_{ij}$) 1050 may be referred to as an object description. In some configurations, the constraint measure ($C_{ij}$) 1050 may be found as described in connection with FIG. 7A.

An energy function 1052 may be constructed based on the difference measure 1048 and the one or more constraints (e.g., constraint measure ($C_{ij}$) 1050). For example, the difference measure 1048 and the constraint measure ($C_{ij}$) 1050 (e.g., object description) may be used to compute the energy level 1046 of each pixel in the overlapping area 1044. In some configurations, the computation of the energy level 1046 may take the square of the difference measure 1048 and add it to the constraint measure ($C_{ij}$) 1050. The constraint measure ($C_{ij}$) may include an edge measure and/or a smoothness measure, as described with reference to FIG. 7A. A cumulative energy map 1054 (in the overlapping area, for example) may be created based on the energy level of each pixel and an energy function 1052. The energy function 1052 may be utilized to obtain a seam for panorama stitching. For example, after optimizing the energy function 1052, an optimal seam for panorama stitching may be determined.

In this example, the cumulative energy map 1054 is utilized to find the seam in a vertical direction and traversing from top to bottom. In particular, FIG. 10 illustrates one example of determining a seam for one dimensional horizontal panoramic stitching. It should be noted that the systems and methods disclosed herein may be implemented in the vertical direction, the horizontal direction or both. The systems and methods disclosed herein may additionally or alternatively be implemented by traversing from top to bottom, bottom to top, left to right and/or right to left. For instance, the systems and methods disclosed herein may additionally or alternatively be applied for finding a horizontal seam for one dimensional vertical panorama stitching and/or for finding a combination seam for two-dimensional panorama stitching. Further detail is provided in connection with FIGS. 17-18.

The seam of the neighboring image pair 1042 may be found by tracing the minimum cumulative energy value of a pixel while traversing in the same direction as the cumulative energy map 1054 was created. The seam may then avoid (e.g., go around) one or more moving objects and/or stationary objects located within the overlapping area 1044. The seam of the two images is indicated by the vertical line in the images. These seams may then be used to stitch together a panoramic image 1056. For example, the neighboring images 1042 may be combined at the seam. Pixels that are not part of the combined image 1056 (e.g., on the opposite side of the seam from the used portion for each image) may be discarded.

Figure 11:
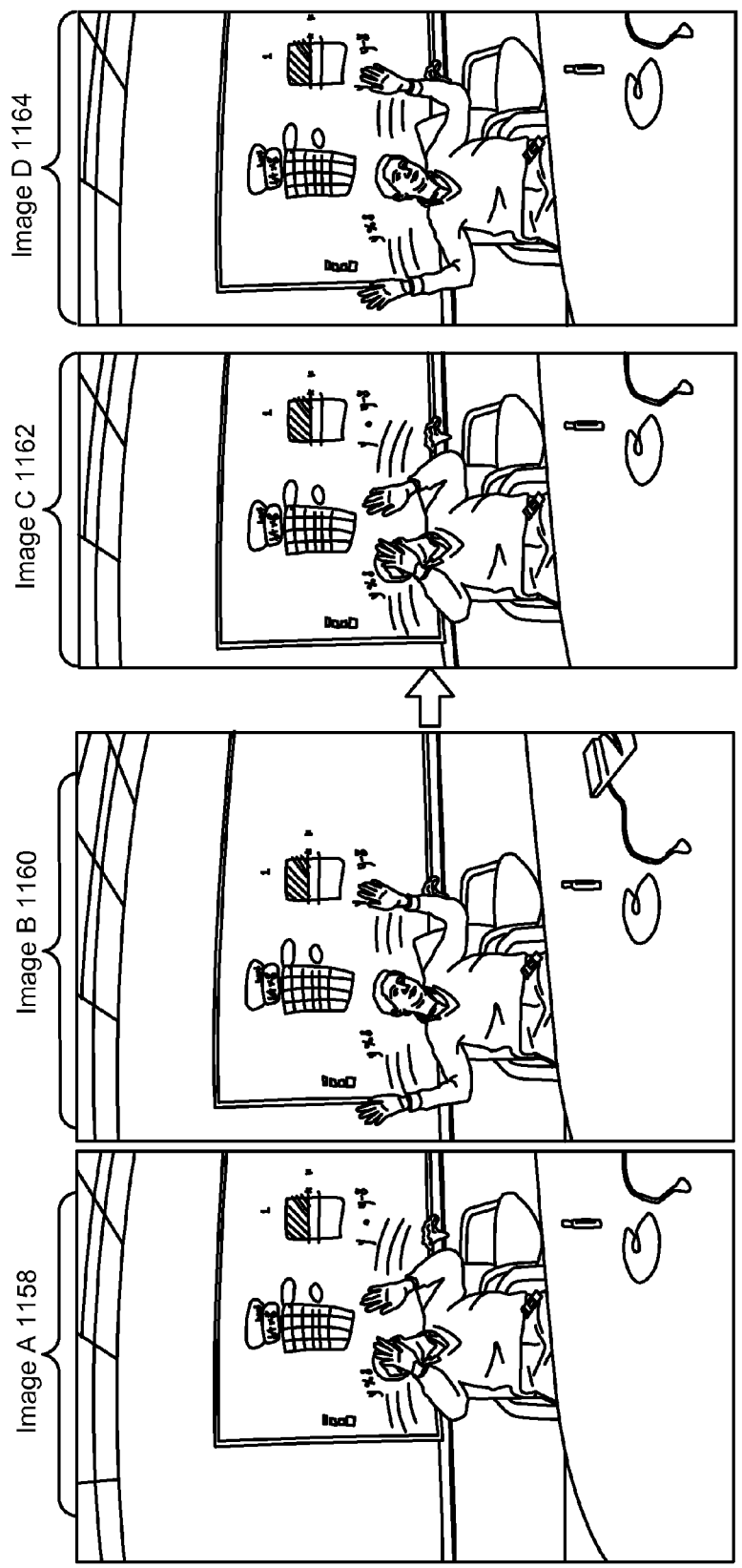
FIG. 11 illustrates an example of finding overlapping areas of two images in neighboring images.

FIG. 11 illustrates an example of finding overlapping areas 1162, 1164 of two images 1158, 1160 in neighboring images. There are two images (image A 1158 and image B 1160) to be stitched to create a panoramic image. Image C 1162 may be an overlapping area in image A 1158 and image D 1164 may be an overlapping area in image B 1160. The overlapping areas (image C 1162 and image D 1164) may be found by determining the minimum difference in image A 1158 and image B 1160, which may provide accurate alignment of image registration. In this example, the overlapping areas include a person that is a moving object. When finding overlapping areas, may not be necessary to determine whether there is a moving object at this point in the process. In some configurations, accurate alignment and minimum difference between the images may be the only aspects considered for determining overlapping areas. The overlapping area (image C 1162) of image A 1158 may include the person. The overlapping area (image D 1164) of image B 1160 may also include the person, but in a different position, location or area of the overlapping areas.

Figure 12:
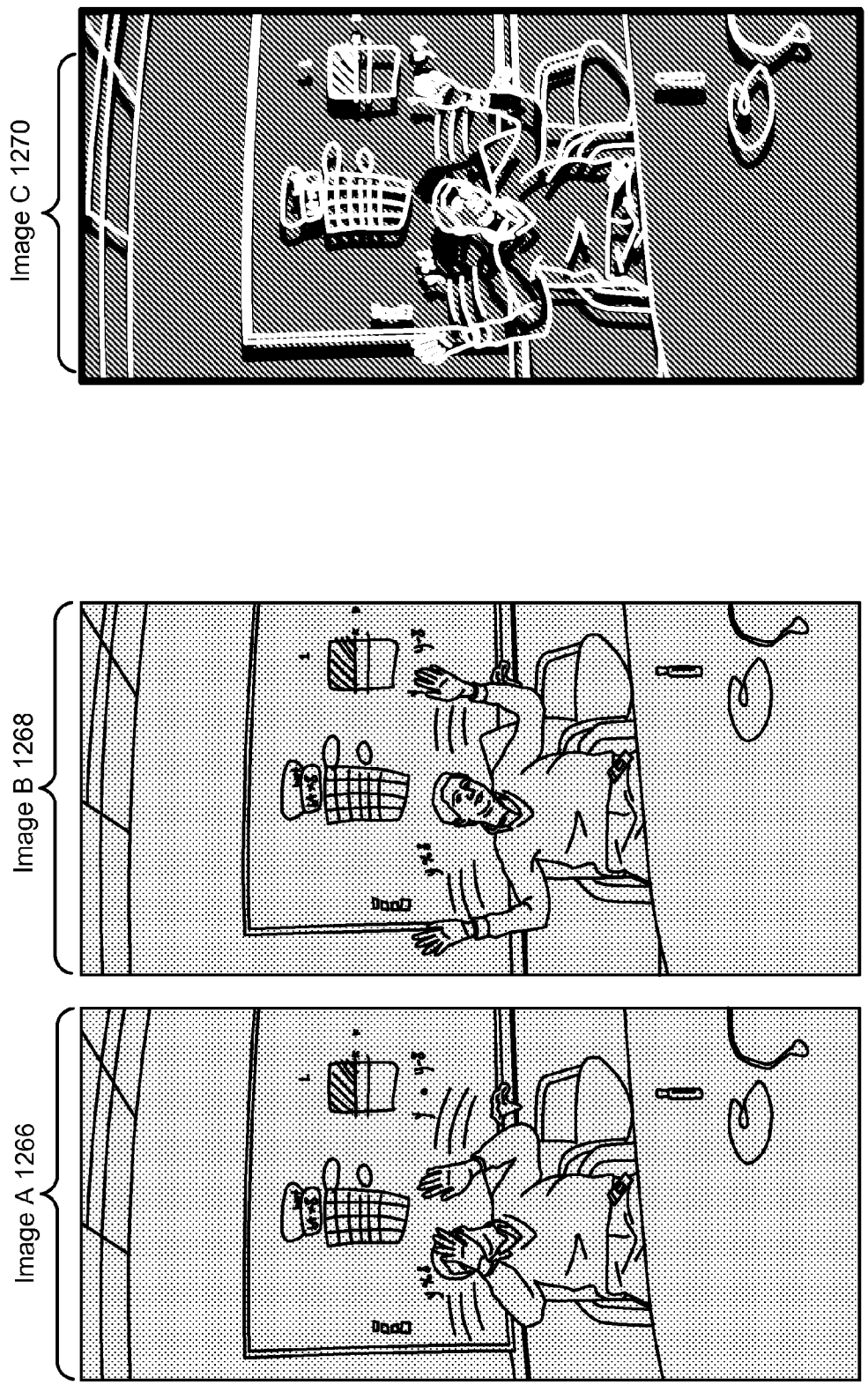
FIG. 12 illustrates an example of determining a difference measure between two overlapping images.

FIG. 12 illustrates an example of determining a difference measure between two overlapping images 1266, 1268. In this example the difference measure may be found by converting a color scheme of the overlapping areas 1162, 1164 found in FIG. 11 to grayscale to indicate intensity of the pixels. The grayscale images are image A 1266 (e.g., denoted $I^0$) and image B 1268 (e.g., denoted $I^1$). The squared difference of the two overlapping areas 1266, 1268 may then be computed (e.g., diff=$(I^0-I^1)^2$, resulting in image C 1270. Image C 1270 may indicate where the intensity of each pixel is high or low and the same or different in the overlapping areas. This computation may provide the first term of an energy level 1046. The energy level 1046 may be expressed as Equation (12) described in relation to FIG. 10.

Figure 13:
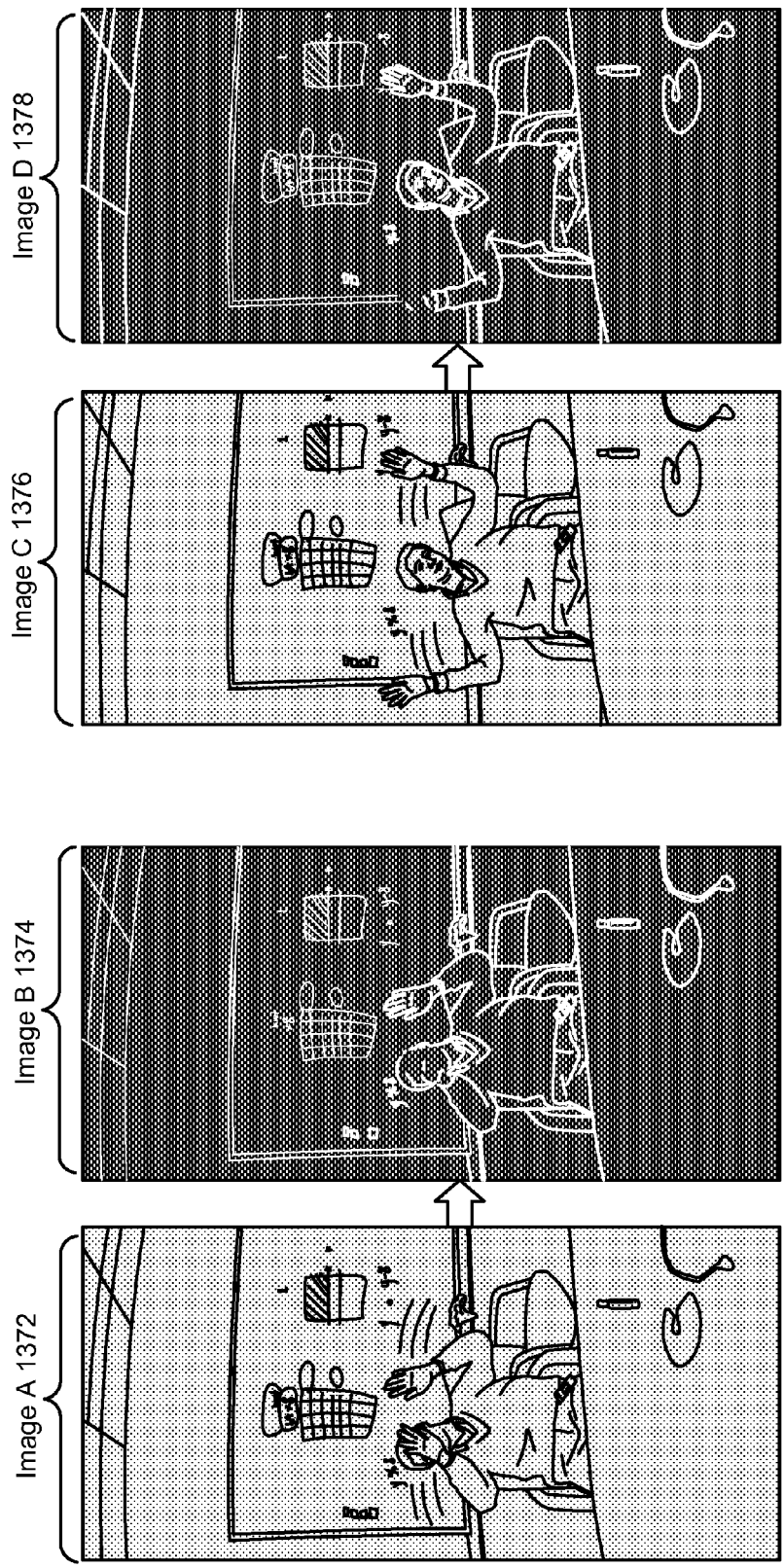
FIG. 13 illustrates an example of determining a gradient and magnitude of gradients of two overlapping images.

FIG. 13 illustrates an example of determining a gradient and magnitude of gradients of two overlapping images 1372, 1376. The gradient and magnitude of gradients for the overlapping images 1372, 1376 may be computed (by the electronic device 724, for example) for use in determining an edge measure of the overlapping images 1372, 1376. It should be noted that image A 1372 in FIG. 13 may correspond to image A 1266 (e.g., $I^0$) in FIG. 12 and image C 1376 in FIG. 13 may correspond to image B 1268 (e.g., $I^1$) in FIG. 12. For example, finding the gradient of image A 1372 may be expressed in accordance with Equation (23).

$$G_0 = \left(\frac{\partial I^0}{\partial x}, \frac{\partial I^0}{\partial y}\right) \quad (23)$$

where $$\frac{\partial I^0}{\partial x}$$

is the x-dimensional gradient and $$\frac{\partial I^0}{\partial y}$$

is the y-dimensional gradient. Similarly, the gradient of image C 1376 may be determined in accordance with $$G_1 = \left(\frac{\partial I^1}{\partial x}, \frac{\partial I^1}{\partial y}\right).$$

The squared magnitude of gradients for image A 1372 may be determined in accordance with Equation (24):

$$M_0 = \left(\frac{\partial I^0}{\partial x}\right)^2 + \left(\frac{\partial I^0}{\partial y}\right)^2 \quad (24)$$

Similarly, the squared magnitude of gradients for image C 1376 may be determined in accordance with $$M_1 = \left(\frac{\partial I^1}{\partial x}\right)^2 + \left(\frac{\partial I^1}{\partial y}\right)^2.$$

The result of the computation of the magnitude of gradients (e.g., $M_0$) for image A 1372 is shown in image B 1374. The result of the computation of the gradient and magnitude of gradients for image C 1376 may be computed using a similar approach to that followed for image A 1372. The magnitude of gradients (e.g., $M_1$) for image C 1376 is shown in image D 1378.

Figure 14:
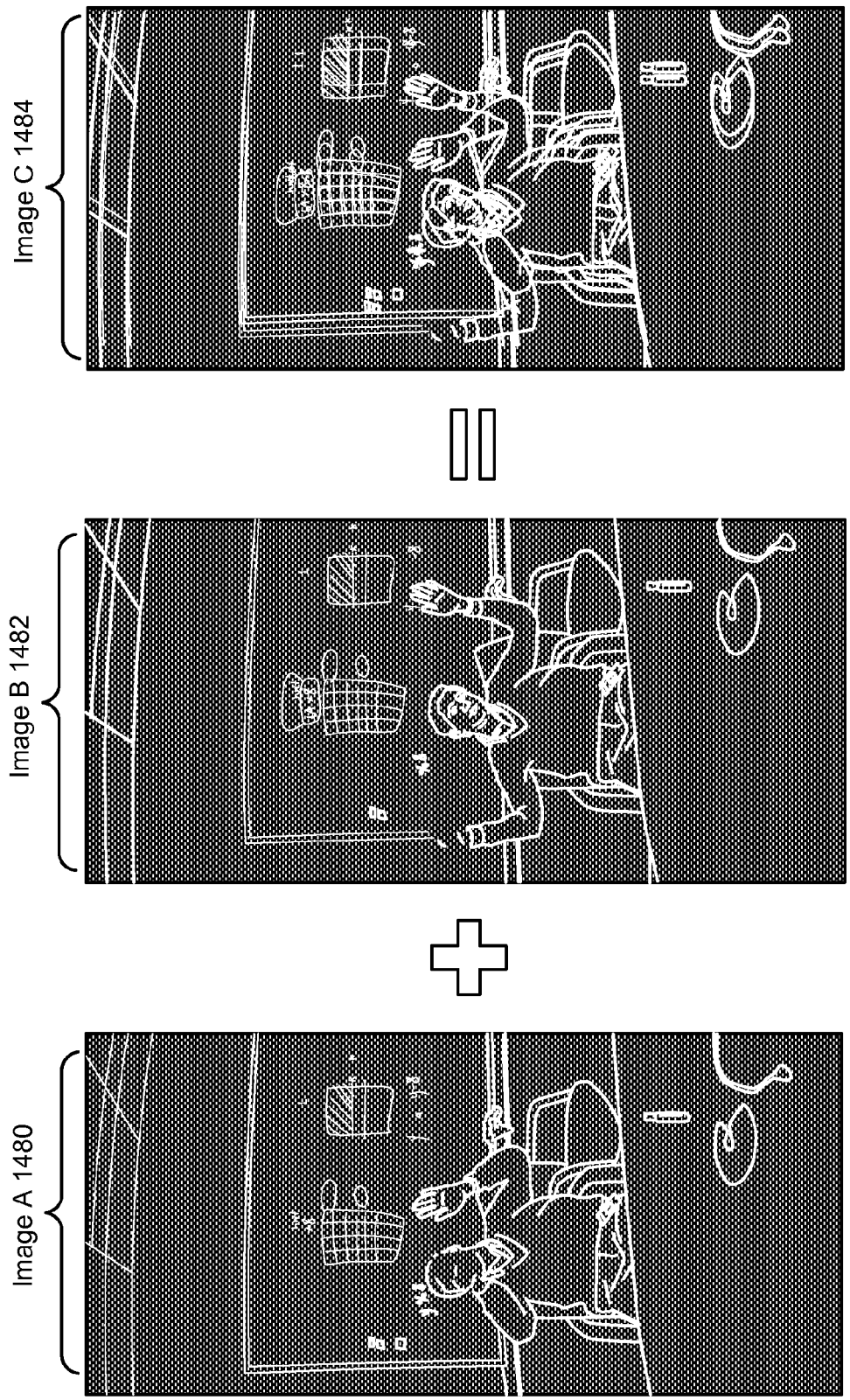
FIG. 14 illustrates an example of determining an edge measure of two overlapping images.

FIG. 14 illustrates an example of determining an edge measure of two overlapping images 1480, 1482. The edge measure may be used to determine where an edge of an object is in the overlapping areas. This may be used to ensure a seam is not selected that will cut the object and create an artifact in a panoramic image. The edge measure may be found using a gradient and magnitude of gradients computed as described in connection to FIG. 13. The edge measure is the combination of the magnitude of gradients of neighboring images. In this example, two magnitudes of gradients may be combined to provide the edge measure (e.g., object description). Image A 1480 is the magnitude of gradients for image A 1372 as described in relation to FIG. 13 and image B 1482 is the magnitude of gradients for image C 1376 as described in relation to FIG. 13. The edge measure may be determined in accordance with Equation (25):

$$EdgeMeasure = M_0 + M_1 \quad (25)$$

$$= \left(\frac{\partial I^0}{\partial x}\right)^2 + \left(\frac{\partial I^0}{\partial y}\right)^2 + \left(\frac{\partial I^1}{\partial x}\right)^2 + \left(\frac{\partial I^1}{\partial y}\right)^2$$

The result of the computation of the edge measure is image C 1484. It should be noted that a smoothness measure as described herein may be determined in addition to or alternatively from an edge measure.

Figure 15:
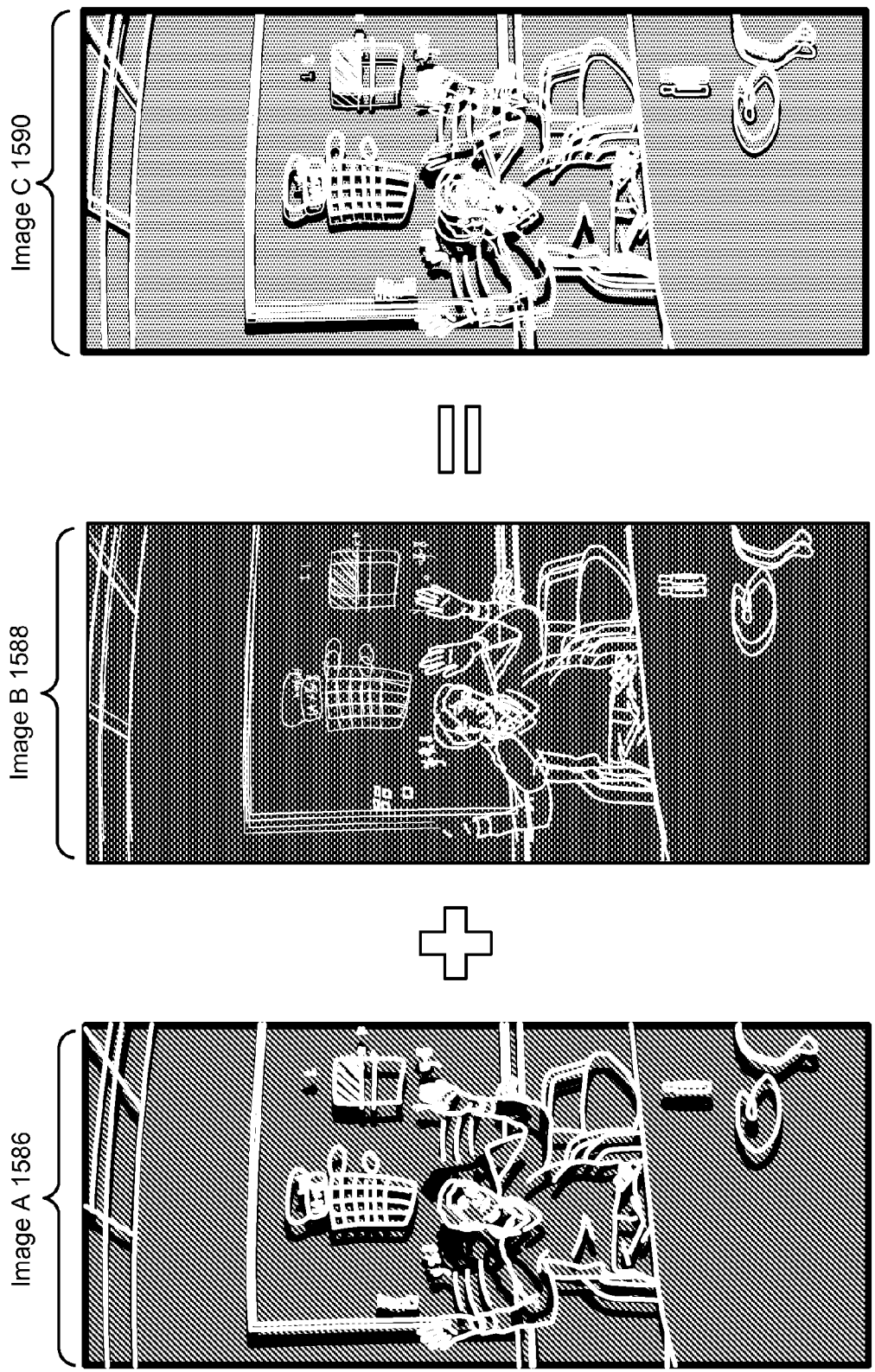
FIG. 15 illustrates an example of creating an energy map based on the difference measure and the edge measure.

FIG. 15 illustrates an example of creating an energy map (e.g., image C 1590) based on the difference measure (e.g., image A 1586) and the edge measure (e.g., image B 1588). An energy map (e.g., energy levels corresponding to a set of pixels in the overlapping areas) may be used to create a cumulative energy map of overlapping areas. The energy map may be found using a difference measure described in relation to FIG. 13 and an edge measure described in relation to FIG. 14. Additionally or alternatively, the energy map may be determined based on a smoothness measure.

The difference measure and edge measure may be normalized in some configurations. The difference measure may be normalized by dividing it by the maximum value of the squared difference. In particular, image A 1586 may be determined in accordance with $$\frac{diff}{Norm_1},$$

where diff is the difference measure described in connection with FIG. 12. The edge measure (e.g., object description) may be normalized by dividing it by a maximum value in the edge measure. In particular, image B 1588 may be determined in accordance with $$\frac{EdgeMeasure}{Norm_2},$$

where EdgeMeasure is the edge measure described in connection with FIG. 14. The purpose of normalizing the difference measure and edge measure may be to adjust the values to a more common or rational scale. Equation (26) illustrates an example of determining the energy map (e.g., energy levels) by normalizing the difference measure and edge measure.

$$e = \frac{(I^0 - I^1)^2}{Norm_1} + \frac{\left(\frac{\partial I^0}{\partial x}\right)^2 + \left(\frac{\partial I^0}{\partial y}\right)^2 + \left(\frac{\partial I^1}{\partial x}\right)^2 + \left(\frac{\partial I^1}{\partial y}\right)^2}{Norm_2} \quad (26)$$

$Norm_1$ may be the maximum value of the squared difference and $Norm_2$ may be the maximum value in the edge difference. In some configurations, the energy level may be computed in accordance with Equation (27).

$$e = w_1 \left( \frac{(I^0 - I^1)^2}{Norm_1} \right) + w_2 \left( \frac{\left(\frac{\partial I^0}{\partial x}\right)^2 + \left(\frac{\partial I^0}{\partial y}\right)^2 + \left(\frac{\partial I^1}{\partial x}\right)^2 + \left(\frac{\partial I^1}{\partial y}\right)^2}{Norm_2} \right) \quad (27)$$

$$w_1 + w_2 = 1 \quad (28)$$

In Equations (27) and (28), $w_1$ and $w_2$ are weighting values.

Image A 1586 illustrates a normalized difference measure. Image B 1588 illustrates a normalized edge measure. The combination of the normalized difference measure and the normalized edge measure may create the energy map (e.g., energy levels as illustrated by image C 1590) of the overlapping areas of the neighboring images. The energy map may be used to create the cumulative energy map used to create a seam for stitching a panoramic image. The results of the computation of the energy map are illustrated by image C 1590.

It should be noted that a similar approach may be repeated between additional pairs of overlapping images. For example, assume a first image, second image and third image, where the first image overlaps the second image and the third image overlaps the second image. The procedures described in connection with one or more of FIGS. 7-15 may be performed for the first image and second image and also for the second image and third image. Then, for example, the first image, second image and third images may be combined into one image based on two seams, one seam for each pair.

Figure 16:
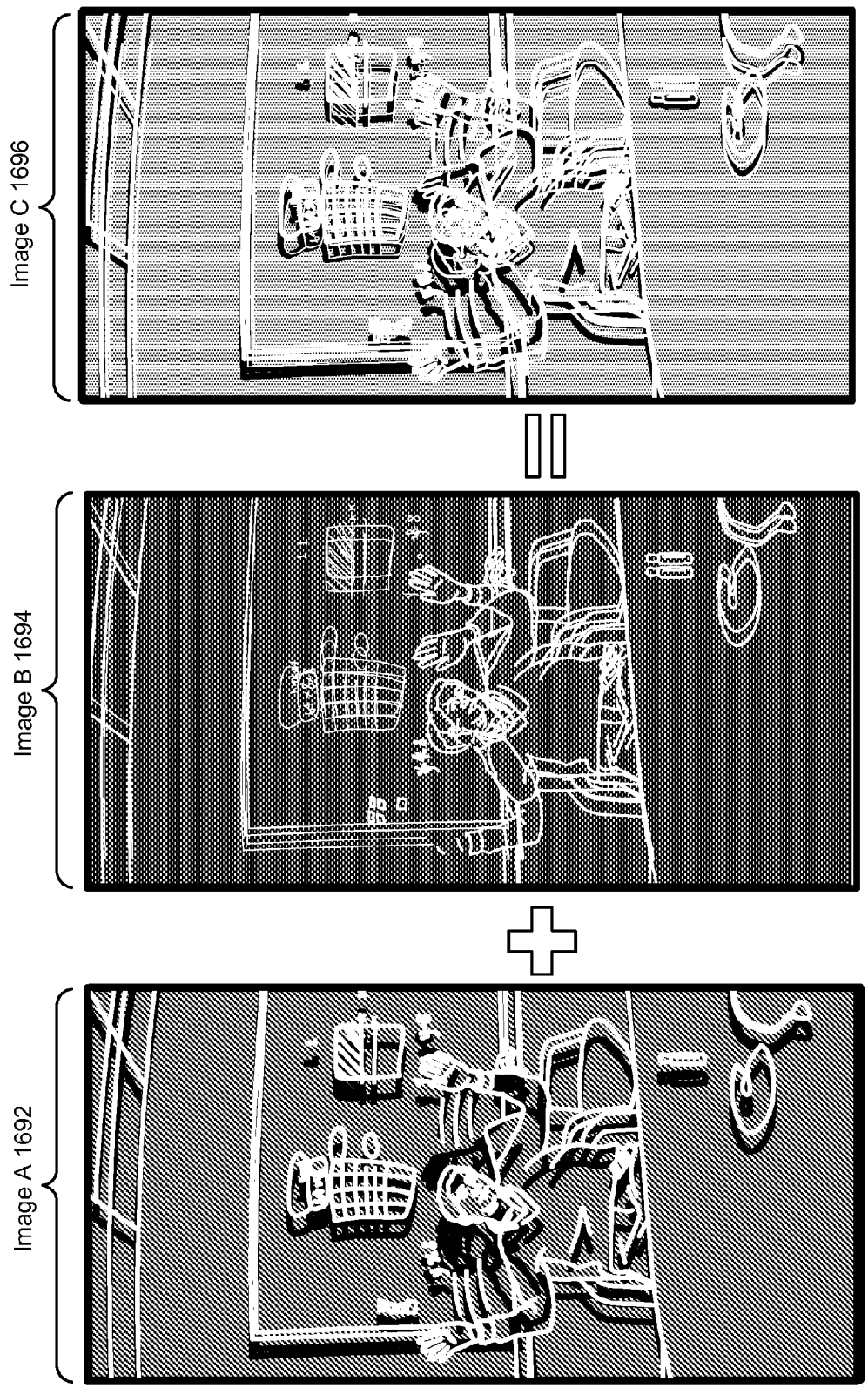
FIG. 16 illustrates another example of creating an energy map based on the difference measure and the edge measure.

FIG. 16 illustrates another example of creating an energy map (e.g., image C 1696) based on the difference measure (e.g., image A 1692) and the edge measure (e.g., image B 1694). The steps taken to create the energy level image 1696 are similar to the computations described in relation to FIG. 12, FIG. 13, FIG. 14 and FIG. 15. The edge measure may be used to determine where an edge of an object is in the overlapping areas. This may be used to ensure a seam is not selected that will cut an object and create an artifact in a panoramic image. The edge measure may be found using a Canny edge detection method. The different methods to obtain edge measures may provide different results depending on quality of neighboring images or lighting of the overlapping area. The Canny edge detector is also a gradient edge detection approach. Besides using magnitude of gradients, the Canny edge approach also uses direction information to decide edge points. An edge measure for the source image may be created by Canny edge detection. Then, an energy map may be created with difference measure and the edge measure. The edge gradient and direction may be determined in accordance with Equations (29)-(30):

$$M = \sqrt{\left(\frac{\partial I}{\partial x}\right)^2 + \left(\frac{\partial I}{\partial y}\right)^2} \quad (29)$$

$$\Theta = a\tan 2\left(\frac{\partial I}{\partial y}, \frac{\partial I}{\partial x}\right) \quad (30)$$

In some configurations, the direction may be rounded to one of four angles (0, 45, 90 or 135 degrees). The edge measure may be determined using the Canny approach in accordance with Equation (31).

$$EdgeMeasure = f(M, \Theta) \quad (31)$$

Although FIGS. 11-16 have been described with reference to using an edge measure, the description of FIGS. 11-16 should not be understood as being limited to using the edge measure. Teachings of FIGS. 11-16 referencing the edge measure may be applicable to other constraint measure ($C_{ij}$). For example, the teachings of FIGS. 11-16 may apply to one or more processes that use a constraint measure ($C_{ij}$), such as a smoothness constraint, other than the edge measure. As another example, the teaching of FIGS. 11-16 may apply to one or more processes that use another constraint measure ($C_{ij}$), such as a smoothness constraint, in addition to the edge measure.

Figure 17:
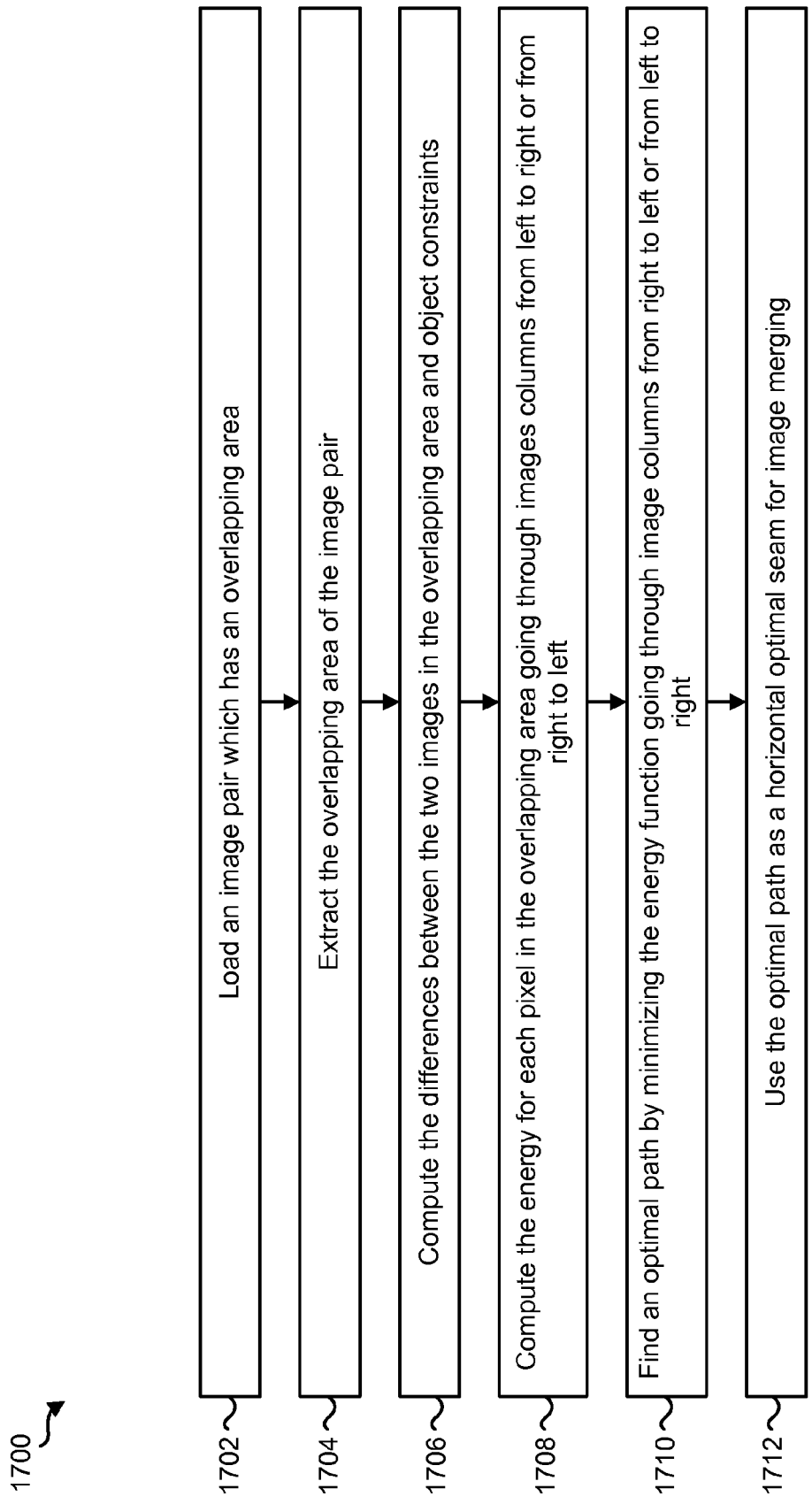
FIG. 17 is a flow diagram illustrating a configuration of a method for determining a seam in a horizontal direction of an image pair.

FIG. 17 is a flow diagram illustrating a configuration of a method 1700 for determining a seam in a horizontal direction of an image pair. In particular, the method 1700 illustrated in FIG. 17 may be one approach for determining an energy map and then determining a seam to stitch a panoramic image. The method 1700 may be performed by an electronic device 724 that includes an image combiner 728.

The electronic device 724 may load 1702 an image pair that has an overlapping area. The image pair may also be neighboring images. In one configuration, the electronic device 724 may obtain the image pair from an external electronic device. In another configuration, the electronic device 724 may obtain the neighboring images. For example, the electronic device 724 may be a digital camera that can capture the images. Upon loading the image pair, the electronic device 724 may extract 1704 an overlapping area of the image pair.

The electronic device 724 may then compute 1706 the differences between the image pair in the overlapping area and compute the object constraints (which may be utilized to create an energy map or image difference map). The object constraints may include an edge measure and/or a smoothness measure. The electronic device 724 may compute 1708 the energy for each pixel in the overlapping area going through the image columns from left to right or right to left. The electronic device 724 may find 1710 a path by minimizing an energy function going through image columns from right to left or left to right (for a horizontal seam for one dimensional vertical panorama stitching, for example).

The energy function may be the same energy function discussed in relation to FIG. 7A. A path may be used 1712 by the electronic device 724 as a horizontal seam for image merging. The path may be a vertical seam that traces a minimal value in each column right to left or left to right.

Figure 18:
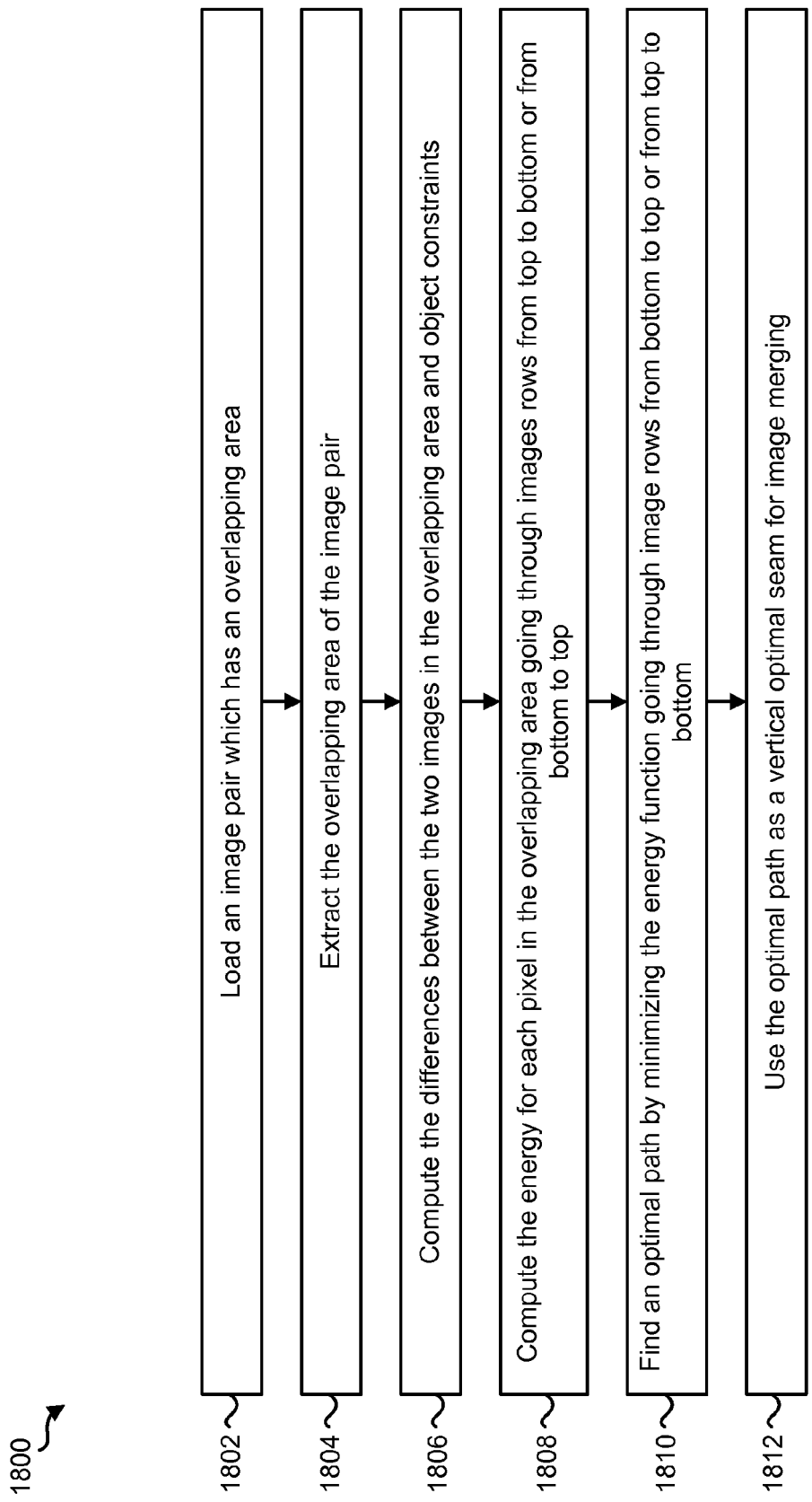
FIG. 18 is a flow diagram illustrating a configuration of a method for determining a seam in a vertical direction of an image pair.

FIG. 18 is a flow diagram illustrating a configuration of a method 1800 for determining a seam in a vertical direction of an image pair. In particular, the method 1800 illustrated in FIG. 18 may be one approach for determining an energy map and then determining a seam to use to stitch a panoramic image. The method 1800 may be performed by an electronic device 724 that includes an image combiner 728. The method 1800 to determine a vertical seam may be similar to the method 1700 to determine a horizontal seam.

The electronic device 724 may load 1802 an image pair that has an overlapping area. The image pair may also be neighboring images. In one configuration the electronic device 724 may obtain the image pair from an external electronic device. In another configuration, the electronic device 724 may obtain the image pair itself. For example, the electronic device 724 may be a digital camera that can capture the images. Upon loading the image pair the electronic device 724 may extract 1804 an overlapping area of the image pair.

The electronic device 724 may then compute 1806 the differences between the image pair in the overlapping area and compute the object constraints (which may be utilized to create an energy map or image difference map). The object constraints may include an edge measure and/or a smoothness measure. The electronic device 724 may compute 1808 the energy for each pixel in the overlapping area going through the image columns from top to bottom or bottom to top. The electronic device 724 may find 1810 a path by minimizing an energy function going through image columns from top to bottom or bottom to top (for a vertical seam for one dimensional horizontal panorama stitching, for example). The energy function may be the same energy function discussed in relation to FIG. 7A. A path may be used 1812 by the electronic device 724 as a vertical seam for image merging. The path may be a vertical seam that traces a minimal value in each row top to bottom or bottom to top.

The methods of FIGS. 17 and 18 may be implemented by a field-programmable gate array (FPGA) device, an application-specific integrated circuit (ASIC), a processing unit such as a graphical processing unit (GPU), a central processing unit (CPU), a digital signal processor (DSP), a controller, another hardware device, firmware device, or any combination thereof. As an example, the methods of FIGS. 17 and 18 can be performed by one or more processors that execute instructions.

Figure 19:
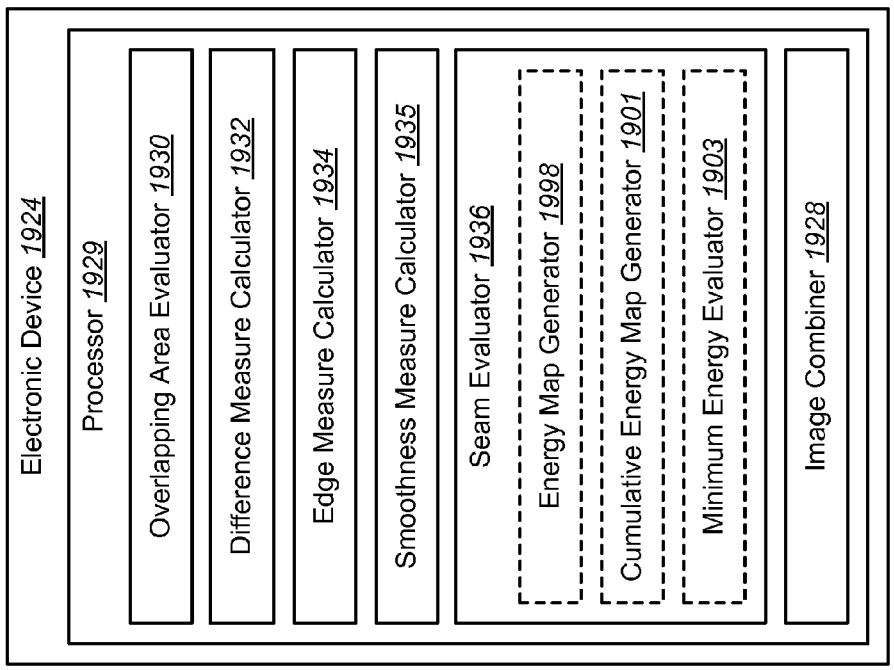
FIG. 19 is a block diagram illustrating a more specific configuration of an electronic device in which systems and methods for determining a seam may be implemented.

FIG. 19 is a block diagram illustrating a more specific configuration of an electronic device 1924 in which systems and methods for determining a seam may be implemented. The electronic device 1924 may be an example of the electronic device 724 of FIG. 7A. One or more of the elements described in connection with the electronic device 724 of FIG. 7A may be included in the electronic device 1924. The electronic device 1924 may include a processor 1929. The processor 1929 may include and/or implement an overlapping area evaluator 1930, a difference measure calculator 1932, an edge measure calculator 1934, a smoothness measure calculator 1935, a seam evaluator 1936 and/or an image combiner 1928. One or more of the elements included in and/or implemented by the processor 1929 may function as described in accordance with one or more corresponding elements described in connection with FIG. 7A.

The electronic device 1924 may obtain images from one or more sources. This may be accomplished as described in connection with FIG. 7A. For example, the electronic device 1924 may transfer (e.g., receive) images from an external electronic device e.g., a digital camera, smartphone camera, thumb drive, etc. In another example, the electronic device 1924 may capture the neighboring images used to stitch together a panoramic image. The neighboring images may be provided to the processor 1929.

The processor 1929 may include and/or implement an overlapping area evaluator 1930, difference measure calculator 1932, edge measure calculator 1934, smoothness measure calculator 1935, a seam evaluator 1936 and/or an image combiner 1928. The processor 1929 may also optionally include and/or implement an energy map generator 1998, minimum energy calculator 1903 and/or a cumulative energy map generator 1901. In some configurations, the energy map generator 1998, the cumulative energy map generator 1901 and/or the minimum energy evaluator 1903 may be included in the seam evaluator 1936. In other configurations, one or more of the energy map generator 1998, the cumulative energy map generator 1901 and the minimum energy evaluator 1903 may be implemented separately from the seam evaluator 1936.

The image combiner 1928 may be an example of the image combiner 728 of FIG. 7A. The electronic device 1924 may use one or more of the illustrated elements to stitch the neighboring images into a panoramic image. Overlapping areas in the neighboring images may be found by the overlapping area evaluator 1930. The overlapping area evaluator 1930 may use image registration approaches to align the images in the neighboring images to obtain overlapping areas. Determining the overlapping areas may be used to create an error surface and an energy map (by the energy map generator 1998, for example). The overlapping area evaluator 1930 may then extract the overlapping areas of the neighboring images. The overlapping area evaluator 1930 may be an example of the overlapping area evaluator 730 of FIG. 7A.

A difference measure in each of the overlapping areas may then be determined by the difference measure calculator 1932. The difference measure calculator 1932 may be an example of the difference measure calculator 732 of FIG. 7A. The difference measure may be determined as described in connection with FIG. 7A. The difference measure may be used to find a seam on pixels where the differences between the images are minimal. The difference measure may be based on squared image intensity differences, absolute image intensity differences and/or squared color distances.

The difference measure may indicate pixels that have different intensity levels or color values allowing the seam to be made along pixels that have similar intensity levels or color values. For example, if a pixel in a first image has a low intensity e.g., has a dark color in it and the same overlapping pixel in a second image has a high intensity e.g., has a light color in it, the difference measure would be high and that pixel may not be used for a seam.

The edge measure may optionally be determined by the edge measure calculator 1934 as described in connection with FIG. 7A. The edge measure may be an example of the constraint measure described in connection with FIG. 7A. The edge measure may be based on a gradient constraint, a histogram of gradients and/or a sum of color differences with neighboring pixels. The smoothness measure calculator 1935 may optionally determine the smoothness measure as described in connection with FIG. 7A. The smoothness measure may be an example of the constraint measure described in connection with FIG. 7A. The edge measure and/or the smoothness measure may improve the quality and results of stitching the panoramic image. In some configurations, the edge measure calculator 1934 and/or the smoothness measure calculator 1935 may be included in a constraint measure calculator as described in connection with FIG. 7A.

The seam evaluator 1936 may determine what pixels to use for the seam based on the difference measure and one or more constraint measures (e.g., edge measure and/or smoothness measure). The seam evaluator 1936 may be an example of the seam evaluator 736 of FIG. 7A. The seam evaluator 1936 may determine a seam as described in connection with FIG. 7A. The seam evaluator 1936 may include an energy map generator 1998, a cumulative energy map generator 1901 and/or a minimum energy evaluator 1903.

The energy map generator 1998 may generate an energy map of the overlapping areas as described above. For example, the energy map may be based on a function which is equal to the sum of the difference measure, the edge measure and/or the smoothness measure. With the difference measure and one or more constraint measures being used to create the energy map, a more thorough energy map may be created that indicates moving objects and/or stationary objects and the creating a seam around both types of objects. In some configurations, the energy map generator 1998 may optionally be used to determine the energy level of each pixel in the overlapping areas of the neighboring images and create an energy map of the pixels. Creating the energy map that may indicate moving objects in the overlapping areas may be accomplished as described in relation to FIG. 7A. The energy map may indicate where the energy level in two overlapping pixels varies.

The seam evaluator 1936 may include a cumulative energy map generator 1901. The cumulative energy map generator 1901 may generate a cumulative energy map (e.g., cumulative minimum energy map) of pixels. This may be accomplished as described above. For example, the cumulative energy of a current pixel may be based on the energy level of the current pixel in the energy map and the energy level of a pixel with a minimum energy level in three or four surrounding pixels. In some configurations, the cumulative energy map may be created in the horizontal direction or vertical direction or a combination of both for a two dimensional seam. The cumulative energy map may be created using the energy map created by the energy map generator 1998. The cumulative energy map generator 1901 may traverse through the energy map row by row if a horizontal seam is being created or column by column if a vertical seam is being created. The cumulative energy of the current pixel is computed by determining an energy level of the current pixel and then adding the energy level of the current pixel and the minimum cumulative energy level of one of the four neighboring pixels. Creating the cumulative energy map may be accomplished as described in relation to FIG. 9.

The seam evaluator 1936 may include a minimum energy evaluator 1903. The minimum energy calculator 1903 may use the cumulative energy map to determine an energy level of one or more routes through the cumulative energy map. The seam evaluator may then determine a route for the seam based on the cumulative energy map. For example, the values of the different routes through the cumulative energy map may be used by the seam evaluator 1936 to assist in determining a seam in the overlapping areas. For instance, the seam evaluator 1936 may create (e.g., select) a seam that has the lowest summed cumulative energy level of each pixel used in the seam.

Figure 20:
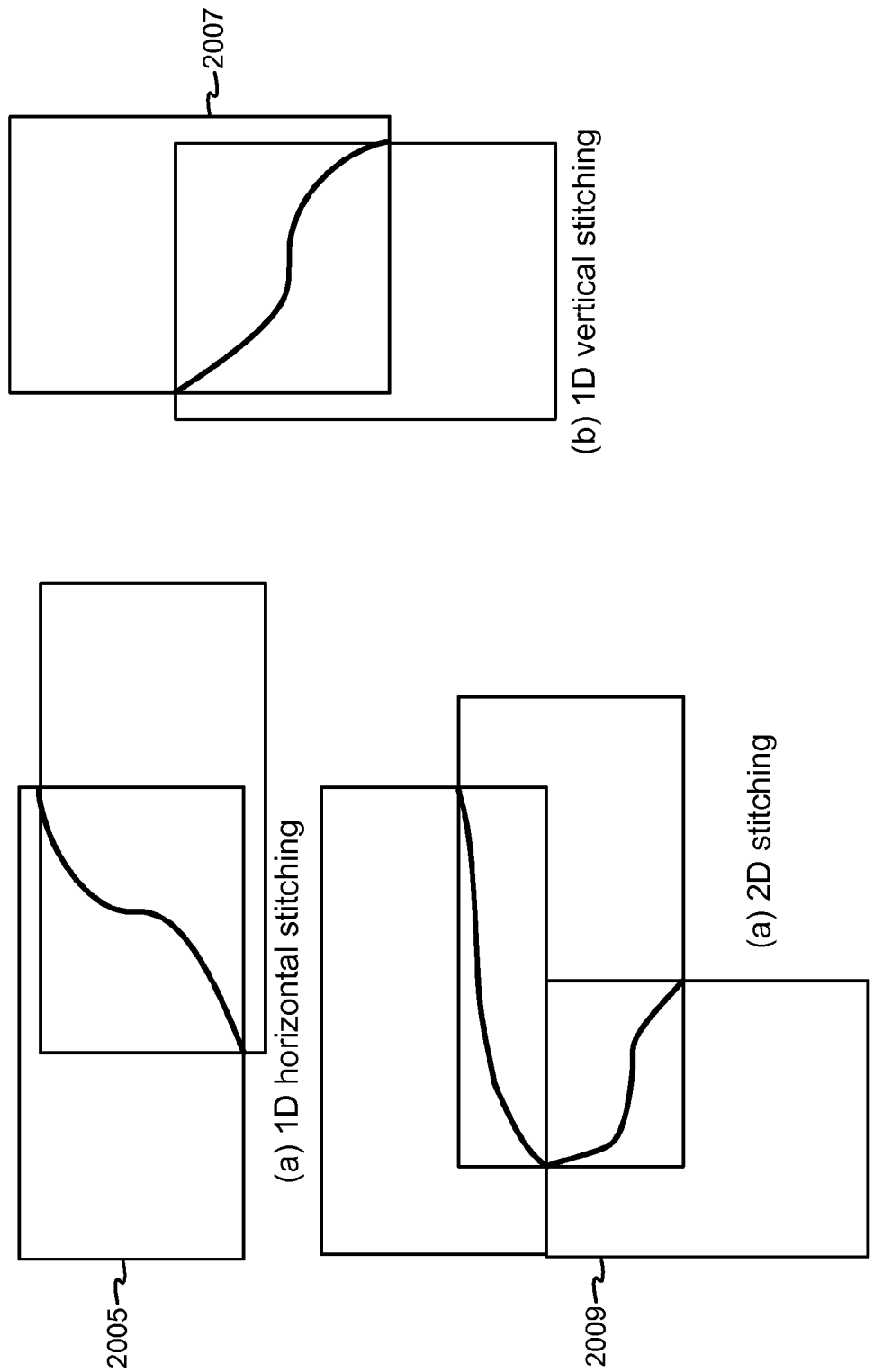
FIG. 20 illustrates an example of horizontal stitching, vertical stitching and two dimensional stitching of overlapping areas.

FIG. 20 illustrates an example of horizontal stitching 2005, vertical stitching 2007 and two dimensional stitching 2009 of overlapping areas. The one-dimensional (1D) horizontal stitching 2005 may extend the area a panoramic image can cover in a horizontal direction. Determining a difference measure, an edge measure, energy level and/or cumulative energy map may be done in a left to right or right to left order for traversing the pixel maps. Horizontal 1D panoramic stitching may utilize vertical seam(s).

The one-dimensional (1D) vertical stitching 2007 may extend the area a panoramic image can cover in a vertical direction. Additionally or alternatively, determining a difference measure, an edge measure, energy level and/or cumulative energy map may be done top to bottom or bottom to top order for traversing the pixel maps. Vertical 1D panoramic stitching may utilize horizontal seam(s).

The two-dimensional (2D) stitching 2009 of overlapping areas may be done to extend the area a panoramic image can cover in both the horizontal direction and the vertical direction. This process is generally helpful for stitching images that have different orientations. For example, the neighboring images may include one image that is vertical and two images that are horizontal. A seam for an image that overlaps two images may be vertical in one image and horizontal in the other. Computing a difference measure, an edge measure and/or a smoothness measure may be performed in a similar fashion to determining a one dimensional seam. In some configurations, the cumulative energy map of the overlapping area may be traversed in both the vertical direction and horizontal direction. Determining a seam may be performed by determining a route with minimum energy in both the vertical and horizontal direction. 2D panoramic stitching may utilize both horizontal and vertical seam(s).

FIG. 21 illustrates an example of a seam for creating a panoramic image using the systems and methods disclosed herein. Image A 2109 illustrates an energy map (e.g., energy levels) of an overlapping area of neighboring images. Image A 2109 indicates the difference measure and one or more constraint measures (e.g., edge measure) of the images. An example pixel map has been overlaid to illustrate a seam that may be used to stitch a panoramic image. The pixel map is not to scale and is only for illustrating the seam. The pixels used (and not used) for the seam are indicated. Image B 2111 is the panoramic image stitched together. The same pixel map is overlaid to indicate where the seam was made.

Figure 22:
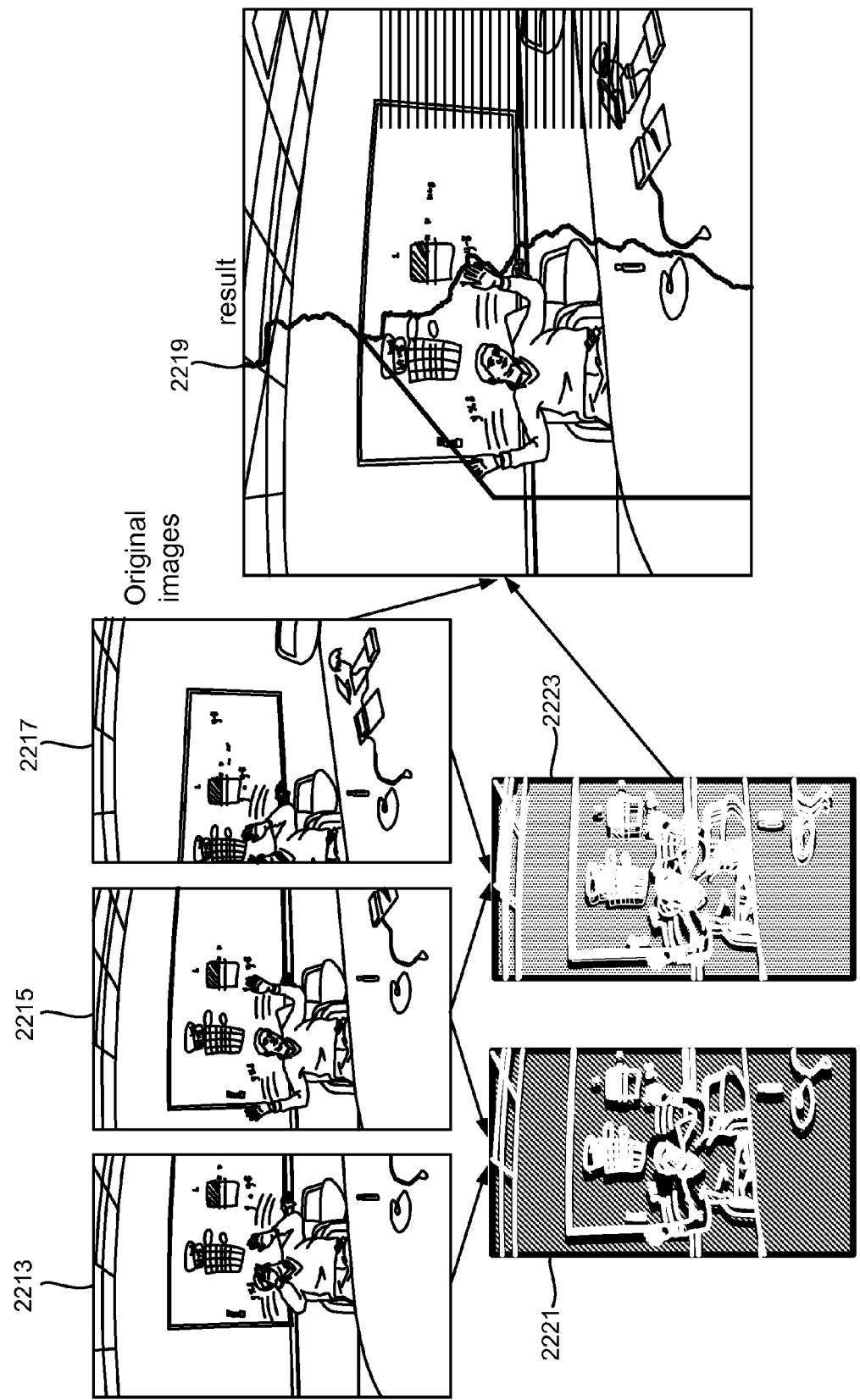
FIG. 22 illustrates an example of a panoramic image being stitched together based on the systems and methods disclosed herein.

FIG. 22 illustrates an example of a panoramic image 2219 being stitched together based on the systems and methods disclosed herein. In this example, three original (e.g., neighboring) images 2213, 2215, 2217 are illustrated. The overlapping areas may be extracted and an energy function (as illustrated by images 2221, 2223) may be created for the overlapping areas. The energy function may be used to determine a seam in the overlapping areas and that seam may be used to stitch the panoramic image 2219. The panoramic image 2219 may not include any artifacts created by moving objects or by selecting a seam that cuts through an object. This approach may create a panoramic image that is more reasonable.

FIGS. 23A-23E depict pairs of panoramic images with different size and illumination conditions. In each of FIGS. 23A-23E, a first image 2351a-e (e.g., a left most image) is generated using a minimal error boundary (MEB) that utilizes pixel difference and gradient to determine $e_{ij}$. In each of FIGS. 23A-23E, a second image 2353a-e (e.g., a right most image) is generated using a MEB-based method that utilizes curvature (e.g., a smoothness measure). For example, each of the second images 2353a-e (e.g., the right most images) were generated using $e_{ij} = |I^1(i,j) - I^2(i,j)|^2 + \alpha(|\vec{K}^1(i,j)|^2 + \vec{K}^2(i,j)|^2)$, where α was set to 128.

For input images that were captured as color images, each of the images was converted to gray images (e.g., gray scale images) before computing $e_{ij}$. Additionally, prior to performing image stitching, image registration and color correction were applied to the input images having overlapped regions. Each pair of images includes one or more areas 2355a-e that indicate visual differences between corresponding images. Additionally, seams may be represented in one or more of the images of FIGS. 23A-23E as black lines. Comparing each first image 2351a-e to a corresponding second image 2353a-e, the second images generated using curvature information (e.g., a curvature based stitching method) have better visual results in terms of both non-uniform photometric inconsistency and misalignment.

In FIG. 23A, for example, the first image 2351a illustrates an area 2355a where a seam has cut through a tree branch. The resulting first image 2351a has a distorted tree branch in the area 2355a, whereas the second image 2353a does not have the same distortion.

In FIG. 23B, for example, the first image 2351b illustrates an area 2355b where a person is shown twice in the panaoramic image. Specifically, the person is shown both between the cars and behind a car. The second image 2353b does not include a duplicate of the person.

In FIG. 23C, for example, the first image 2351c illustrates areas 2355c where a door is distorted and where a window frame is distorted. Specifically, the edge of the door appears bent and the window frame appears discontinuous. The second image 2353c does not show the same distortions (e.g., artifacts).

In FIG. 23D, for example, the first image 2351d illustrates areas 2355d where seams have cut through the cylindrical barriers. The resulting first image 2351d shows several distorted cylindrical barriers, where some appear to be missing chunks and/or appear to be the wrong size. The second image 2353d does not have the same distortion.

In FIG. 23E, for example, the first image 2351e illustrates areas 2355e where seams have cut through the border of a table and through a carpet edge. The resulting first image 2351e shows a distorted table, where the border is narrower than it should appear. The resulting first image 2351e also shows a distortion where the edge of the carpet appears bent. The second image 2353e does not have the same distortions.

Figure 24:
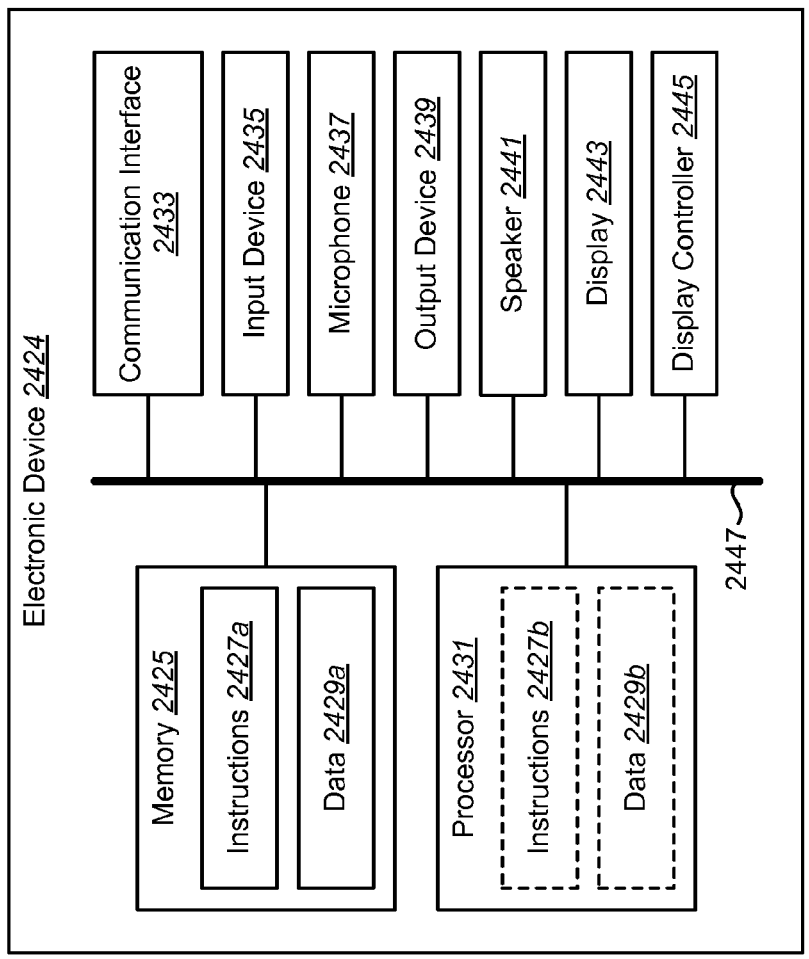
FIG. 24 illustrates various components that may be utilized in an electronic device.

FIG. 24 illustrates various components that may be utilized in an electronic device 2424. The illustrated components may be located within the same physical structure or in separate housings or structures. The electronic device 2424 described in connection with FIG. 24 may be implemented in accordance with one or more of the electronic devices 724, 1924 described herein. The electronic device 2424 includes a processor 2431. The processor 2431 may be a general purpose single- or multi-chip microprocessor (e.g., an ARM), a special purpose microprocessor (e.g., a digital signal processor (DSP)), a microcontroller, a programmable gate array, etc. The processor 2431 may be referred to as a central processing unit (CPU). Although just a single processor 2431 is shown in the electronic device 2424 of FIG. 24, in an alternative configuration, a combination of processors (e.g., an ARM and DSP) could be used.

The electronic device 2424 also includes memory 2425 in electronic communication with the processor 2431. That is, the processor 2431 can read information from and/or write information to the memory 2425. The memory 2425 may be any electronic component capable of storing electronic information. The memory 2425 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers and so forth, including combinations thereof.

Data 2429a and instructions 2427a may be stored in the memory 2425. The instructions 2427a may include one or more programs, routines, sub-routines, functions, procedures, etc. The instructions 2427a may include a single computer-readable statement or many computer-readable statements. The instructions 2427a may be executable by the processor 2431 to implement one or more of the methods, functions and procedures described above. Executing the instructions 2427a may involve the use of the data 2429a that is stored in the memory 2425. FIG. 24 shows some instructions 2427b and data 2429b being loaded into the processor 2431 (which may come from instructions 2427a and data 2429a).

The electronic device 2424 may also include one or more communication interfaces 2433 for communicating with other electronic devices. The communication interfaces 2433 may be based on wired communication technology, wireless communication technology, or both. Examples of different types of communication interfaces 2433 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter and so forth.

The electronic device 2424 may also include one or more input devices 2435 and one or more output devices 2439. Examples of different kinds of input devices 2435 include a keyboard, mouse, microphone, remote control device, button, joystick, trackball, touchpad, lightpen, etc. For instance, the electronic device 2424 may include one or more microphones 2437 for capturing acoustic signals. In one configuration, a microphone 2437 may be a transducer that converts acoustic signals (e.g., voice, speech) into electrical or electronic signals. Examples of different kinds of output devices 2439 include a speaker, printer, etc. For instance, the electronic device 2424 may include one or more speakers 2441. In one configuration, a speaker 2441 may be a transducer that converts electrical or electronic signals into acoustic signals. One specific type of output device which may be typically included in an electronic device 2424 is a display device 2443. Display devices 2443 used with configurations disclosed herein may utilize any suitable image projection technology, such as a cathode ray tube (CRT), liquid crystal display (LCD), light-emitting diode (LED), gas plasma, electroluminescence, or the like. A display controller 2445 may also be provided for converting data stored in the memory 2425 into text, graphics and/or moving images (as appropriate) shown on the display device 2443.

The various components of the electronic device 2424 may be coupled together by one or more buses, which may include a power bus, a control signal bus, a status signal bus, a data bus, etc. For simplicity, the various buses are illustrated in FIG. 24 as a bus system 2447. It should be noted that FIG. 24 illustrates only one possible configuration of an electronic device 2424. Various other architectures and components may be utilized.

One or more of the disclosed configurations or aspects may be implemented in a system or an apparatus, such as the device 2424, that may include a communications device, a fixed location data unit, a mobile location data unit, a mobile phone, a cellular phone, a satellite phone, a computer, a tablet, a portable computer, or a desktop computer. Alternatively or additionally, the device 2424 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof.

Figure 25:
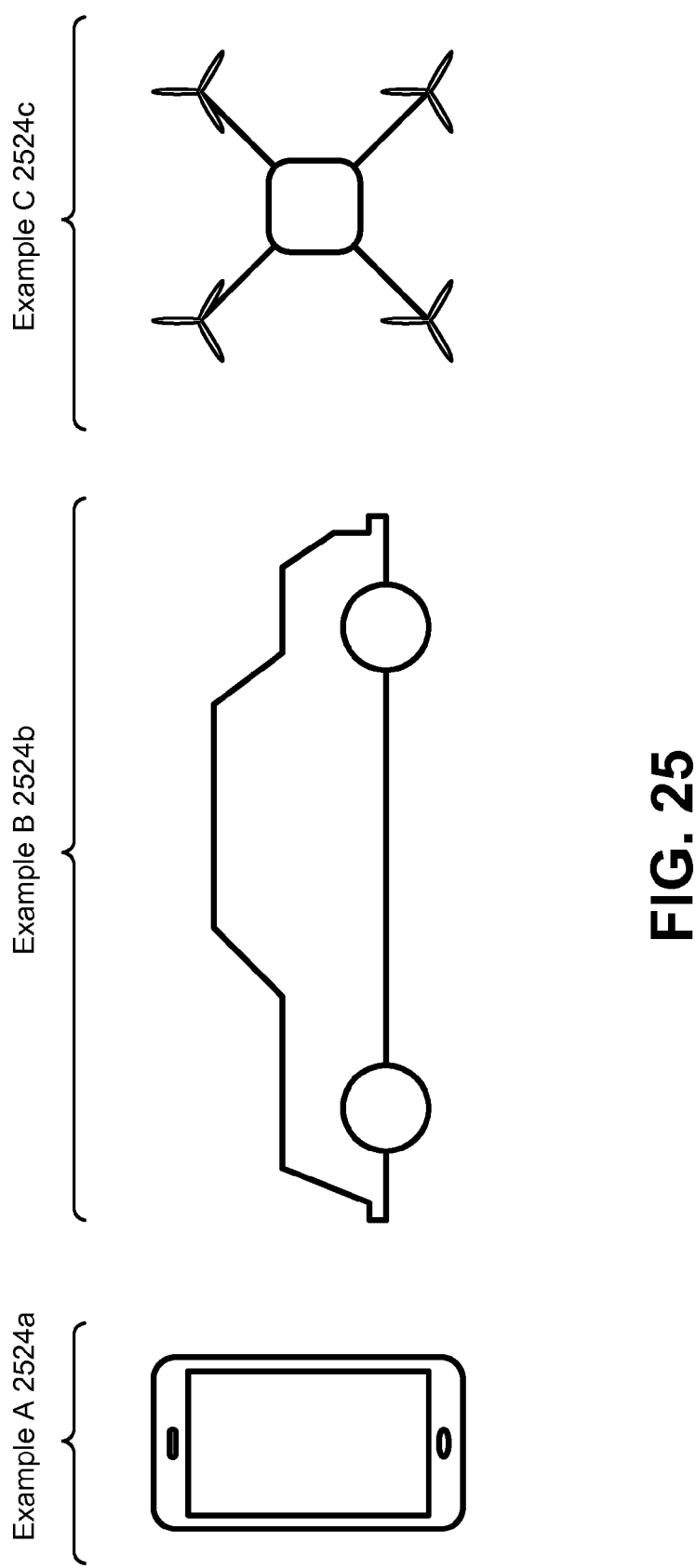
FIG. 25 illustrates examples of electronic devices in which systems and methods for determining a seam may be implemented.

FIG. 25 illustrates examples 2524a-c of electronic devices in which systems and methods for determining a seam may be implemented. Example A 2524a is a wireless communication device (e.g., smartphone, tablet device, etc.). Example B 2524b is an automobile. Example C 2524c is an unmanned aerial vehicle (e.g., UAV, drone, etc.).

One or more of the electronic devices 724, 1924, 2424 described herein may be implemented as (or included within) example A 2524a, example B 2524b and/or example C 2524c. Additionally or alternatively, one or more of the methods 800, 850, 1700, 1800, operations, procedures, functions and/or steps described herein may be performed by one or more of example A 2524a, example B 2524b and/or example C 2524c. Additionally or alternatively, one or more of the components and/or elements described herein may be implemented in one or more of example A 2524a, example B 2524b and/or example C 2524c.

For instance, example A 2524a (e.g., a smartphone) may perform one or more of the operations described above, such as determining a seam based on a constraint measure in order to combine images. In another instance, example B 2524b (an automobile) may capture multiple images, determine a seam based on a constraint measure and combine the images. In another instance, example C 2524c (a UAV) may capture multiple images, determine a seam based on a constraint measure and combine the images. Many other examples may be implemented in accordance with the systems and methods disclosed herein. For instance, the systems and method disclosed herein could be implemented in a robot that captures images, determines a seam based on a constraint measure and combines the images.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Configurations of the disclosure may be suitably employed in any device that includes integrated circuitry including memory, a processor and on-chip circuitry. Although one or more of FIGS. 1-25 may illustrate systems, apparatuses and/or methods according to the teachings of the disclosure, the disclosure is not limited to these illustrated systems, apparatuses and/or methods. One or more functions or components of any of FIGS. 1-24 as illustrated or described herein may be combined with one or more other portions of another of FIGS. 1-24. Accordingly, no single configuration described herein should be construed as limiting and configurations of the disclosure may be suitably combined without departing form the teachings of the disclosure.

Those of skill would further appreciate that the various illustrative logical blocks, configurations, modules, circuits and algorithm steps described in connection with the configurations disclosed herein may be implemented as electronic hardware, computer software executed by a processor, or combinations of both. Various illustrative components, blocks, configurations, modules, circuits and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the disclosure. In other words, unless a specific order of steps or actions is required for proper operation of the method that is being described, the order and/or use of specific steps and/or actions may be modified without departing from the scope of the disclosure.

The previous description of the disclosed configurations is provided to enable a person skilled in the art to make or use the disclosed configurations. Various modifications to these configurations will be readily apparent to those skilled in the art and the principles defined herein may be applied to other configurations without departing from the scope of the disclosure. Thus, the present disclosure is not intended to be limited to the configurations shown herein but is to be accorded the widest scope possible consistent with the principles and novel features as defined by the following claims.

What is claimed is:

1. A method performed by an electronic device, comprising:
   determining overlapping areas from neighboring images;
   determining a difference measure between the overlapping areas;
   determining a constraint measure corresponding to at least one of the overlapping areas; and
   determining a seam based on a combination of the difference measure and the constraint measure, wherein the seam in the overlapping areas is found by determining a cumulative energy level of a current pixel and by determining a minimum cumulative energy level of four neighboring pixels and adding the minimum cumulative energy level to an energy level of the current pixel.

2. The method of claim 1, wherein the constraint measure includes an edge measure, a smoothness measure, or both.

3. The method of claim 1, wherein the difference measure indicates one or more moving objects within the overlapping areas.

4. The method of claim 1, wherein the constraint measure includes an edge measure, and wherein the edge measure indicates object boundaries within the overlapping areas.

5. The method of claim 1, wherein the constraint measure includes a smoothness measure, and wherein the smoothness measure indicates a curvature within the overlapping areas.

6. The method of claim 1, wherein the combination indicates an energy level for each pixel within the overlapping areas.

7. The method of claim 6, wherein the energy level for each pixel within the overlapping areas constitutes an energy map.

8. The method of claim 7, wherein the seam is a minimum cost path.

9. The method of claim 1, wherein determining the seam comprises iteratively selecting a pixel with a minimum energy from a set of neighboring pixels.

10. An electronic device, comprising:
    a processor configured to determine a difference measure and a smoothness measure between overlapping areas of neighboring images and to determine a seam based on a combination of the difference measure and the smoothness measure, wherein the seam in the overlapping areas is found by determining a cumulative energy level of a current pixel and by determining a minimum cumulative energy level of four neighboring pixels and adding the minimum cumulative energy level to an energy level of the current pixel; and
    a memory configured to store the smoothness measure.

11. The electronic device of claim 10, wherein the processor is configured to determine the smoothness measure based on a curvature within the overlapping areas.

12. The electronic device of claim 10, wherein the processor is configured to determine the smoothness measure based on a minimal error boundary (MEB) technique.

13. The electronic device of claim 10, wherein the neighboring images include a first image and a second image.

14. The electronic device of claim 13, wherein the processor is configured to determine the smoothness measure based on a first curvature of a first portion of the first image and a second curvature of a second portion of the second image, wherein the first portion and the second portion correspond to the overlapping areas.

15. The electronic device of claim 14, wherein the smoothness measure includes a smoothness value for each pixel included in the first portion.

16. The electronic device of claim 15, wherein the processor is configured to determine a particular smoothness value based on a third curvature of a particular pixel in the first portion and a fourth curvature of a corresponding pixel in the second portion.

17. The electronic device of claim 10, wherein the processor is configured to multiply the smoothness measure by a first multiplier having a first value to generate a weighted smoothness measure, and wherein the processor is configured to determine the seam based on the weighted smoothness measure.

18. The electronic device of claim 17, wherein the processor is further configured to:
    combine the neighboring images based on the seam to generate a first combined image;
    determine a quality of the first combined image;
    modify the first multiplier to have a second value;
    generate a second weighted smoothness measure; and
    determine a second seam based on the second weighted smoothness measure.

19. The electronic device of claim 10, wherein the processor is configured to determine the seam based on an edge measure.

20. An apparatus, comprising:
    means for determining overlapping areas from neighboring images;
    means for determining a difference measure between the overlapping areas;
    means for determining a constraint measure corresponding to at least one of the overlapping areas; and means for determining a seam based on a combination of the difference measure and the constraint measure, wherein the means for determining the seam comprises:
  means for determining a cumulative energy level of a current pixel;
  means for determining a minimum cumulative energy level of four neighboring pixels; and
  means for adding the minimum cumulative energy level to an energy level of the current pixel.

21. The apparatus of claim 20, wherein the constraint measure includes an edge measure, a smoothness measure, or both.

22. The apparatus of claim 20, wherein the constraint measure includes a smoothness measure, and wherein the smoothness measure indicates a curvature within the overlapping areas.

23. The apparatus of claim 20, wherein the combination indicates an energy level for each pixel within the overlapping areas.

24. A computer-program product, comprising a non-transitory computer-readable medium having instructions thereon, the instructions comprising:
  code for causing an electronic device to determine overlapping areas from neighboring images;
  code for causing the electronic device to determine a difference measure between the overlapping areas;
  code for causing the electronic device to determine a constraint measure corresponding to at least one of the overlapping areas; and
  code for causing the electronic device to determine a seam based on a combination of the difference measure and the constraint measure, wherein the code for causing the electronic device to determine a seam comprises:
  code for causing the electronic device to determine a cumulative energy level of a current pixel;
  code for causing the electronic device to determine a minimum cumulative energy level of four neighboring pixels; and
  code for causing the electronic device to add the minimum cumulative energy level to an energy level of the current pixel.

25. The computer-program product of claim 24, wherein the constraint measure includes an edge measure, a smoothness measure, or both.

26. The computer-program product of claim 24, wherein the constraint measure includes a smoothness measure, and wherein the smoothness measure indicates a curvature within the overlapping areas.

27. The computer-program product of claim 24, wherein the combination indicates an energy level for each pixel within the overlapping areas.

* * * * *